(12) United States Patent
Xu et al.

(10) Patent No.: US 11,683,500 B2
(45) Date of Patent: Jun. 20, 2023

(54) PRECISION TRANSFORM COEFFICIENT SCALING AND QUANTIZATION FOR IMAGE AND VIDEO CODING

(71) Applicants: Beijing Bytedance Network Technology Co., Ltd., Beijing (CN); Bytedance Inc., Los Angeles, CA (US)

(72) Inventors: Jizheng Xu, San Diego, CA (US); Kai Zhang, San Diego, CA (US); Li Zhang, San Diego, CA (US); Hongbin Liu, Beijing (CN); Zhipin Deng, Beijing (CN); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

(*) Notice: Subject to any disclaimer, the term of this patent is extended or adjusted under 35 U.S.C. 154(b) by 0 days.

(21) Appl. No.: 17/699,032

(22) Filed: Mar. 18, 2022

(65) Prior Publication Data

US 2022/0232224 A1 Jul. 21, 2022

Related U.S. Application Data

(63) Continuation of application No. PCT/CN2020/115533, filed on Sep. 16, 2020.

(30) Foreign Application Priority Data

Sep. 21, 2019 (WO) ................ PCT/CN2019/107140

(51) Int. Cl.
*H04N 19/157* (2014.01)
*H04N 19/124* (2014.01)
(Continued)

(52) U.S. Cl.
CPC ......... *H04N 19/157* (2014.11); *H04N 19/124* (2014.11); *H04N 19/132* (2014.11);
(Continued)

(58) Field of Classification Search
CPC .......................... H04N 19/157; H04N 19/124
See application file for complete search history.

(56) References Cited

U.S. PATENT DOCUMENTS 7,974,344 B2   7/2011  Ji et al.
8,879,628 B2   11/2014 Tourapis et al.
(Continued)

FOREIGN PATENT DOCUMENTS

CN   105144718 A      12/2015
CN   105847818 A  *  8/2016  ........... H04N 19/124
(Continued)

OTHER PUBLICATIONS

Chen et al. "Algorithm Description for Versatile Video Coding and Test Model 6 (VTM 6)," Joint Video Experts Team (JVET) of ITU-T SG 16 WP 3 and ISO/IEC JTC 1/SC 29/WG 11 15th Meeting, Gothenburg, SE, Jul. 3-12, 2019, document JVET-O2002, 2019 (Year: 2019).*
(Continued)

*Primary Examiner* — Dramos Kalapodas
(74) *Attorney, Agent, or Firm* — Perkins Coie LLP

(57) ABSTRACT

Methods, systems, and devices for high-precision transform and quantization for image and video coding are described. A example method of video processing includes determining, for a conversion between a video comprising a current block and a bitstream representation of the video, that the conversion comprises an application of a transform to the current block, and performing, based on the determining, the conversion, wherein a bit-shifting operation of a scaling process for transform coefficients associated with the trans-
(Continued)

form is based on whether the current block is coded with a block-based differential pulse code modulation (BDPCM) mode.

18 Claims, 13 Drawing Sheets

(51) Int. Cl.
    *H04N 19/132*     (2014.01)
    *H04N 19/176*     (2014.01)
    *H04N 19/18*     (2014.01)
    *H04N 19/30*     (2014.01)
    *H04N 19/60*     (2014.01)

(52) U.S. Cl.
    CPC ........... *H04N 19/176* (2014.11); *H04N 19/18* (2014.11); *H04N 19/30* (2014.11); *H04N 19/60* (2014.11)

(56) References Cited

U.S. PATENT DOCUMENTS

| | | | |
|---|---|---|---|
| 9,924,166 | B2 | 3/2018 | Ye et al. |
| 9,955,174 | B2 | 4/2018 | Ye et al. |
| 10,368,072 | B2 | 7/2019 | Zhang et al. |
| 10,382,778 | B2 | 8/2019 | Huang et al. |
| 10,412,387 | B2 | 9/2019 | Pang et al. |
| 10,462,462 | B2 | 10/2019 | Chien et al. |
| 10,523,965 | B2 | 12/2019 | Wang et al. |
| 10,531,116 | B2 | 1/2020 | Li et al. |
| 10,542,280 | B2 | 1/2020 | Sun et al. |
| 10,616,582 | B2 | 4/2020 | Zhang et al. |
| 10,666,953 | B2 | 5/2020 | Ye et al. |
| 10,681,372 | B2 | 6/2020 | Li et al. |
| 10,841,609 | B1 | 11/2020 | Liu et al. |
| 10,939,124 | B1 | 3/2021 | Wang et al. |
| 2013/0127987 | A1 | 5/2013 | Zhang et al. |
| 2014/0056362 | A1 | 2/2014 | Mrak et al. |
| 2015/0124872 | A1 | 5/2015 | Zhou et al. |
| 2015/0264376 | A1 | 9/2015 | Zou et al. |
| 2015/0373359 | A1 | 12/2015 | He et al. |
| 2017/0127058 | A1 | 5/2017 | Misra et al. |
| 2018/0098089 | A1 | 4/2018 | Chen et al. |
| 2018/0270481 | A1 | 9/2018 | Rosewarne |
| 2020/0029091 | A1 | 1/2020 | Chien et al. |
| 2020/0195953 | A1 | 6/2020 | Lainema |
| 2020/0213594 | A1 | 7/2020 | Liu et al. |
| 2020/0213612 | A1 | 7/2020 | Liu et al. |
| 2020/0221117 | A1 | 7/2020 | Liu et al. |
| 2020/0252629 | A1 | 8/2020 | Ye et al. |
| 2020/0314418 | A1 | 10/2020 | Wang et al. |
| 2020/0314432 | A1 | 10/2020 | Wang et al. |
| 2020/0359029 | A1 | 11/2020 | Liu et al. |
| 2021/0029374 | A1 | 1/2021 | Zhang et al. |
| 2021/0203945 | A1 | 7/2021 | Liu et al. |
| 2021/0203947 | A1 | 7/2021 | He et al. |
| 2021/0289225 | A1 | 9/2021 | Liu et al. |
| 2021/0344922 | A1 | 11/2021 | Zhang et al. |
| 2021/0360256 | A1 | 11/2021 | Liu et al. |
| 2021/0368203 | A1 | 11/2021 | Zhang et al. |
| 2022/0014790 | A1 | 1/2022 | Liu et al. |
| 2022/0141465 | A1 | 5/2022 | Ko et al. |
| 2022/0159294 | A1* | 5/2022 | Yoo ...................... H04N 19/136 |
| 2022/0191492 | A1 | 6/2022 | Xu et al. |
| 2022/0264099 | A1* | 8/2022 | Choi ...................... H04N 19/91 |
| 2022/0394259 | A1* | 12/2022 | Zhang .................. H04N 19/157 |

FOREIGN PATENT DOCUMENTS

| | | | | |
|---|---|---|---|---|
| CN | 105847818 | A | | 8/2016 |
| CN | 106464885 | A | | 2/2017 |
| CN | 107211146 | A | | 9/2017 |
| EP | 4013054 | A1 | * | 6/2022 ........... H04N 19/126 |
| EP | 4013054 | A1 | | 6/2022 |
| KR | 1144539 | B1 | * | 5/2012 ........... H04N 19/132 |
| KR | 101144539 | A1 | | 5/2012 |
| WO | 2015057438 | A1 | | 4/2015 |

OTHER PUBLICATIONS

Jhu et al. "Non-CE8: Quantization Unification for Palette Escape and Transform Skip," Joint Video Experts Team (JVET) of ITU-T SG 16 WP 3 and ISO/IEC JTC 1/SC 29/WG 11 16th Meeting, Geneva, CH, Oct. 1-11, 2019, document JVET-P0515, 2019 (Year :2019).*

Tsukuba et al. "On Scaling for Transform Skip," Joint Video Experts Team (JVET) of ITU-T SG 16 WP 3 and ISO/IEC JTC 1/SC 29/WG 11 16th Meeting, Geneva, CH, Oct. 1-11, 2019, document JVET-P0272, 2019 (Year: 2019).*

Xu et al. "Non-CE6: Transform Skip with a Fixed Transform Shift," Joint Video Experts Team (JVET) of ITU-T SG 16 WP 3 and ISO/IEC JTC 1/SC 29/WG 11 16th Meeting, Geneva, CH, Oct. 1-11, 2019, document JVET-P0538, 2019 (Year: 2019).*

Bross et al. "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2001, 2019.

Hashimoto etal. "Non-CE7: Harmonization of Scaling Matrix and LFNST," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0383, 2019.

Jang et al. "Comments on Transform Quantization Bypassed Mode," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0584, 2019.

Telecommunication Standardization Sector of ITU Series H: Audiovisual and Multimedia Systems , Infrastructure of audiovisual services—Coding of moving video, High efficiency video coding ITU-T H.265 ( Jun. 30, 2019).

Zhao et al. "Non-CE6: Simplification on LFNST," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0195, 2019.

https://vcgit.hhi.fraunhofer.de/jvet/VVCSoftware_VTM/-/tags/VTM-6.0rc1.

International Search Report and Written Opinion from International Patent Application No. PCT/CN2020/114227 dated Oct. 28, 2020 (9 pages).

International Search Report and Written Opinion from International Patent Application No. PCT/CN2020/115533 dated Dec. 17, 2020 (10 pages).

Non Final Office Action from U.S. Appl. No. 17/689,320 dated Jun. 7, 2022.

Chen et al. "Algorithm Description for Versatile Video Coding and Test Model 6 (VTM 6)," Joint Video Experts Team (JVET) of ITU-T SG 16 WP 3 and ISO/IEC JTC 1/SC 29/WG 11 15th Meeting, Gothenburg, SE, Jul. 3-12, 2019, document JVET-O2002, 2019. (cited in EP20865940.9 EESR dated Oct. 26, 2022).

Jhu et al. "Non-CE8: Quantization Unification for Palette Escape and Transform Skip," Joint Video Experts Team (JVET) of ITU-T SG 16 WP 3 and ISO/IEC JTC 1/SC 29/WG 11 16th Meeting, Geneva, CH, Oct. 1-11, 2019, document JVET-P0515, 2019.(cited in EP20865940.9 EESR dated Oct. 26, 2022).

Tsukuba et al. "On Scaling for Transform Skip," Joint Video Experts Team (JVET) of ITU-T SG 16 WP 3 and ISO/IEC JTC 1/SC 29/WG 11 16th Meeting, Geneva, CH, Oct. 1-11, 2019, document JVET-P0272, 2019. (cited in EP20865940.9 EESR dated Oct. 26, 2022).

Xu et al. "Non-CE6: Transform Skip with a Fixed Transform Shift," Joint Video Experts Team (JVET) of ITU-T SG 16 WP 3 and ISO/IEC JTC 1/SC 29/WG 11 16th Meeting, Geneva, CH, Oct. 1-11, 2019, document JVET-P0538, 2019. (cited in EP20865940.9 EESR dated Oct. 26, 2022).

Extended European Search Report from European Patent Application No. 20865940.9 dated Oct. 26, 2022 (15 pages).

(56) References Cited

OTHER PUBLICATIONS

Examination Report from Indian Patent Application No. 202227015817 dated Oct. 13, 2022 (5 pages).

* cited by examiner

US 11,683,500 B2

PRECISION TRANSFORM COEFFICIENT SCALING AND QUANTIZATION FOR IMAGE AND VIDEO CODING

CROSS-REFERENCE TO RELATED APPLICATION

This application is a continuation of International Patent Application No. PCT/CN2020/115533, filed on Sep. 16, 2020, which claims the priority to and benefits of International Patent Application No. PCT/CN2019/107140 filed on Sep. 21, 2019. The entire disclosure of the aforementioned applications is incorporated by reference as part of the disclosure of this application.

TECHNICAL FIELD

This patent document relates to video coding and decoding.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to video and image coding and decoding in which high precision transform and quantization are used.

In one example aspect, a video processing method is disclosed. The method includes performing a conversion between a current block of a video and a bitstream representation of the video according to a rule, wherein the rule specifies that a scaling operation of a transform coding mode applied to the current block is configured independently of a size of the current block.

In another example aspect, a video processing method is disclosed. The method includes performing a conversion between a current block of a video and a bitstream representation of the video according to a rule, wherein the rule specifies that a dequantization process or a scaling operation of a transform coding mode applied to the current block is configured independently of the transform coding mode.

In yet another example aspect, a video processing method is disclosed. The method includes determining, for a conversion between a video comprising a current block and a bitstream representation of the video, that the conversion comprises an application of a transform to the current block, and performing, based on the determining, the conversion, wherein a bit-shifting operation of a scaling process for transform coefficients associated with the transform is based on whether the current block is coded with a block-based differential pulse code modulation (BDPCM) mode.

In yet another example aspect, a video processing method is disclosed. The method includes performing a conversion between a video comprising a current block and a bitstream representation of the video, wherein a transform shift used when converting between residual coefficient values of the current block and coded coefficients of the current block is based on whether the current block is coded with a block-based differential pulse code modulation (BDPCM) mode.

In yet another example aspect, a video processing method is disclosed. The method includes determining, for a conversion between a video comprising a current block and a bitstream representation of the video, that the current block is coded using a block-based differential pulse code modulation (BDPCM) mode, and performing, based on determining, the conversion, wherein a scaling list associated with the BDPCM mode is disabled.

In yet another example aspect, a video processing method is disclosed. The method includes determining, for a conversion between a video comprising a current block and a bitstream representation of the video, that the conversion is performed by disabling an application of a transform to the current block, and performing, based on the determining, the conversion, wherein the conversion comprises a dequantization process, and wherein decoded coefficients after the dequantization process are constrained to a range with a minimum value (TsMin) and a maximum value (TsMax).

In yet another example aspect, a video processing method is disclosed. The method includes determining, for a conversion between a video comprising a current block and a bitstream representation of the video, that the current block is coded using a block-based differential pulse code modulation (BDPCM) mode, and performing, based on the determining, the conversion, wherein the conversion comprises a dequantization process, and wherein decoded coefficients after the dequantization process are constrained to a first range with a minimum value (BdpcmMin) and a maximum value (BdpcmMax).

In yet another aspect, the above-described method is embodied in the form of processor-executable code and stored in a computer-readable program medium.

In yet another aspect, a device that is configured or operable to perform the above-described method is disclosed. The device may include a processor that is programmed to implement this method.

In yet another aspect, a video decoder apparatus may implement a method as described herein.

The above and other aspects and features of the disclosed technology are described in greater detail in the drawings, the description and the claims.

DETAILED DESCRIPTION

Figure 1:
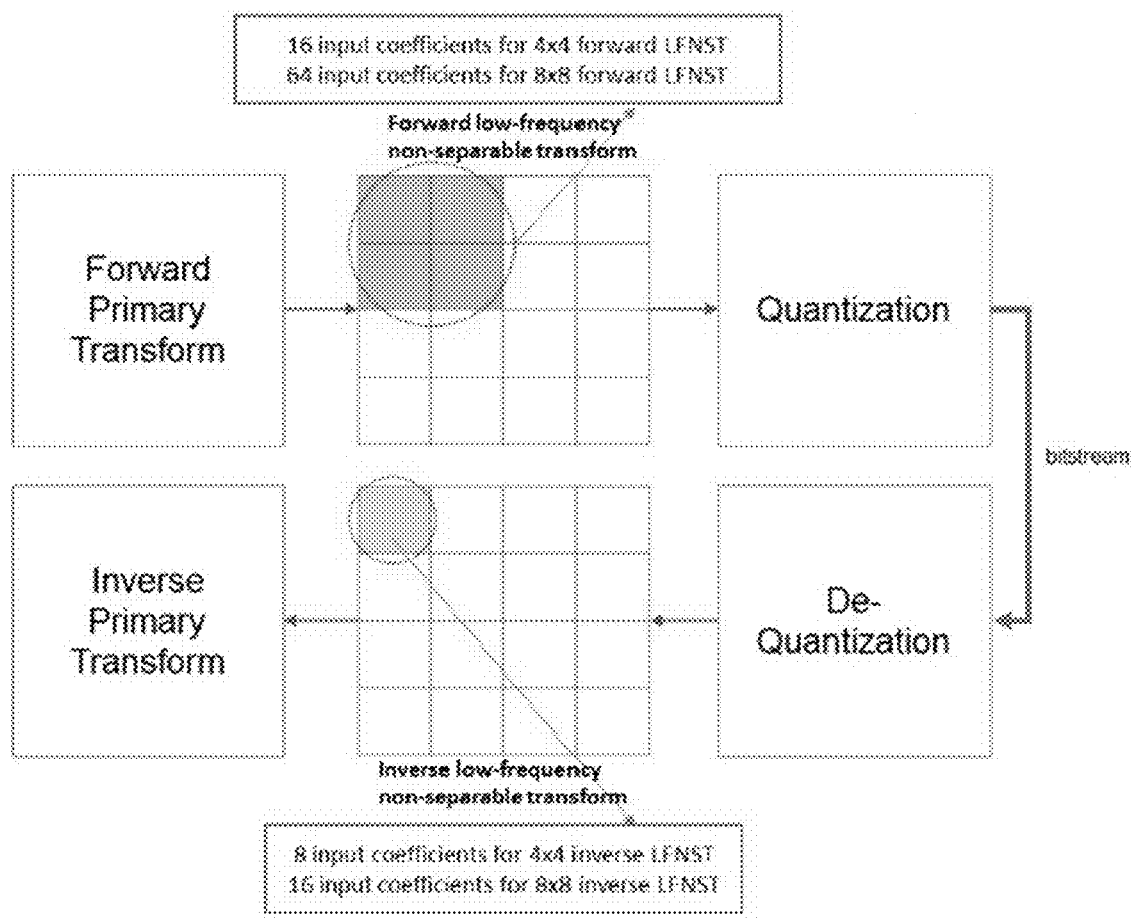
FIG. 1 shows an example of a Low-Frequency Non-Separable Transform (LFNST) process.

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

1 Video Coding Summary

This document is related to image and video coding technologies. Specifically, it is related to transform, quantization, dequantization and inverse transform in image and video coding. It may be applied to the existing video coding standard like HEVC, or the standard (Versatile Video Coding) to be finalized. It may be also applicable to future video coding standards or video codec.

2 Initial Discussion

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1 Transform and Quantization 2.1.1 Large Block-Size Transforms with High-Frequency Zeroing In VTM5, large block-size transforms, up to 64×64 in size, are enabled, which is primarily useful for higher resolution video, e.g., 1080p and 4 K sequences. High frequency transform coefficients are zeroed out for the transform blocks with size (width or height, or both width and height) equal to 64, so that only the lower-frequency coefficients are retained. For example, for an M×N transform block, with M as the block width and N as the block height, when M is equal to 64, only the left 32 columns of transform coefficients are kept. Similarly, when N is equal to 64, only the top 32 rows of transform coefficients are kept. When transform skip mode is used for a large block, the entire block is used without zeroing out any values.

2.1.2 Multiple Transform Selection (MTS) for Core Transform

In addition to DCT-II which has been employed in HEVC, a Multiple Transform Selection (MTS) scheme is used for residual coding both inter and intra coded blocks. It uses multiple selected transforms from the DCT8/DST7. The newly introduced transform matrices are DST-VII and DCT-VIII. Table 1 shows the basis functions of the selected DST/DCT.

TABLE 1

Transform basis functions of DCT-II/VIII and DSTVII for N-point input

| Transform Type | Basis function $T_i(j)$, $i, j = 0, 1, \ldots, N - 1$ |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$ |

TABLE 1-continued

Transform basis functions of DCT-II/VIII and DSTVII for N-point input

| Transform Type | Basis function $T_i(j)$, $i, j = 0, 1, \ldots, N - 1$ |
|---|---|
| | where, $\omega_0 = \begin{cases} \sqrt{\frac{2}{N}} & i = 0 \\ 1 & i \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

In order to keep the orthogonality of the transform matrix, the transform matrices are quantized more accurately than the transform matrices in HEVC. To keep the intermediate values of the transformed coefficients within the 16-bit range, after horizontal and after vertical transform, all the coefficients are to have 10-bit.

In order to control MTS scheme, separate enabling flags are specified at SPS level for intra and inter, respectively. When MTS is enabled at SPS, a CU level flag is signalled to indicate whether MTS is applied or not. Here, MTS is applied only for luma. The MTS CU level flag is signalled when the following conditions are satisfied.

Both width and height smaller than or equal to 32

CBF flag is equal to one

If MTS CU flag is equal to zero, then DCT2 is applied in both directions. However, if MTS CU flag is equal to one, then two other flags are additionally signalled to indicate the transform type for the horizontal and vertical directions, respectively. Transform and signalling mapping table as shown in Table 2. Unified the transform selection for ISP and implicit MTS is used by removing the intra-mode and block-shape dependencies. If current block is ISP mode or if the current block is intra block and both intra and inter explicit MTS is on, then only DST7 is used for both horizontal and vertical transform cores. When it comes to transform matrix precision, 8-bit primary transform cores are used. Therefore, all the transform cores used in HEVC are kept as the same, including 4-point DCT-2 and DST-7, 8-point, 16-point and 32-point DCT-2. Also, other transform cores including 64-point DCT-2, 4-point DCT-8, 8-point, 16-point, 32-point DST-7 and DCT-8, use 8-bit primary transform cores.

TABLE 2

Transform and signaling mapping table

| MTS_CU_flag | MTS_Hor_flag | MTS_Ver_flag | Intra/inter Horizontal | Vertical |
|---|---|---|---|---|
| 0 | | | DCT2 | |
| 1 | 0 | 0 | DST7 | DST7 |
| | 0 | 1 | DCT8 | DST7 |
| | 1 | 0 | DST7 | DCT8 |
| | 1 | 1 | DCT8 | DCT8 |

To reduce the complexity of large size DST-7 and DCT-8, High frequency transform coefficients are zeroed out for the DST-7 and DCT-8 blocks with size (width or height, or both width and height) equal to 32. Only the coefficients within the 16×16 lower-frequency region are retained.

As in HEVC, the residual of a block can be coded with transform skip mode. To avoid the redundancy of syntax coding, the transform skip flag is not signalled when the CU level MTS_CU_flag is not equal to zero. The block size limitation for transform skip is the same to that for MTS in JEM4, which indicate that transform skip is applicable for a CU when both block width and height are equal to or less than 32.

2.1.3 Transform Coefficient Zeroing Out

When a transform unit is large, it may need a large transform core, which brings much more complexity compared with small transform. Therefore, in the current VVC design, when a transform unit is large enough, a certain part of the transform coefficients will be set to 0 to reduce the size of transform needed.

Specifically, in the current VVC draft, it defines two variables to reflect which part of coefficients will be preserved:

nonZeroW=Min(nTbW,(trTypeHor>0)?16:32)

nonZeroH=Min(nTbH,(trTypeVer>0)?16:32)

Thus, after a 2-D forward transform, only with x=0 . . . nonZeroW−1 and y=0 . . . nonZeroH−1 may contain non-zero coefficients and all other coefficients are set to 0.

We denote nonZeroW and nonZeroH as the actual transform size in width and height, which may be different from the width (nTbW) and height (nTbH) of the transform unit.

2.1.4 Low-Frequency Non-Separable Transform (LFNST)

In VTM5, LFNST (low-frequency non-separable transform), which is known as reduced secondary transform, is applied between forward primary transform and quantization (at encoder) and between de-quantization and inverse primary transform (at decoder side) as shown in FIG. 1. In LFNST, 4×4 non-separable transform or 8×8 non-separable transform is applied according to block size. For example, 4×4 LFNST is applied for small blocks (i.e., min (width, height)<8) and 8×8 LFNST is applied for larger blocks (i.e., min (width, height)>4).

FIG. 1 shows an example of a Low-Frequency Non-Separable Transform (LFNST) process.

Application of a non-separable transform, which is being used in LFNST, is described as follows using input as an example. To apply 4×4 LFNST, the 4×4 input block X $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \quad (3\text{-}1)$$

is first represented as a vector $\vec{X}$:

$$\vec{X} = [X_{00} X_{01} X_{02} X_{03} X_{10} X_{11} X_{12} X_{13} X_{20} X_{21} X_{22} X_{23} X_{30} X_{31} X_{32} X_{33}]^T \quad (3\text{-}2)$$

The non-separable transform is calculated as $\vec{F} = T \cdot \vec{X}$, where $\vec{F}$ indicates the transform coefficient vector, and T is a 16×16 transform matrix. The 16×1 coefficient vector $\vec{F}$ is subsequently re-organized as 4×4 block using the scanning order for that block (horizontal, vertical or diagonal). The coefficients with smaller index will be placed with the smaller scanning index in the 4×4 coefficient block.

2.1.4.1 Reduced Non-Separable Transform

LFNST (low-frequency non-separable transform) is based on direct matrix multiplication approach to apply non-separable transform so that it is implemented in a single pass without multiple iterations. However, the non-separable transform matrix dimension needs to be reduced to minimize computational complexity and memory space to store the transform coefficients. Hence, reduced non-separable transform (or RST) method is used in LFNST. The main idea of the reduced non-separable transform is to map an N (N is commonly equal to 64 for 8×8 NSST) dimensional vector to an R dimensional vector in a different space, where N/R (R<N) is the reduction factor. Hence, instead of N×N matrix, RST matrix becomes an R×N matrix as follows:

$$T_{R \times N} = \begin{bmatrix} t_{11} & t_{12} & t_{13} & \ldots & t_{1N} \\ t_{21} & t_{22} & t_{23} & & t_{2N} \\ \vdots & & & \ddots & \vdots \\ t_{R1} & t_{R2} & t_{R3} & \ldots & t_{RN} \end{bmatrix} \quad (3\text{-}3)$$

where the R rows of the transform are R bases of the N dimensional space. The inverse transform matrix for RT is the transpose of its forward transform. For 8×8 LFNST, a reduction factor of 4 is applied in VTM5, and 64×64 direct matrix, which is conventional 8×8 non-separable transform matrix size, is reduced to 16×48 direct matrix. Hence, the 48×16 inverse RST matrix is used at the decoder side to generate core (primary) transform coefficients in 8×8 top-left regions. When 16×48 matrices are applied instead of 16×64 with the same transform set configuration, each of which takes 48 input data from three 4×4 blocks in a top-left 8×8 block excluding right-bottom 4×4 block. With the help of the reduced dimension, memory usage for storing all LFNST matrices is reduced from 10 KB to 8 KB with reasonable performance drop. In order to further reduce worst case complexity in terms of multiplication count occurs when all TUs consist of 4×4 TU or 8×8 TU, top 8×48 and 8×16 matrices are applied to 8×8 TU and 4×4 TU, respectively. For blocks larger than 8×8 TU, worst case does not occur so that 8×8 LFNST (i.e. 16×48 matrix) is applied to top-left 8×8 region. For 8×4 TU or 4×8 TU, 4×4 LFNST (i.e. 16×16 matrix) is applied to only top-left 4×4 region. For 4×N or N×4 TU (N≥16), 4×4 LFNST is applied to two adjacent top-left 4×4 blocks each. With the aforementioned simplification, the worst-case number of multiplications becomes 8 per sample.

2.1.4.2 LFNST Transform Selection

There are totally 4 transform sets and 2 non-separable transform matrices (kernels) per transform set are used in LFNST. The mapping from the intra prediction mode to the transform set is pre-defined as shown in Table 3. For each transform set, the selected non-separable secondary transform candidate is further specified by the explicitly signalled LFNST index. The index is signalled in a bit-stream once per Intra CU after transform coefficients.

TABLE 3

Transform selection table

| IntraPredMode | Tr. set index |
| --- | --- |
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode | 1 |

2.1.4.3 LFNST Index Signaling and Interaction with Other Tools

The forward 8×8 LFNST uses 16×48 matrices so that it produces non-zero coefficients only in the top-left 4×4 region within the given 8×8 region. In other words, if LFNST is applied then the 8×8 region except the top-left 4×4 region generates only zero coefficients. As a result, LFNST index is not coded when any non-zero element is detected within 8×8 block region other than top-left 4×4 because it implies that LFNST was not applied. In such a case, LFNST index is inferred to be zero. If LFNST index is equal to 0, LFNST is not applied. Otherwise, LFNST is applied. In addition, the LFNST index is context coded but does not depend on intra prediction mode, and only the first bin is context coded.

An inverse LFNST is conditionally applied when the following two conditions are satisfied:
a. Block size is greater than or equal to the given threshold (W>=4 && H>=4)
b. Transform skip mode flag is equal to zero If both width (W) and height (H) of a transform coefficient block is greater than 4, then the 8×8 LFNST is applied to the top-left 8×8 region of the transform coefficient block. Otherwise, the 4×4 LFNST is applied on the top-left min(8, W)×min(8, H) region of the transform coefficient block.

Furthermore, LFNST is applied for intra CU in both intra and inter slices, and for both Luma and Chroma. If a dual tree is enabled, LFNST indices for Luma and Chroma are signaled separately. For inter slice (the dual tree is disabled), a single LFNST index is signaled and used for both Luma and Chroma.

When ISP mode is selected, LFNST is disabled and RST index is not signaled, because performance improvement was marginal even if RST is applied to every feasible partition block. Furthermore, disabling RST for ISP-predicted residual could reduce encoding complexity. LFNST is also disabled and the index is not signaled when MIP mode is selected.

2.1.5 Sub-Block Transform (SBT)

In VTM, sub-block transform is introduced for an inter-predicted CU. In this transform mode, only a sub-part of the residual block is coded for the CU. When inter-predicted CU with cu_cbf equal to 1, cu_sbt_flag may be signaled to indicate whether the whole residual block or a sub-part of the residual block is coded. In the former case, inter MTS information is further parsed to determine the transform type of the CU. In the latter case, a part of the residual block is coded with inferred adaptive transform and the other part of the residual block is zeroed out.

Figure 2:
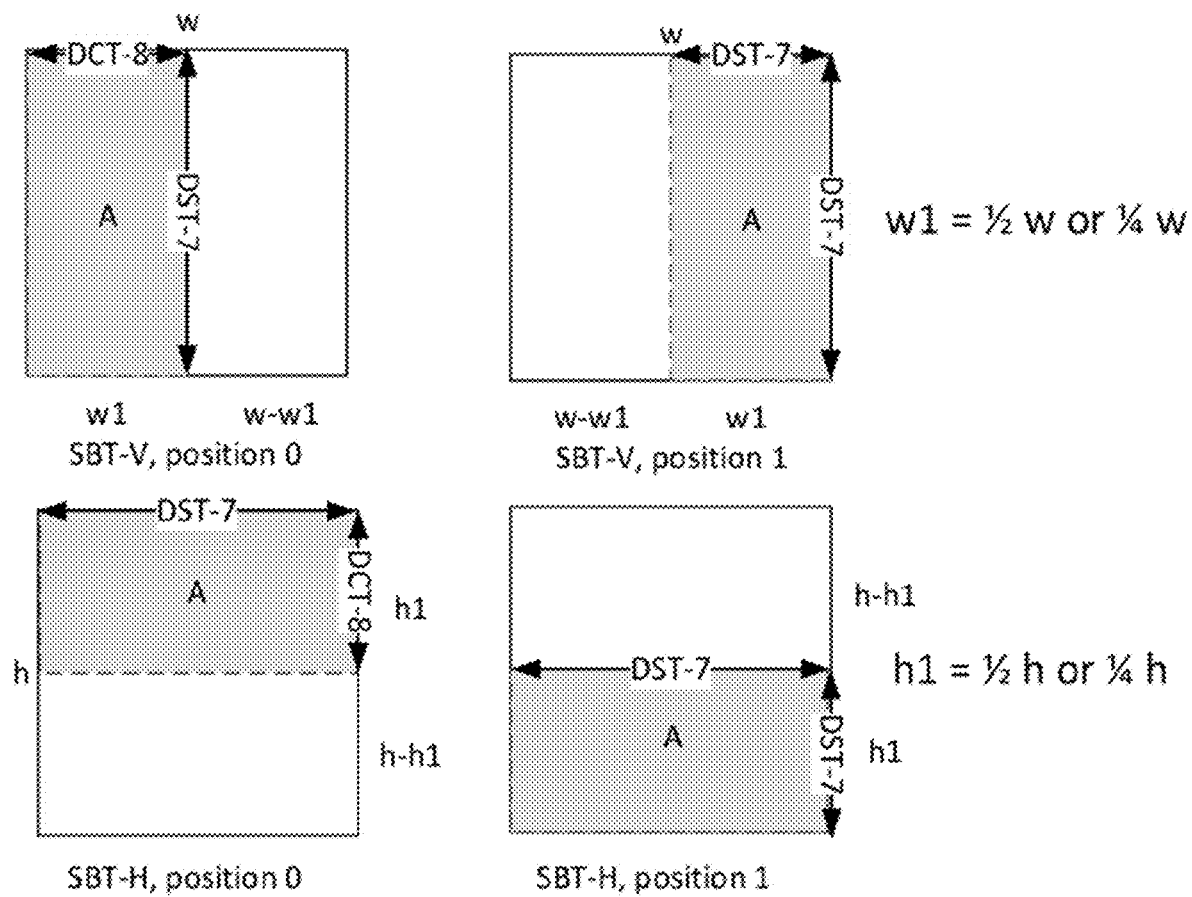
FIG. 2 shows examples of SBT position, type and transform type.

When SBT is used for an inter-coded CU, SBT type and SBT position information are signaled in the bitstream. There are two SBT types and two SBT positions, as indicated in FIG. 2. For SBT-V (or SBT-H), the TU width (or height) may equal to half of the CU width (or height) or ¼ of the CU width (or height), resulting in 2:2 split or 1:3/3:1 split. The 2:2 split is like a binary tree (BT) split while the 1:3/3:1 split is like an asymmetric binary tree (ABT) split. In ABT splitting, only the small region contains the non-zero residual. If one dimension of a CU is 8 in luma samples, the 1:3/3:1 split along that dimension is disallowed. There are at most 8 SBT modes for a CU.

Position-dependent transform core selection is applied on luma transform blocks in SBT-V and SBT-H (chroma TB always using DCT-2). The two positions of SBT-H and SBT-V are associated with different core transforms. More specifically, the horizontal and vertical transforms for each SBT position is specified in FIG. 2. For example, the horizontal and vertical transforms for SBT-V position 0 is DCT-8 and DST-7, respectively. When one side of the residual TU is greater than 32, the transform for both dimensions is set as DCT-2. Therefore, the sub-block transform jointly specifies the TU tiling, cbf, and horizontal and vertical core transform type of a residual block.

A variable maxSbtSize is signaled in SPS to specify the max CU size for which SBT can be applied. In the VTM5, for HD and 4 K sequences, maxSbtSize is set as 64 by encoder; for other smaller resolution sequences, maxSbtSize is set as 32.

The SBT is not applied to the CU coded with combined inter-intra mode or TPM mode.

2.1.6 Quantization

In VTM5, Maximum QP was extended from 51 to 63, and the signaling of initial QP was changed accordingly. The initial value of SliceQpY is modified at the slice segment layer when a non-zero value of slice_qp_delta is coded. Specifically, the value of init_qp_minus26 is modified to be in the range of (−26+QpBdOffsetY) to +37. In VTM5, when the size of a transform block is not a power of 4, the transform coefficients are processed along with a modification to the QP or QP levelScale table rather than by multiplication by 181/256 (or 181/128), to compensate for an implicit scaling by the transform process.

In addition, the same HEVC scalar quantization is used with a new concept called dependent scalar quantization. Dependent scalar quantization refers to an approach in which the set of admissible reconstruction values for a transform coefficient depends on the values of the transform coefficient levels that precede the current transform coefficient level in reconstruction order. The main effect of this approach is that, in comparison to conventional independent scalar quantization as used in HEVC, the admissible reconstruction vectors are packed denser in the N-dimensional vector space (N represents the number of transform coefficients in a transform block). That means, for a given average number of admissible reconstruction vectors per N-dimensional unit volume, the average distortion between an input vector and the closest reconstruction vector is reduced. The approach of dependent scalar quantization is realized by: (a) defining two scalar quantizers with different reconstruction levels and (b) defining a process for switching between the two scalar quantizers.

Figure 3:
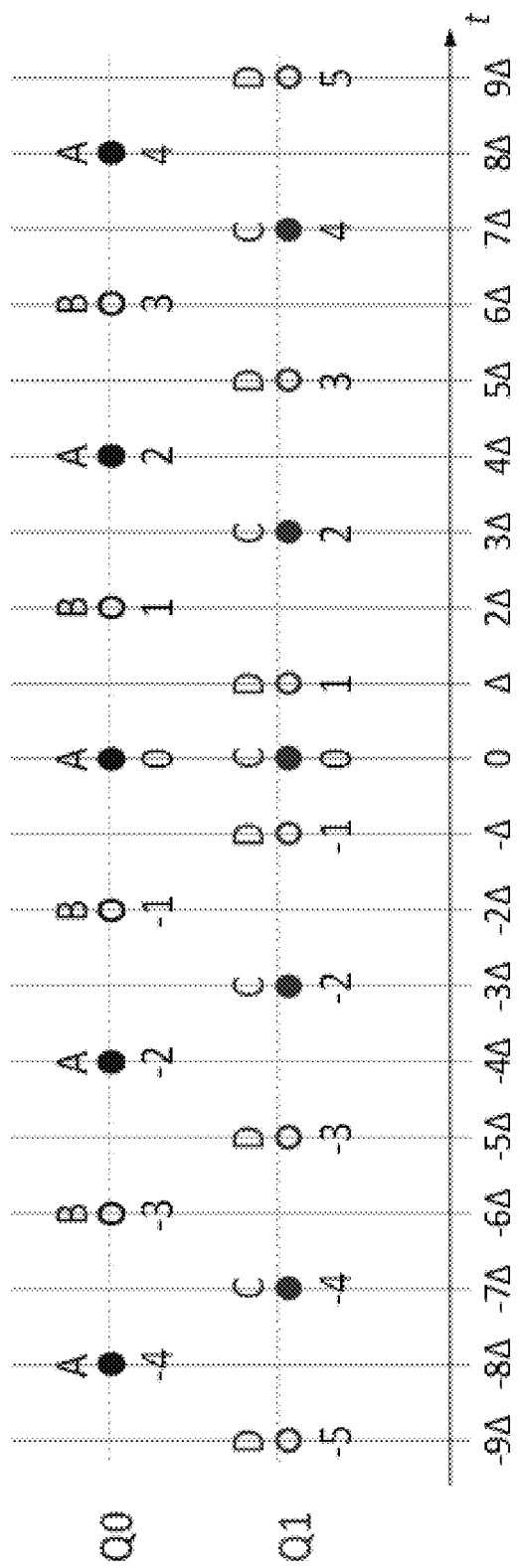
FIG. 3 is an illustration of the two scalar quantizers used in the proposed approach of dependent quantization.

FIG. 3 is an illustration of the two scalar quantizers used in the proposed approach of dependent quantization.

The two scalar quantizers used, denoted by Q0 and Q1, are illustrated in FIG. 3. The location of the available reconstruction levels is uniquely specified by a quantization step size A. The scalar quantizer used (Q0 or Q1) is not explicitly signalled in the bitstream. Instead, the quantizer used for a current transform coefficient is determined by the parities of the transform coefficient levels that precede the current transform coefficient in coding/reconstruction order.

Figure 4:
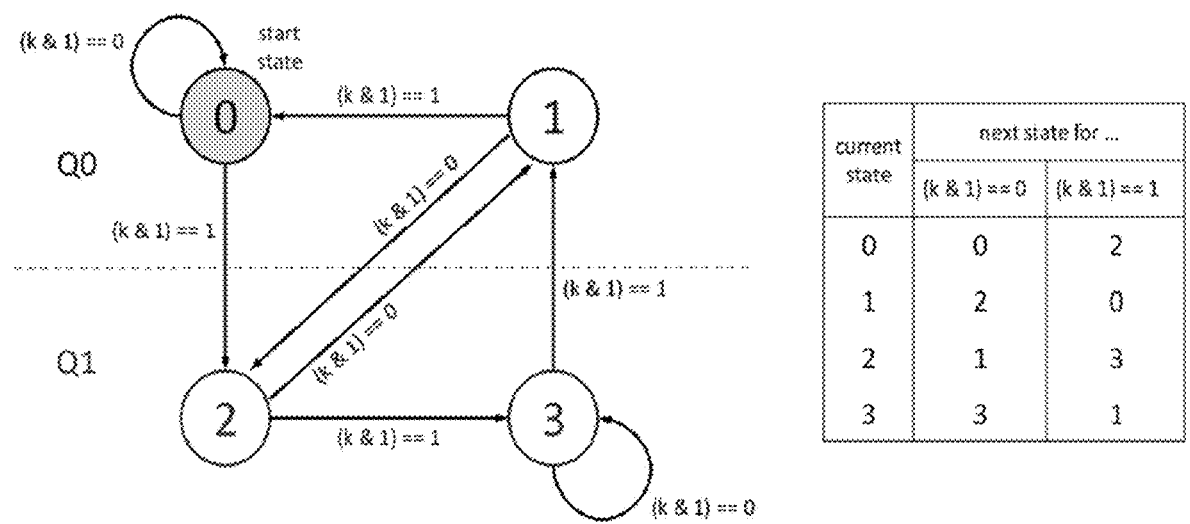
FIG. 4 shows an example state transition and quantizer selection for the proposed dependent quantization.

FIG. 4 shows an example state transition and quantizer selection for the proposed dependent quantization.

As illustrated in FIG. 4, the switching between the two scalar quantizers (Q0 and Q1) is realized via a state machine with four states. The state can take four different values: 0, 1, 2, 3. It is uniquely determined by the parities of the transform coefficient levels preceding the current transform coefficient in coding/reconstruction order. At the start of the inverse quantization for a transform block, the state is set equal to 0. The transform coefficients are reconstructed in scanning order (i.e., in the same order they are entropy decoded). After a current transform coefficient is reconstructed, the state is updated as shown in FIG. 4, where k denotes the value of the transform coefficient level.

It is also supported to signal the default and user-defined scaling matrices. The DEFAULT mode scaling matrices are all flat, with elements equal to 16 for all TB sizes. IBC and intra coding modes currently share the same scaling matrices. Thus, for the case of USER_DEFINED matrices, the number of MatrixType and MatrixType_DC are updated as follows:

MatrixType: 30=2 (2 for intra&IBC/inter)×3 (Y/Cb/Cr components)×5 (square TB size: from 4×4 to 64×64 for luma, from 2×2 to 32×32 for chroma)

MatrixType_DC: 14=2 (2 for intra&IBC/inter×1 for Y component)×3 (TB size: 16×16, 32×32, 64×64)+4 (2 for intra&IBC/inter×2 for Cb/Cr components)×2 (TB size: 16×16, 32×32)

The DC values are separately coded for following scaling matrices: 16×16, 32×32, and 64×64. For TBs of size smaller than 8×8, all elements in one scaling matrix are signalled. If the TBs have size greater than or equal to 8×8, only 64 elements in one 8×8 scaling matrix are signalled as a base scaling matrix. For obtaining square matrices of size greater than 8×8, the 8×8 base scaling matrix is up-sampled (by duplication of elements) to the corresponding square size (i.e. 16×16, 32×32, 64×64). when the zeroing-out of the high frequency coefficients for 64-point transform is applied, corresponding high frequencies of the scaling matrices are also zeroed out. That is, if the width or height of the TB is greater than or equal to 32, only left or top half of the coefficients is kept, and the remaining coefficients are assigned to zero. Moreover, the number of elements signalled for the 64×64 scaling matrix is also reduced from 8×8 to three 4×4 submatrices, since the bottom-right 4×4 elements are never used.

2.1.7 Joint Coding of Chroma Residuals

VTM5 supports a mode where the chroma residuals are coded jointly. When this mode is activated, one single joint residual block is signalled for both Cb and Cr blocks in the same transform unit. Then, the Cb residual is set equal to the signalled residual, and the Cr residual is set by negating the signs of the signalled residual. In other words, at the decoder, to reconstruct the chroma blocks, the signalled joint residual is added to the Cb prediction block and deducted from the Cr prediction block. The joint residual is coded using the regular chroma residual coding process. The flag indicating whether joint residual mode is used is signaled with a flag in the bitstream if both the Cb and the Cr coded block flags (cbf) are 1.

In the PPS and in the slice header, chroma QP offset values are signalled for the joint chroma residual coding mode separate from the usual chroma QP offset values signalled for regular chroma residual coding mode. These chroma QP offset values are used to derive the chroma QP values for those blocks coded using the joint chroma residual coding mode. In the VTM5 encoder, chroma QP offset is set to −1 for the joint chroma residual coding mode and +1 for the regular chroma residual coding mode.

At the encoder side, the average of the Cr residual subtracted from the Cb residual is used as the input to the transform and quantization process:

$$resJoint=(resCb-resCr)/2$$

If chroma scaling of the LMCS mode is active, chroma scaling is applied to the joint residual in the same way as what is done in the regular chroma residual coding mode. That is, the coded joint residual signal is scaled.

2.2 Dequantization and Inverse Transform Design in VVC Draft 6

2.2.1 Dequantization 8.7.3 Scaling Process for Transform Coefficients

Inputs to this process are:
  a luma location (xTbY, yTbY) specifying the top-left sample of the current luma transform block relative to the top-left luma sample of the current picture,
  a variable nTbW specifying the transform block width,
  a variable nTbH specifying the transform block height,
  a variable cIdx specifying the colour component of the current block,
  a variable bitDepth specifying the bit depth of the current colour component.

Output of this process is the (nTbW)×(nTbH) array d of scaled transform coefficients with elements d[x][y].

The quantization parameter qP is derived as follows:
  If cIdx is equal to 0 and transform_skip_flag[xTbY][yTbY] is equal to 0, the following applies:

$$qP=Qp'_Y \tag{8-950}$$

Otherwise, if cIdx is equal to 0 (and transform_skip_flag[xTbY][yTbY] is equal to 1), the following applies:

$$qP=\text{Max}(QpPrimeTsMin,Qp'_Y) \tag{8-951}$$

Otherwise, if TuCResMode[xTbY][yTbY] is equal to 2, the following applies:

$$qP=Qp'_{CbCr} \tag{8-952}$$

Otherwise, if cIdx is equal to 1, the following applies:

$$qP=Qp'_{Cb} \tag{8-953}$$

Otherwise (cIdx is equal to 2), the following applies:

$$qP=Qp'_{Cr} \quad (8\text{-}954)$$

The variable rectNonTsFlag is derived as follows:

$$\text{rectNon}T\!s\text{Flag}=(((\text{Log }2(nTbW)+\text{Log }2(nTbH))\&1)==1\&\&\text{transform\_skip\_flag}[xTbY][yTbY]==0) \quad (8\text{-}955)$$

The variables bdShift, rectNorm and bdOffset are derived as follows:

$$bd\text{Shift}=\text{bitDepth}+((\text{rectNon}T\!s\text{Flag}?1:0)+(\text{Log }2(nTbW)+\text{Log }2(nTbH))/2)-5+\text{dep\_quant\_enabled\_flag} \quad (8\text{-}956)$$

$$bd\text{Offset}=(1<<bd\text{Shift})>>1 \quad (8\text{-}957)$$

The list levelScale[ ][ ] is specified as levelScale[j][k]={{40, 45, 51, 57, 64, 72}, {57, 64, 72, 80, 90, 102}} with j=0 . . . 1, k=0 . . . 5.

The (nTbW)×(nTbH) array dz is set equal to the (nTbW)×(nTbH) array TransCoeffLevel[xTbY][yTbY][cIdx].

For the derivation of the scaled transform coefficients d[x][y] with x=0 . . . nTbW−1, y=0 . . . nTbH−1, the following applies:

The intermediate scaling factor m[x][y] is derived as follows:
If one or more of the following conditions are true, m[x][y] is set equal to 16:
sps_scaling_list_enabled_flag is equal to 0.
transform_skip_flag[xTbY][yTbY] is equal to 1.
Otherwise, the following applies:

$$m[x][y]=\text{ScalingFactor}[\text{Log }2(nTbW)][\text{Log }2(nTbH)][\text{matrixId}][x][y], \text{ with matrixId as specified in Table 7-5} \quad (8\text{-}958)$$

The scaling factor ls[x][y] is derived as follows:
If dep_quant_enabled_flag is equal to 1, the following applies:

$$ls[x][y]=(m[x][y]*\text{levelScale}[\text{rectNon}T\!s\text{Flag}][(qP+1)\%6])<<((qP+1)/6) \quad (8\text{-}959)$$

Otherwise (dep_quant_enabled_flag is equal to 0), the following applies:

$$ls[x][y]=(m[x][y]*\text{levelScale}[\text{rectNon}T\!s\text{Flag}][qP\%6])<<(qP/6) \quad (8\text{-}960)$$

When BdpcmFlag[xTbY][yYbY] is equal to 1, dz[x][y] is modified as follows:
If BdpcmDir[xTbY][yYbY] is equal to 0 and x is greater than 0, the following applies:

$$dz[x][y]=\text{Clip3}(\text{CoeffMin},\text{CoeffMax},dz[x-1][y]+dz[x][y]) \quad (8\text{-}961)$$

Otherwise, if BdpcmDir[xTbY][yYbY] is equal to 1 and y is greater than 0, the following applies:

$$dz[x][y]=\text{Clip3}(\text{CoeffMin},\text{CoeffMax},dz[x][y-1]+dz[x][y]) \quad (8\text{-}962)$$

The value dnc[x][y] is derived as follows:

$$dnc[x][y]=(dz[x][y]*ls[x][y]+bd\text{Offset})>>bd\text{Shift} \quad (8\text{-}963)$$

The scaled transform coefficient d[x][y] is derived as follows:

$$d[x][y]=\text{Clip3}(\text{CoeffMin},\text{CoeffMax},dnc[x][y]) \quad (8\text{-}964)$$

2.2.2 Inverse Transform
8.7.5 Transformation Process for Scaled Transform Coefficients
8.7.5.1 General
Inputs to this process are:
a luma location (xTbY, yTbY) specifying the top-left sample of the current luma transform block relative to the top-left luma sample of the current picture,
a variable nTbW specifying the width of the current transform block,
a variable nTbH specifying the height of the current transform block,
a variable cIdx specifying the colour component of the current block,
an (nTbW)×(nTbH) array d[x][y] of scaled transform coefficients with x=0 . . . nTbW−1, y=0 . . . nTbH−1.

Output of this process is the (nTbW)×(nTbH) array r[x][y] of residual samples with x=0 . . . nTbW−1, y=0 . . . nTbH−1.

When lfnst_idx[xTbY][yTbY] is not equal to 0 and both nTbW and nTbH are greater than or equal to 4, the following applies:

The variables predModeIntra, nLfnstOutSize, log 2LfnstSize, nLfnstSize, and nonZeroSize are derived as follows:

$$\text{predModeIntra}=(c\text{Idx}==0)?\text{IntraPredMode}Y[xTbY][yTbY]:\text{IntraPredMode}C[xTbY][yTbY] \quad (8\text{-}965)$$

$$nL\!fnst\text{OutSize}=(nTbW>=8\&\&nTbH>=8)?48:16 \quad (8\text{-}966)$$

$$\text{log }2L\!fnst\text{Size}=(nTbW>=8\&\&nTbH>=8)?3:2 \quad (8\text{-}967)$$

$$nL\!fnst\text{Size}=1<<\text{log }2L\!fnst\text{Size} \quad (8\text{-}968)$$

$$\text{nonZeroSize}=((nTbW==4\&\&nTbH==4)||(nTbW==8\&\&nTbH==8))?8:16 \quad (8\text{-}969)$$

When intra_mip_flag[xTbComp][yTbComp] is equal to 1 and cIdx is equal to 0, predModeIntra is set equal to INTRA_PLANAR.

When predModeIntra is equal to either INTRA_LT_CCLM, INTRA_L_CCLM, or INTRA_T_CCLM, predModeIntra is set equal to IntraPredModeY[xTbY+nTbW/2][yTbY+nTbH/2].

The wide angle intra prediction mode mapping process as specified in clause 8.4.5.2.6 is invoked with predModeIntra, nTbW, nTbH and cIdx as inputs, and the modified predModeIntra as output.

The values of the list u[x] with x=0 . . . nonZeroSize−1 are derived as follows:

$$xC=\text{DiagScanOrder}[2][2][x][0] \quad (8\text{-}970)$$

$$yC=\text{DiagScanOrder}[2][2][x][1] \quad (8\text{-}971)$$

$$u[x]=d[xC][yC] \quad (8\text{-}972)$$

The one-dimensional low frequency non-separable transformation process as specified in clause 8.7.4.2 is invoked with the input length of the scaled transform coefficients nonZeroSize, the transform output length nTrS set equal to nLfnstOutSize, the list of scaled non-zero transform coefficients u[x] with x=0 . . . nonZeroSize−1, the intra prediction mode for LFNST set selection predModeIntra, and the LFNST index for transform selection in the selected LFNST set lfnst_idx[xTbY][yTbY] as inputs, and the list v[x] with x=0 . . . nLfnstOutSize−1 as output.

The array d[x][y] with x=0 . . . nLfnstSize−1, y=0 . . . nLfnstSize−1 is derived as follows:

If predModeIntra is less than or equal to 34, the following applies:

$$d[x][y]=(y<4)?v[x+(y<<\log 2LfnstSize)]:((x<4)?v[32+x+((y-4)<<2)]:d[x][y]) \quad (8\text{-}973)$$

Otherwise, the following applies:

$$d[x][y]=(x<4)?v[y+(x<<\log 2LfnstSize)]:((y<4)?v[32+y+((x-4)<<2)]:d[x][y]) \quad (8\text{-}974)$$

The variable implicitMtsEnabled is derived as follows:
  If sps_mts_enabled_flag is equal to 1 and one of the following conditions is true, implicitMtsEnabled is set equal to 1:
    IntraSubPartitionsSplitType is not equal to ISP_NO_SPLIT
    cu_sbt_flag is equal to 1 and Max(nTbW, nTbH) is less than or equal to 32
    sps_explicit_mts_intra_enabled_flag is equal to 0 and CuPredMode[0][xTbY][yTbY] is equal to MODE_INTRA and lfnst_idx[x0][y0] is equal to 0 and intra_mip_flag[x0][y0] is equal to 0
  Otherwise, implicitMtsEnabled is set equal to 0.
The variable trTypeHor specifying the horizontal transform kernel and the variable trTypeVer specifying the vertical transform kernel are derived as follows:
  If cIdx is greater than 0, trTypeHor and trTypeVer are set equal to 0.
  Otherwise, if implicitMtsEnabled is equal to 1, the following applies:
    If IntraSubPartitionsSplitType is not equal to ISP_NO_SPLIT or sps_explicit_mts_intra_enabled_flag is equal to 0 and CuPredMode[0][xTbY][yTbY] is equal to MODE_INTRA, trTypeHor and trTypeVer are derived as follows:

$$trTypeHor=(nTbW>=4\&\&nTbW<=16)?1:0 \quad (8\text{-}975)$$

$$trTypeVer=(nTbH>=4\&\&nTbH<=16)?1:0 \quad (8\text{-}976)$$

Otherwise (cu_sbt_flag is equal to 1), trTypeHor and trTypeVer are specified in Table 8-15 depending on cu_sbt_horizontal_flag and cu_sbt_pos_flag.
  Otherwise, trTypeHor and trTypeVer are specified in Table 8-14 depending on tu_mts_idx[xTbY][yTbY].
The variables nonZeroW and nonZeroH are derived as follows:
  If lfnst_idx[xTbY][yTbY] is not equal to 0 and nTbW is greater than or equal to 4 and nTbH is greater than or equal to 4, the following applies:

$$nonZeroW=(nTbW==4||nTbH==4)?4:8 \quad (8\text{-}977)$$

$$nonZeroH=(nTbW==4||nTbH==4)?4:8 \quad (8\text{-}978)$$

Otherwise, the following applies:

$$nonZeroW=\text{Min}(nTbW,(trTypeHor>0)?16:32) \quad (8\text{-}979)$$

$$nonZeroH=\text{Min}(nTbH,(trTypeVer>0)?16:32) \quad (8\text{-}980)$$

The (nTbW)×(nTbH) array r of residual samples is derived as follows:
1. When nTbH is greater than 1, each (vertical) column of scaled transform coefficients d[x][y] with x=0 . . . nonZeroW−1, y=0 . . . nonZeroH−1 is transformed to e[x][y] with x=0 . . . nonZeroW−1, y=0 . . . nTbH−1 by invoking the one-dimensional transformation process as specified in clause 8.7.4.4 for each column x=0 . . . nonZeroW−1 with the height of the transform block nTbH, the non-zero height of the scaled transform coefficients nonZeroH, the list d[x][y] with y=0 . . . nonZeroH−1 and the transform type variable trType set equal to trTypeVer as inputs, and the output is the list e[x][y] with y=0 . . . nTbH−1.
2. When nTbH and nTbW are both greater than 1, the intermediate sample values g[x][y] with x=0 . . . nonZeroW−1, y=0 . . . nTbH−1 are derived as follows:

$$g[x][y]=\text{Clip3}(\text{CoeffMin},\text{CoeffMax},(e[x][y]+64)>>7) \quad (8\text{-}981)$$

3. When nTbW is greater than 1, each (horizontal) row of the resulting array g[x][y] with x=0 . . . nonZeroW−1, y=0 . . . nTbH−1 is transformed to r[x][y] with x=0 . . . nTbW−1, y=0 . . . nTbH−1 by invoking the one-dimensional transformation process as specified in clause 8.7.4.4 for each row y=0 . . . nTbH−1 with the width of the transform block nTbW, the non-zero width of the resulting array g[x][y] nonZeroW, the list g[x][y] with x=0 . . . nonZeroW−1 and the transform type variable trType set equal to trTypeHor as inputs, and the output is the list r[x][y] with x=0 . . . nTbW−1.
4. When nTbW is equal to 1, r[x][y] is set equal to e[x][y] for x=0 . . . nTbW−1, y=0 . . . nTbH−1.

TABLE 8-14

Specification of trTypeHor and trTypeVer depending on tu_mts_idx[x][y]

| tu_mts_idx[x0][y0] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

TABLE 8-15

Specification of trTypeHor and trTypeVer depending on cu_sbt_horizontal_flag and cu_sbt_pos_flag

| cu_sbt_horizontal_flag | cu_sbt_pos_flag | trTypeHor | trTypeVer |
|---|---|---|---|
| 0 | 0 | 2 | 1 |
| 0 | 1 | 1 | 1 |
| 1 | 0 | 1 | 2 |
| 1 | 1 | 1 | 1 |

8.7.4.2 Low Frequency Non-Separable Transformation Process

Inputs to this process are:
  a variable nonZeroSize specifying the transform input length,
  a variable nTrS specifying the transform output length,
  a list of scaled non-zero transform coefficients x[j] with j=0 . . . nonZeroSize−1,
  a variable predModeIntra specifying the intra prediction mode for LFNST set selection,
  a variable lfnstIdx specifying the LFNST index for transform selection in the selected LFNST set.

Output of this process is the list of transformed samples y[i] with i=0 . . . nTrS−1.

The transformation matrix derivation process as specified in clause 8.7.4.3 is invoked with the transform output length nTrS, the intra prediction mode for LFNST set selection predModeIntra, and the LFNST index for transform selection in the selected LFNST set lfnstIdx as inputs, and the (nTrS)×(nonZeroSize) LFNST matrix lowFreqTransMatrix as output.

The list of transformed samples y[i] with i=0 ... nTrS−1 is derived as follows:

$$y[i] = \text{Clip3}(\text{CoeffMin}, \text{CoeffMax}, ((\Sigma_{j=0}^{nonZeroSize-1} \text{lowFreqTransMatrix}[i][j] * x[j]) + 64) >> 7) \quad (8\text{-}982)$$

8.7.4.3 Low Frequency Non-Separable Transformation Matrix Derivation Process Inputs to this process are:
- a variable nTrS specifying the transform output length,
- a variable predModeIntra specifying the intra prediction mode for LFNST set selection,
- a variable lfnstIdx specifying the LFNST index for transform selection in the selected LFNST set.

Output of this process is the transformation matrix lowFreqTransMatrix.

The variable lfnstTrSetIdx is specified in Table 8-16 depending on predModeIntra.

TABLE 8-16

Specification of lfnstTrSetIdx

| predModeIntra | lfnstTrSetIdx |
|---|---|
| predModeIntra < 0 | 1 |
| 0 <= predModeIntra <= 1 | 0 |
| 2 <= predModeIntra <= 12 | 1 |
| 13 <= predModeIntra <= 23 | 2 |
| 24 <= predModeIntra <= 44 | 3 |
| 45 <= predModeIntra <= 55 | 2 |
| 56 <= predModeIntra <= 80 | 1 |

The transformation matrix lowFreqTransMatrix is derived based on nTrS, lfnstTrSetIdx, and lfnstIdx as follows:

If nTrS is equal to 16, lfnstTrSetIdx is equal to 0, and lfnstIdx is equal to 1, the following applies:

lowFreqTransMatrix[m][n] =
{
{ 108, −44, −15,   1, −44,  19,   7,  −1, −11,   6,   2,  −1,   0,  −1,  −1,   0 },
{ −40, −97,  56,  12, −11,  29, −12,  −3,  18,  18, −15,  −3,  −1,  −3,   2,   1 },
{  25, −31,  −1,   7, 100, −16, −29,   1, −54,  21,  14,  −4,  −7,   2,   4,   0 },
{ −32, −39, −92,  51,  −6, −16,  36,  −8,   3,  22,  18, −15,   4,   1,  −5,   2 },
{   8,  −9,  33,  −8, −16, −102,  36,  23,  −4,  38, −27,  −5,   5,  16,  −8,  −6 },
{ −25,   5,  16,  −3, −38,  14,  11,  −3, −97,   7,  26,   1,  55, −10, −19,   3 },
{   8,   9,  16,   1,  37,  36,  94, −38,  −7,   3, −47,  11,  −6, −13, −17,  10 },
{   2,  34,  −5,   1,  −7,  24, −25,  −3,   8,  99, −28,   6, −43,  21,  11 },
{ −16, −27, −39, −109,   6,  10,  16,  24,   3,  19,  10,  24,  −4,  −7,  −2,  −3 },
{  −9, −10, −34,   4,  −9,  −5, −29,   5, −33, −26, −96,  33,  14,   4,  39, −14 },
{ −13,   1,   4,  −9, −30, −17,  −3, −64, −35,  11,  17,  19, −86,   6,  36,  14 },
{   8,  −7,  −5, −15,   7, −30, −28, −87,  31,   4,   4,  33,  61,  −5, −17,  22 },
{  −2,  13,  −6,  −4,  −2,  28, −13, −14,  −3,  37, −15,  −3,  −2, 107, −36, −24 },
{   4,   9,  11,  31,   4,   9,  16,  19,  12,  33,  32,  94,  12,   0,  34, −45 },
{   2,  −2,   8, −16,   8,   5,  28, −17,   6,  −7,  18, −45,  40,  36,  97,  −8 },
{   0,  −2,   0, −10,  −1,  −7,  −3, −35,  −1,  −7,  −2, −32,  −6, −33, −16, −112 }
}, Otherwise, if nTrS is equal to 16, lfnstTrSetIdx is equal to 0, and lfnstIdx is equal to 2, the following applies:

lowFreqTransMatrix[m][n] =
{
{ 119, −30, −22,  −3, −23,  −2,   3,   2, −16,   3,   6,   0,  −3,   2,   1,   0 },
{ −27, −101,  31,  17, −47,   2,  22,   3,  19,  30,  −7,  −9,   5,   3,  −5,  −1 },
{   0,  58,  22, −15, −102,   2,  38,   2,  10, −13,  −5,   4,  14,  −1,  −9,   0 },
{  23,   4,  66, −11,  22,  89,  −2, −26,  13,  −8, −38,  −1,  −9, −20,  −2,   8 },
{ −19,  −5, −89,   2, −26,  76, −11, −17,  20,  13,  18,  −4,   1, −15,   3,   3 },
{ −10,  −1,  −1,   6,  23,  25,  87,  −7, −74,   4,  39,  −5,   0,  −1, −20,  −1 },
{ −17, −28,  12,  −8, −32,  14, −53,  −6, −68, −67,  17,  29,   2,   6,  25,   4 },
{   1, −24, −23,   1,  17,  −7,  52,   9,  50, −92, −15,  27, −15, −10,  −6,   3 },
{  −6, −17,  −2, −111,   7, −17,   8, −42,   9,  18,  16,  25,  −4,   2,  −1,  11 },
{   9,   5,  35,   0,   6,  21,  −9,  34,  44,  −3, 102,  11,  −7,  13,  11, −20 },
{   4,  −5,  −5, −10,  15,  19,  −2,   6,   6, −12, −13,   6,  95,  69, −29, −24 },
{  −6,  −4,  −9, −39,   1,  22,   0, 102, −19,  19, −32,  30, −16, −14,  −8, −23 },
{   4,  −4,   7,   8,   4, −13, −18,   5,   0,   0,  21,  22,  58, −88, −54,  28 },
{  −4,  −7,   0, −24,  −7,   0, −25,   3,  −3, −30,   8, −76, −34,   4, −80, −26 },
{   0,   6,   0,  30,  −6,   1, −13, −23,   1,  20,  −2,  80, −44,  37, −68,   1 },
{   0,   0,  −1,   5,  −1,  −7,   1, −34,  −2,   3,  −6,  19,   5, −38,  11, −115 }
}, Otherwise, if nTrS is equal to 16, lfnstTrSetIdx is equal to 1, and lfnstIdx is equal to 1, the following applies:

lowFreqTransMatrix[m][n] =
{
{ −111,  39,   4,   3,  44,  11, −12,  −1,   7, −16,  −5,   2,   3,  −1,   4,   2 },
{ −47, −27,  15,  −1, −92,  43,  20,  −2,  20,  39, −16,  −5,  10,  −5, −13,   2 },
{ −35, −23,   4,   4, −17, −72,  32,   6, −59,  18,  50,  −6,   0,  40,   0, −13 },
{  13,  93, −27,  −4, −48,  13, −34,   4, −52,  11,   1,  10,   3,  16,  −3,   1 },
{ −11, −27,   1,   2, −47,  −4, −36,  10,  −2, −85,  14,  29, −20,  −2,  57,   4 }

-continued

```
{    0  -35   32   -2   26   60   -3  -17  -82    1  -30    0  -37   21    3   12 }
{  -17  -46  -92   14    7  -10  -39   29  -17   27  -28   17    1  -15  -13   17 }
{    4  -10  -23    4   16   58  -17   26   30   21   67    2  -13   59   13  -40 }
{    5  -20   32   -5    8   -3  -46   -7   -4    2  -15   24  100   44    0    5 }
{   -4   -1   38  -18   -7  -42  -63   -6   33   34  -23   15  -65   33  -20    2 }
{   -2  -10   35  -19    5    8  -44   14  -25   25   58   17    7  -84  -16  -18 }
{    5   13   18   34   11   -4   18   18    5   58   -3   42   -2  -10   85   38 }
{   -5   -7  -34  -83    2   -1   -4  -73    4   20   15  -12    4   -3   44   12 }
{    0    4   -2  -60    5    9   42   34    5  -14    9   80   -5   13  -38   37 1
{   -1    2    7  -57    3   -7    9   68   -9    6  -49  -20    6   -4   36  -64 }
{   -1    0  -12   23    1   -4   17  -53   -3    4  -21   72   -4   -8   -3  -83 }
},
```

Otherwise, if nTrS is equal to 16, lfnstTrSetIdx is equal to 1, and lfnstIdx is equal to 2, the following applies:

lowFreqTransMatrix[m][n] =
```
{
{   88  -55    6   -3  -66   27    9   -2   11   11  -13    1   -2   -7    1    2 }
{  -58  -20   27   -2  -27   75  -29    0   47  -42  -11   11   -9   -3   19   -4 }
{  -51   23  -22    5  -63    3   37   -5    1   64  -35   -4   29  -31  -11   13 }
{  -27  -76   49   -2   40   14    9  -17  -56   36  -25    6   14    3   -6    8 }
{   19   -4  -36   22   52    7   36  -23   28  -17  -64   15   -5  -44   48    9 }
{   29   50   13  -10    1   34  -59    1  -51    4  -16   30   52  -33   24   -5 }
{  -12  -21  -74   43  -13   39   18   -5  -58  -35   27   -5   19   26    6   -5 }
{   19   38  -10   -5   28   66    0   -5   -4   19  -30  -26  -40   28  -60   37 }
{   -6   27   18   -5  -37  -18   12  -25  -44  -10  -38   37  -66   45   40   -7 }
{  -13  -28  -45  -39    0   -5  -39   69  -23   16  -12  -18  -50  -31   24   13 }
{   -1    8   24  -51  -15   -9   44   10  -28  -70  -12  -39   24  -18   -4   51 }
{   -8  -22  -17   33  -18  -45  -57  -27    0  -31  -30   29   -2  -13  -53   49 }
{    1   12   32   51   -8    8   -2  -31  -22    4   46  -39  -49  -67   14   17 }
{    4    5   24   60   -5  -14  -23   38    9    8  -34  -59   24   47   42   28 }
{   -1   -5  -20  -34    4    4  -15  -46   18   31   42   10   10   27   49   78 }
{   -3   -7  -22  -34   -5  -11  -36  -69   -1   -3  -25  -73    5    4    4  -49 }
},
```

35

Otherwise, if nTrS is equal to 16, lfnstTrSetIdx is equal to 2, and lfnstIdx is equal to 1, the following applies:

lowFreqTransMatrix[m][n] =
```
{
{ -112   47   -2    2  -34   13    2    0   15   -7    1    0    8   -3   -1    0 }
{   29   -7    1   -1 -108   40    2    0  -45   13    4   -1    8   -5    1    0 }
{  -36  -87   69  -10  -17  -33   26   -2    7   14  -11    2    6    8   -7    0 }
{   28   -5    2   -2  -29   13   -2    0  103  -36   -4    1   48  -16   -4    1 }
{  -12  -24   15   -3   26   80  -61    9   15   54  -36    2    0   -4    6   -2 }
{   18   53   69  -74   14   24   28  -30   -6   -7  -11   12   -5   -7   -6    8 }
{    5   -1    2    0  -26    6    0    1   45   -9   -1    0 -113   28    8   -1 }
{  -13  -32   18   -2   15   34  -27    7  -25  -80   47   -1  -16  -50   28    2 }
{   -4  -13  -10   19   18   46   60  -48   16   33   60  -48    1    0    5   -2 }
{   15   33   63   89    8   15   25   40   -4   -8  -15   -8   -2   -6   -9   -7 }
{   -8  -24  -27   15   12   41   26  -29  -17  -50  -39   27    0   35  -67   26 }
{   -2   -6  -24   13   -1   -8   37  -22    3   18  -51   22  -23  -95   17   17 }
{   -3   -7  -16  -21   10   24   46   75    8   20   38   72    1    2    1    7 }
{    2    6   10   -3   -5  -16  -31   12    7   24   41  -16  -41  -89   49 }
{    4    8   21   40   -4  -11  -28  -57    5   14   31   70    7   18   32   52 }
{    0    1    4   11   -2   -4  -13  -34    3    7   20   47   -6  -19  -42 -101 }
},
```

Otherwise, if nTrS is equal to 16, lfnstTrSetIdx is equal to 2, and lfnstIdx is equal to 2, the following applies:

lowFreqTransMatrix[m][n] =
```
{
{  -99   39   -1    2   65  -20   -5    0  -15   -2    5   -1    0    3   -1    0 }
{   58   42  -33    3   33  -63   23   -1  -55   32    3   -5   21   -2   -8    3 }
{  -15   71  -44    5  -58  -29   25    3   62   -7   -4   -4  -19    4    0    1 }
{   46    5    4   -6   71  -12  -15    5   52  -38   13   -2  -63   23    3   -3 }
{  -14  -54  -29   29   25   -9   61  -29   27   44  -48    5  -27  -21   12    7 }
```

-continued

| | | | | | | | | | | | | | | | | |
|---|---|---|---|---|---|---|---|---|---|---|---|---|---|---|---|---|
| { | −3 | 3 | 69 | −42 | −11 | −50 | −26 | 26 | 24 | 63 | −19 | −5 | −18 | −22 | 12 | 0 } |
| { | 17 | 16 | −2 | 1 | 38 | 18 | −12 | 0 | 62 | 1 | −14 | 5 | 89 | −42 | 8 | −2 } |
| { | 15 | 54 | −8 | 6 | 6 | 60 | −26 | −8 | −30 | 17 | −38 | 22 | −43 | −45 | 42 | −7 } |
| { | −6 | −17 | −55 | −28 | 9 | 30 | −8 | 58 | 4 | 34 | 41 | −52 | −16 | −36 | −20 | 16 } |
| { | −2 | −1 | −9 | −79 | 7 | 11 | 48 | 44 | −13 | −34 | −55 | 6 | 12 | 23 | 20 | −11 } |
| { | 7 | 29 | 14 | −6 | 12 | 53 | 10 | −11 | 14 | 59 | −15 | −3 | 5 | 71 | −54 | 13 } |
| { | −5 | −24 | −53 | 15 | −3 | −15 | −61 | 26 | 6 | 30 | −16 | 23 | 13 | 56 | 44 | −35 } |
| { | 4 | 8 | 21 | 52 | −1 | −1 | −5 | 29 | −7 | −17 | −44 | −84 | 8 | 20 | 31 | 39 } |
| { | −2 | −11 | −25 | −4 | −4 | −21 | −53 | 2 | −5 | −26 | −64 | 19 | −8 | −19 | −73 | 39 } |
| { | −3 | −5 | −23 | −57 | −2 | −4 | −24 | −75 | 1 | 3 | 9 | −25 | 6 | 15 | 41 | 61 } |
| { | 1 | 1 | 7 | 18 | 1 | 2 | 16 | 47 | 2 | 5 | 24 | 67 | 3 | 9 | 25 | 88 } |
| }, | | | | | | | | | | | | | | | | |

Otherwise, if nTrS is equal to 16, lfnstTrSetIdx is equal to 3, and lfnstIdx is equal to 1, the following applies:

lowFreqTransMatrix[m][n] =
{
| | | | | | | | | | | | | | | | | |
|---|---|---|---|---|---|---|---|---|---|---|---|---|---|---|---|---|
| { | −114 | 37 | 3 | 2 | −22 | −23 | 14 | 0 | 21 | −17 | −5 | 2 | 5 | 2 | −4 | −1 } |
| { | −19 | −41 | 19 | −2 | 85 | −60 | −11 | 7 | 17 | 31 | −34 | 2 | −11 | 19 | 2 | −8 } |
| { | 36 | −25 | 18 | −2 | −42 | −53 | 35 | 5 | 46 | −60 | −25 | 19 | 8 | 21 | −33 | −1 } |
| { | −27 | −80 | 44 | −3 | −58 | 1 | −29 | 19 | −41 | 18 | −12 | −7 | 12 | −17 | 7 | −6 } |
| { | −11 | −21 | 37 | −10 | 44 | −4 | 47 | −12 | −37 | −41 | 58 | 18 | 10 | −46 | −16 | 31 } |
| { | 15 | 47 | 5 | −16 | −44 | 42 | 10 | −80 | 25 | −40 | 21 | −23 | −2 | 3 | −14 } |
| { | 13 | 25 | 79 | −39 | −13 | 10 | 31 | −4 | 49 | 45 | 12 | −8 | 3 | −1 | 43 | 7 } |
| { | 16 | 11 | −26 | 13 | −13 | −74 | −20 | −1 | 5 | −6 | 29 | −47 | 26 | −49 | 54 | 2 } |
| { | −8 | −34 | −26 | 7 | −26 | −19 | 29 | −37 | 1 | 22 | 46 | −9 | −81 | 37 | 14 | 20 } |
| { | −6 | −30 | −42 | −12 | −3 | 5 | 57 | −52 | −2 | 37 | −12 | 6 | 74 | 10 | 6 | −15 } |
| { | 5 | 9 | −6 | 42 | −15 | −18 | −9 | 26 | 15 | 58 | 14 | 43 | 23 | −10 | −37 | 75 } |
| { | −5 | −23 | −23 | 36 | 3 | 22 | 36 | 40 | 27 | −4 | −16 | 56 | −25 | −46 | 56 | −24 } |
| { | 1 | 3 | 23 | 73 | 8 | 5 | 34 | 46 | −12 | 2 | 35 | −38 | 26 | 52 | 2 | −31 } |
| { | −3 | −2 | −21 | −52 | 1 | −10 | −17 | 44 | −19 | −20 | 30 | 45 | 27 | 61 | 49 | 21 } |
| { | −2 | −7 | −33 | −56 | −4 | −6 | 21 | 63 | 15 | 31 | 32 | −22 | −10 | −26 | −52 | −38 } |
| { | −5 | −12 | −18 | −12 | 8 | 22 | 38 | 36 | −5 | −15 | −51 | −63 | −5 | 0 | 15 | 73 } |
| }, | | | | | | | | | | | | | | | | |

Otherwise, if nTrS is equal to 16, lfnstTrSetIdx is equal to 3, and lfnstIdx is equal to 2, the following applies:

lowFreqTransMatrix[m][n] =
{
| | | | | | | | | | | | | | | | | |
|---|---|---|---|---|---|---|---|---|---|---|---|---|---|---|---|---|
| { | −102 | 22 | 7 | 2 | 66 | −25 | −6 | −1 | −15 | 14 | 1 | −1 | 2 | −2 | 1 | 0 } |
| { | 12 | 93 | −27 | −6 | −27 | −64 | 36 | 6 | 13 | 5 | −23 | 0 | −2 | 6 | 5 | −3 } |
| { | −59 | −24 | 17 | 1 | −62 | −2 | −3 | 2 | 83 | −12 | −17 | −2 | −24 | 14 | 7 | −2 } |
| { | −33 | 23 | −36 | 11 | −21 | 50 | 35 | −16 | −23 | −78 | 16 | 19 | 22 | 15 | −30 | −5 } |
| { | 0 | −38 | −81 | 30 | 27 | 5 | 51 | −32 | 24 | 36 | −16 | 12 | −24 | −8 | 9 | 1 } |
| { | 28 | 38 | 8 | −9 | 62 | 32 | −13 | 2 | 51 | −32 | 15 | 5 | −66 | 28 | 0 | −1 } |
| { | 11 | −35 | 21 | −17 | 30 | −18 | 31 | 18 | −11 | −36 | −80 | 12 | 16 | 49 | 13 | −32 } |
| { | −13 | 23 | 22 | −36 | −12 | 64 | 39 | 25 | −19 | 23 | −36 | 9 | −30 | −58 | 33 | −7 } |
| { | −9 | −20 | −55 | −83 | 3 | −2 | 1 | 62 | 8 | 2 | 27 | −28 | 7 | 15 | −11 | 5 } |
| { | −6 | 24 | −38 | 23 | −8 | 40 | −49 | 0 | −7 | 9 | −25 | −44 | 23 | 39 | 70 | −3 } |
| { | 12 | 17 | 17 | 0 | 32 | 27 | 21 | 2 | 67 | 11 | −6 | −10 | 89 | −22 | −12 | 16 } |
| { | 2 | −9 | 8 | 45 | 7 | −8 | 27 | 35 | −9 | −31 | −17 | −87 | −23 | −22 | −19 | 44 } |
| { | −1 | −9 | 28 | −24 | −1 | −10 | 49 | −30 | −8 | −7 | 40 | 1 | 4 | 33 | 65 | 67 } |
| { | 5 | −12 | −24 | −17 | 13 | −34 | −32 | −16 | 14 | −67 | −7 | 9 | 7 | −74 | 49 | 1 } |
| { | 2 | −6 | 11 | 45 | 3 | −10 | 33 | 55 | 8 | −5 | 59 | 4 | 7 | −4 | 44 | −66 } |
| { | −1 | 1 | −14 | 36 | −1 | 2 | −20 | 69 | 0 | 0 | −15 | 72 | 3 | 4 | 5 | 65 } |
| }, | | | | | | | | | | | | | | | | |

Otherwise, if nTrS is equal to 48, lfnstTrSetIdx is equal to 0, and lfnstIdx is equal to 1 the following applies:

lowFreqTransMatrix[m][n] = lowFreqTransMatrixCol0to15[m][n] with
m = 0 . . . 15, n = 0 . . . 15
lowFreqTransMatrixCol0to15 =
{
| | | | | | | | | | | | | | | | | |
|---|---|---|---|---|---|---|---|---|---|---|---|---|---|---|---|---|
| { | −117 | 28 | 18 | 2 | 4 | 1 | 2 | 1 | 32 | −18 | −2 | 0 | −1 | 0 | 0 | 0 } |
| { | −29 | −91 | 47 | 1 | 9 | 0 | 3 | 0 | −54 | 26 | −8 | 3 | 0 | 1 | 0 | 0 } |
| { | −10 | 62 | −11 | −8 | −2 | −2 | −1 | −1 | −95 | 3 | 32 | 0 | 4 | 0 | 2 | 0 } |

-continued

```
{  -15   15  -10   -2    1    0    1    0   10  112  -20  -17   -4   -4   -1   -2 }
{   32   39   92  -44    4  -10    1   -4   26   12  -15   13   -5    2   -2    0 }
{  -10    1   50  -15    2   -3    1   -1  -28  -15   14    6    1    1    1    0 }
{    1  -33  -11  -14    7   -2    2    0   29  -12   37   -7   -4    0   -1    0 }
{    0    6   -6   21   -4    2    0    0  -20  -24 -104   30    5    5    1    2 }
{  -13  -13  -37 -101   29  -11    8   -3  -12  -15  -20    2  -11    5   -2    1 }
{    6    1  -14  -36    9   -3    2    0   10    9  -18   -1   -3    1    0    0 }
{  -12   -2  -26  -12   -9    2   -1    1   -3   30    4   34   -4    0   -1    0 }
{    0   -3    0   -4  -15    6   -3    1   -7  -15  -28  -86   19   -5    4   -1 }
{   -1    9   13    5   14   -2    2   -1   -8    3   -4  -62    4    1    1    0 }
{    6    2   -3    2   10   -1    2    0    8    3   -1  -20    0    1    0    0 }
{    6    9   -2   35  110  -22   11   -4   -2    0   -3    1  -18   12   -3    2 }
{   -1    7   -2    9  -11    5   -1    1   -7    2  -22    4  -13    0   -1    0 }
},
``` lowFreqTransMatrix[m][n] = lowFreqTransMatrixCol16to31[m − 16 ][n] with m = 16 . . . 31, n = 0 . . . 15
lowFreqTransMatrixCol16to31 =

```
{
{   14   -1   -3    0   -1    0    0    0    2    0    0    0    0    0    0    0 }
{   33    5   -9   -1   -2    0   -1    0   -3    3    0    0    0    0    0    0 }
{   32  -30   -4    4   -1    1    0    0    6    2   -5    0    0    0    0    0 }
{  -20  -26   31    1    0    0    0    0    2  -16   -1    6    0    1    0    0 }
{   29  -16  -22    8    0    1    0    1  -20    6    4   -3    1    0    0    0 }
{  -99   -4    9    5    5    2    2    1   44  -10  -11    1   -2    0   -1    0 }
{    6  -99    3   26   -1    5    0    2   14   30  -27   -2    1   -1    0   -1 }
{   -7  -46   10  -14    7    0    1    0    9   21    7   -6   -2   -1    0   -1 }
{  -12   10   26   12   -6    0   -1    0  -32   -2   11    3    3   -1    1    0 }
{   38   26  -13   -1   -5   -1   -1    0  102    3  -14   -1   -5   -1   -2    0 }
{  -30    3  -92   14   19    0    3    0  -11   34   21  -33    1   -2    0   -1 }
{   -5  -17  -41   42   -6    2   -1    1   -1  -40   37   13   -4    2   -1    1 }
{  -12   23   16  -11  -17    0   -1    0  -11   97   -3   -3    0   -6    0   -2 }
{   -4    4  -16    0   -2    0    1    0   34   23    6   -7   -4   -2   -1    0 }
{   -5   -4  -22    8  -25    3    0    0   -3  -21    2   -3    9   -2    1    0 }
{    0   28    0   76    4   -6    0   -2  -13    5  -76   -4   33   -1    3    0 }
},
``` lowFreqTransMatrix[m][n] = lowFreqTransMatrixCol32to47[m − 32][n] with m = 32 . . . 47, n = 0 . . . 15
lowFreqTransMatrixCol32to47 =

```
{
{    3    0   -1    0    1    0    0    0    1    0    0    0    1    0    0    0 }
{    7    2   -2    0   -1    1    0    0    2    1   -1    0    0    0    0    0 }
{    6   -3    0    0    2    0   -1    0    2   -1    0    0    1    0    0    0 }
{    1   -4    0    0    0   -3    0    1    0   -1    0    0    0   -2    0    0 }
{    1   -4   -3    2   -4    1    0    0    1   -1   -2    1   -2    0    0    0 }
{   -3    4   -3    0    8   -1   -2    0   -2    1   -1    0    4    0   -1    0 }
{   -6    6    6   -3    1    3   -3    0   -1    1    1    0    0    1   -1    0 }
{    2    2    5   -2    0    3    4   -1    0    0    1    0    0    1    2   -1 }
{   11   -5   -1    6   -4    2    1    0    3   -1    1    2   -1    0    0    0 }
{  -29   10   10    0   10   -4   -1    1   -7    1    2    1    2   -1    0    0 }
{   -9   -4   18    3    2    0    0   -2   -1   -1    3    0    0    0    0   -1 }
{  -10   13   -1   -4    4   -4    3    4   -2    2   -1   -1    1   -1    1    2 }
{  -21   -5   23    0    2   -2   -1    6   -3   -3    1    0    0    0    0    2 }
{  108   -5  -30    6  -27   10    7   -2   11   -3   -1    1   -4    1    0    1 }
{   -7    1    3   -5    3    0   -1    0    0    1    0   -1    1    0    0    0 }
{    9   18   -3  -35   -4   -1    6    1    1    2    0   -3   -1    0    2    0 }
},
```

Otherwise, if nTrS is equal to 48, lfnstTrSetIdx is equal to 0, and lfnstIdx is equal to 2 the following applies:

lowFreqTransMatrix[m][n] = lowFreqTransMatrixCol0to15[m][n] with m = 0 . . . 15, n = 0 . . . 15
lowFreqTransMatrixCol0to15 =

```
{
{ -108   48    9    1    1    1    0    0   44   -6   -9   -1   -1    0   -1    0 }
{   55   66  -37   -5   -6   -1   -2    0   67  -30  -20    4   -2    0   -1    0 }
{    2   86  -21  -13   -4   -2   -1   -1  -88    5    6    4    5    1    1    0 }
{  -24  -21  -38   19    0    4   -1    2  -23  -89   31   20    2    3    1    1 }
{    9   20   98  -26   -3   -5    0   -2   -9  -26   15  -16    2    0    1    0 }
{  -21   -7  -37   10    2   -1    1    0  -10   69   -5   -7   -2   -2    0   -1 }
{  -10  -25    4  -17    8   -2    2   -1  -27  -17  -71   25    8    2    1    1 }
{    2    5   10   64   -9    4   -3    1   -4    8   62    3  -17    1   -2    0 }
{  -11  -15  -28  -97    6   -1    4   -1    7    3   57  -15   10   -2    0   -1 }
{    9   13   24   -6    7   -2    1   -1   16   39   20   47   -2   -2   -2    0 }
{   -7   11   12    7    2   -1    0   -1  -14   -1  -24   11    2    0    0    0 }
{    0    0    7   -6   23   -3    3   -1    5    1   18   96   13   -9   -1   -1 }
```

-continued

| { | −2 | −6 | −1 | −10 | 0 | 1 | 1 | 0 | −7 | −2 | −28 | 20 | −15 | 4 | −3 | 1 | } |
| { | −1 | 6 | −16 | 0 | 24 | −3 | 1 | −1 | 2 | 6 | 6 | 16 | 18 | −7 | 1 | −1 | } |
| { | −5 | −6 | −3 | −19 | −104 | 18 | −4 | 3 | 0 | 6 | 0 | 35 | −41 | 20 | −2 | 2 | } |
| { | −1 | −2 | 0 | 23 | −9 | 0 | −2 | 0 | 1 | 1 | 8 | −1 | 29 | 1 | 1 | 0 | } |
| }, | lowFreqTransMatrix[m][n] = lowFreqTransMatrixCol16to31[m − 16][n] with
m = 16 ... 31, n = 0 ... 15
lowFreqTransMatrixCol16to31 =
{

| { | 9 | −9 | −1 | 1 | 0 | 0 | 0 | 0 | 3 | −1 | 1 | 0 | 0 | 0 | 0 | 0 | } |
| { | −31 | −19 | 14 | 4 | 1 | 1 | 1 | 0 | −6 | 3 | 5 | −2 | 0 | 0 | 0 | 0 | } |
| { | 14 | −5 | 0 | 3 | 0 | 0 | 0 | 0 | 10 | −5 | −2 | 0 | −1 | 0 | 0 | 0 | } |
| { | −30 | 26 | 36 | −8 | −2 | −2 | 0 | −1 | 14 | 18 | −7 | −9 | −1 | −1 | 0 | 0 | } |
| { | −61 | −3 | −2 | 3 | 7 | 1 | 1 | 0 | 12 | 16 | −6 | −1 | 0 | −1 | 0 | 0 | } |
| { | −93 | 2 | 19 | 0 | 3 | 0 | 2 | 0 | 17 | 4 | 0 | 0 | −1 | 0 | 0 | 0 | } |
| { | −4 | −66 | 28 | 36 | −5 | 3 | 0 | 1 | −10 | 20 | 33 | −13 | −8 | 0 | 0 | −1 | } |
| { | −3 | −75 | 5 | −14 | 1 | 4 | 0 | 1 | −36 | 3 | 18 | −4 | 4 | 0 | 1 | 0 | } |
| { | −1 | −27 | 13 | 6 | 1 | −1 | 0 | 0 | −34 | −6 | 0 | 3 | 4 | 1 | 2 | 0 | } |
| { | 28 | 23 | 76 | −5 | −25 | −3 | −3 | −1 | 6 | 36 | −7 | −39 | −4 | −1 | 0 | −1 | } |
| { | −20 | 48 | 11 | −13 | −5 | −2 | 0 | −1 | −105 | −19 | 17 | 0 | 6 | 2 | 3 | 0 | } |
| { | −21 | −7 | −42 | 14 | −24 | −3 | 0 | 0 | 11 | −47 | −7 | 3 | −5 | 9 | 1 | 2 | } |
| { | −2 | −32 | −2 | −66 | 3 | 7 | 1 | 2 | −11 | 13 | −70 | 5 | 43 | −2 | 3 | 0 | } |
| { | −3 | 11 | −63 | 9 | 4 | −5 | 2 | −1 | −22 | 94 | −4 | −6 | −4 | −4 | 1 | −2 | } |
| { | −2 | 10 | −18 | 16 | 21 | 3 | −2 | 0 | −2 | 11 | 6 | −10 | 6 | −3 | −1 | 0 | } |
| { | 3 | −6 | 13 | 76 | 30 | −11 | −1 | −2 | −26 | −8 | −69 | 7 | −9 | −7 | 3 | −1 | } |
| }, | lowFreqTransMatrix[m][n] = lowFreqTransMatrixCol32to47[m − 32][n] with
m = 32 ... 47, n = 0 ... 15
lowFreqTransMatrixCol32to47 =
{

| { | 1 | −1 | 0 | 0 | 1 | 0 | 0 | 0 | 0 | −1 | 0 | 0 | 0 | 0 | 0 | 0 | } |
| { | −7 | −1 | 1 | 0 | −1 | 1 | 1 | 0 | −2 | −1 | 1 | 0 | 0 | 0 | 0 | 0 | } |
| { | 6 | −5 | 0 | 1 | 2 | −1 | 0 | 0 | 1 | −1 | 0 | 0 | 1 | 0 | 0 | 0 | } |
| { | 1 | 3 | −2 | −1 | 3 | 2 | −2 | −1 | 0 | 1 | 0 | 0 | 1 | 1 | −1 | 0 | } |
| { | 2 | 0 | −8 | 1 | 3 | 1 | −1 | 1 | 0 | −1 | −2 | 0 | 1 | 0 | −1 | 0 | } |
| { | 5 | −4 | −2 | 0 | 4 | −2 | 0 | 1 | 0 | 0 | 0 | 0 | 2 | −1 | 0 | 0 | } |
| { | 3 | 6 | −3 | −7 | −1 | 3 | 3 | −1 | 1 | 0 | −1 | 0 | 0 | 1 | 1 | −1 | } |
| { | 1 | 14 | −2 | −8 | −2 | 1 | −3 | 0 | 2 | 2 | −1 | 2 | 0 | 1 | −1 | 0 | } |
| { | −2 | 8 | 1 | 5 | −2 | 0 | −3 | 1 | 1 | 1 | 0 | 2 | −1 | 0 | −1 | 0 | } |
| { | 2 | −4 | −18 | −3 | −1 | −1 | −2 | −2 | 1 | −2 | −2 | 0 | 0 | 0 | −1 | −1 | } |
| { | −14 | 8 | 8 | 2 | 1 | 2 | −1 | −2 | 3 | 0 | −1 | 0 | 0 | 0 | 0 | 0 | } |
| { | 0 | −1 | 19 | −1 | 1 | 0 | −1 | −6 | −1 | 1 | 2 | 0 | 1 | 0 | 0 | −2 | } |
| { | 8 | −14 | −3 | 43 | −1 | 2 | 7 | −1 | 1 | −2 | 1 | 3 | −1 | 1 | 1 | 0 | } |
| { | 10 | 23 | −19 | −5 | 0 | −6 | −4 | 6 | 3 | −2 | 1 | 1 | 0 | −1 | 0 | 0 | } |
| { | −1 | 5 | −1 | −6 | −1 | −1 | −1 | −1 | −1 | 0 | 0 | 0 | 0 | 0 | 0 | −1 | } |
| { | −10 | −34 | −25 | 13 | −1 | 0 | 11 | 5 | 1 | −1 | 1 | −2 | 0 | 0 | 2 | 0 | } |
| }, |

Otherwise, if nTrS is equal to 48, lfnstTrSetIdx is equal to 1, and lfnstIdx is equal to 1 the following applies:

lowFreqTransMatrix[m][n] = lowFreqTransMatrixCol0to15[m][n] with
m = 0 ... 15, n = 0 ... 15
lowFreqTransMatrixCol0to15 =
{

| { | 110 | −49 | −3 | −4 | −1 | −1 | 0 | −1 | −38 | −1 | 10 | 0 | 2 | 0 | 1 | 0 | } |
| { | −43 | −19 | 17 | −1 | 3 | 0 | 1 | 0 | −98 | 46 | 14 | −1 | 2 | 0 | 1 | 0 | } |
| { | −19 | 17 | −7 | 3 | −2 | 1 | −1 | 0 | −32 | −59 | 29 | 3 | 4 | 0 | 2 | 0 | } |
| { | −35 | −103 | 39 | 1 | 7 | 0 | 2 | 0 | 38 | −13 | 25 | −6 | 1 | −1 | 0 | 0 | } |
| { | 9 | 5 | −6 | −1 | −1 | 0 | −1 | 0 | 42 | 4 | 21 | −11 | 1 | −3 | 1 | −1 | } |
| { | −5 | −5 | −28 | 9 | −3 | 2 | −1 | 1 | −20 | −78 | 22 | 16 | 1 | 3 | 0 | 1 | } |
| { | 14 | 17 | 27 | −12 | 1 | −3 | 1 | −1 | 8 | 19 | −13 | 4 | −2 | 1 | −1 | 0 | } |
| { | 7 | 35 | 17 | −4 | −1 | 0 | 0 | 0 | 3 | 8 | 54 | −17 | 1 | −2 | 1 | −1 | } |
| { | −13 | −27 | −101 | 24 | −8 | 6 | −3 | 2 | 11 | 43 | 6 | 28 | −6 | 3 | −1 | 1 | } |
| { | −11 | −13 | −3 | −10 | 3 | −1 | 1 | 0 | −19 | −19 | −37 | 8 | 4 | 2 | 0 | 1 | } |
| { | −4 | −10 | −24 | −11 | 3 | −2 | 0 | −1 | −6 | −37 | −45 | −17 | 8 | −2 | 2 | −1 | } |
| { | −2 | 1 | 13 | −17 | 3 | −5 | 1 | −2 | 3 | 0 | −55 | 22 | 6 | 1 | 1 | 0 | } |
| { | 3 | 1 | 5 | −15 | 1 | −2 | 1 | −1 | 7 | 4 | −7 | 29 | −1 | 2 | −1 | 1 | } |
| { | −4 | −8 | −1 | −50 | 6 | −4 | 2 | −2 | −1 | 5 | −22 | 20 | 6 | 1 | 0 | 0 | } |
| { | 5 | −1 | 26 | 102 | −13 | 12 | −4 | 4 | −4 | −2 | −40 | −7 | −23 | 3 | −5 | 1 | } |
| { | −5 | −6 | −27 | −22 | −12 | 0 | −3 | 0 | −5 | 8 | −20 | −83 | 0 | 0 | 0 | 0 | } |
| }, | lowFreqTransMatrix[m][n] = lowFreqTransMatrixCol16to31[m − 16][n] with
m = 16 ... 31, n = 0 ... 15
lowFreqTransMatrixCol16to31 =
{

```
{   -9   13    1   -2    0    0    0    0   -4    2   -3    0    0    0    0    0 }
{   26   26  -15   -3   -2   -1   -1    0   11   -7   -9    2    0    0    0    0 }
{  -72   43   34   -9    3   -2    1   -1   13   36  -18  -10    0   -2    0   -1 }
{   -1    7    6   -7    1   -1    0    0  -13   14    2   -4    2   -1    0    0 }
{   21   70  -32  -21    0   -4   -1   -1   34  -26  -57   11    4    2    0    1 }
{   80   -6   25   -5   -4   -1   -1    0    6  -24    7   -9    0    0    0    0 }
{   48   -1   48  -15   -4   -2   -1   -1    1   60  -28  -42    5   -6    1   -2 }
{   10   14  -11  -34    4   -4    1   -1  -80   -7   -6    2   15    0    3    0 }
{   -3   14   21  -12   -7   -2   -1   -1  -23   10   -4  -12    3    0    1    0 }
{  -12  -30    3   -9    5    0    1    0  -56   -9  -47    8   21    1    4    1 }
{   17   14  -58   14   15    0    2    0  -10   34   -7   28    4   -1    1    0 }
{    8   74   21   40  -14    0   -2    0  -36   -8   11  -13  -23    1   -3    0 }
{    8    3   12  -14   -9   -1   -1    0    4   29  -15   31   10    4    1    1 }
{  -16  -15   18  -29  -11    2   -2    1   40  -45  -19  -22   31    2    4    1 }
{   -1    5    8  -23    7    2    1    1   10  -11  -13   -3   12   -3    2    0 }
{    9    7   24  -20   41    3    6    1   15   20   12   11   17   -9    1   -2 }
},
``` lowFreqTransMatrix[m][n] = lowFreqTransMatrixCol32to47[m − 32][n] with
m = 32 ... 47, n = 0 ... 15
lowFreqTransMatrixCol32to47 =

```
{
{   -2    2    0    1   -1    1    0    0   -1    1    0    0   -1    0    0    0 }
{    9   -3   -1    2    3   -3    0    0    4   -1    0    0    2   -1    0    0 }
{    3    0  -12    3    6    1   -3    2    1   -1   -2    0    3    1   -1    1 }
{   -2   11   -6   -2   -2    4   -3    0    0    3   -2    0   -1    1   -1    0 }
{   -4  -32    5   24    1   -6   12    4   -3   -2    4   -2    0   -1    0    0 }
{   -7    3   13   -4   -3    5    1   -5   -2    3    1   -2   -1    2   -1   -2 }
{   11  -11  -51   11   -2  -10   -2   13    2   -6   -4    4   -2   -3    2    2 }
{  -16   46    1    3    2    7  -24    0    2   -2   -5    8    1   -1   -2    2 }
{    2    9  -10    0    1   -5   -4    4    2   -2    2    2    0   -2    1    0 }
{  -11  -30   10   59   -2    8   41    8    2    5    6   -7   -1    3    5   -2 }
{   23   34  -31    4   10  -22  -30   22    4  -15    9   20    2   -5    9    4 }
{  -36    6   16  -14    2   19   -4  -12   -1    0   -7   -3    0    2   -2   -1 }
{   61   22   55   14   13    3   -9  -65    1  -11  -21   -7    0    0   -1    3 }
{  -25   41    0   12    9    7  -42   12   -3  -14    2   28    5    1    6    2 }
{   -9   23    4    9   14    9  -14   -4    0  -12   -7    6    3    0    6    3 }
{  -26   -1   18   -1  -12   32    3  -18   -5   10  -25   -5   -2    1   -8   10 }
},
```

Otherwise, if nTrS is equal to 48, lfnstTrSetIdx is equal to 1, and lfnstIdx is equal to 2 the following applies:

lowFreqTransMatrix[m][n] = lowFreqTransMatrixCol 0 to15[m][n] with m = 0 ... 15, n = 0 ... 15 lowFreqTransMatrixCol 0 to 15 =

```
{
{  80  -49    6   -4    1   -1    1   -1  -72   36    4    0    1    0    0    0 }
{ -72   -6   17    0    3    0    1    0  -23   58  -21    2   -3    1   -1    0 }
{ -50   19  -15    4   -1    1   -1    1  -58   -2   30   -3    4   -1    2    0 }
{ -33  -43   28   -7    4   -2    2   -1  -38   11   -8    4    1    1    0    0 }
{  10   66  -21   -3   -3    0   -1    0  -53  -41   -2   16   -1    4   -1    1 }
{  18   14   13   -9    2   -2    1   -1   34   32  -31   12   -5    2   -2    1 }
{  21   66   -1    9   -4    2   -1    1  -21   41  -30  -10    0   -2    0   -1 }

{   1   -6  -24   17   -5    3   -2    1   24   10   39  -21    5   -4    2   -1 }
{   9   33  -24    1    4    0    1    0    6   50   26    1  -10    0   -2    0 }
{  -7   -9  -21   14   -3    3   -1    1  -23  -28    0   -5   -1    0    0    0 }
{   6   30   69  -18    5   -4    3   -1   -3  -11  -34  -16    9   -4    2   -1 }
{   1   -8   24   -3    7   -2    2   -1   -6  -51   -6   -4   -5    0   -1    0 }
{   4   10    4   17   -9    4   -2    1    5   14   32  -15    9   -3    2   -1 }
{  -3   -9  -23   10  -10    3   -3    1   -5  -14  -16  -27   13   -5    2   -1 }
{   2   11   22    2    9   -2    2    0   -6   -7   20  -32   -3   -4    0   -1 }
{   2   -3    8   14   -5    3   -1    1   -2  -11    5  -18    8   -3    2   -1 }
},
``` lowFreqTransMatrix[m][n] = lowFreqTransMatrixCol 16 to 31[m − 16][n] with m = 16 ... 31, n = 0 ... 15

-continued lowFreqTransMatrixCol 16 to 31 =

{
{ 26    0  -102   2   -2   1   -1   0   -7   -9   6    1    0    0    0    0 }
{ 55  -46   -1    6   -2   1   -1   0  -22    7  17   -7    2   -1    1    0 }
{  6   57  -34    0   -2   0   -1   0   34  -48  -2   14   -4    3   -1    1 }
{ -55  24   26   -5    2  -1    1   0   15   46 -40   -1   -1    0   -1    0 }
{ 36   -5   41  -20    3  -3    1  -1  -30   26 -32   -3    7   -2    2   -1 }
{ 40    4   -4   -9   -3  -2   -1  -1   27  -31 -43   19   -2    3   -1    1 }
{ -35 -17   -3   26   -6   5   -2   2   56    3  18  -25   -1   -2   -1   -1 }
{ 33   32  -30    4   -3  -1   -1   0   -4   13 -16  -10    0   -1    0    0 }

{ -27    1  -28  -21    6  -5    3   -2  -23   36   -2   40  -17    4   -3    1 }
{ -36  -59  -24   14    4   2    1    1  -23  -26   23   26   -3    5    0    2 }
{ -16   35  -35   30   -9   3   -2    1  -57  -13    6    4   -5    5   -1    1 }
{  38   -1    0   25    6   2    1    1   47   20   35    1  -27    1   -5    0 }
{   7   13   19   15   -8   1   -1    0    3   25   30  -18    1   -2    0   -1 }
{  -1  -13  -30   11   -5   2   -1    0   -5   -8  -22  -16   10    0    1    0 }
{  13   -5  -28    6   18  -4    3   -1  -26   27  -14    6  -20    0   -2    0 }
{  12  -23  -19   22    2   0    1    0   23   41   -7   35  -10    4   -1    1 }
}, lowFreqTransMatrix[m][n] = lowFreqTransMatrixCol 32 to 47[m − 32][n] with m = 32 ... 47, n = 0 ... 15 lowFreqTransMatrixCol 32 to 47 =

{
{   3    5   -1   -2   -2   -2   -1    1    1    1    0    0   -1   -1    0    0 }
{   9    5  -12    1   -3   -4    4    2    4    1   -2   -1   -1   -1    1    0 }
{ -10    7   21  -10    6    1  -11    0   -1   -1    4    2    3    0   -2   -1 }
{  17  -38    1   17   -3   11   15  -11    3   -1  -10    1    0    1    3    2 }
{  15   -8    1   17   -1   -2    4   -8    2    0   -1    3    0    0    0   -1 }
{   7  -49   52   10  -11   22    7  -26   -1   -6   -9    6   -2    2    4   -2 }
{ -15  -13  -27    9    9   -6   20    5   -3    2   -6   -9    3   -3    1    5 }

{  24  -26  -37   33    5  -32   55   -5   -7   22  -14  -22    1   -9   -3   13 }
{  43  -13    4  -41  -19   -2  -24   17   11   -4    8    4   -3   -3   -3   -3 }
{  10  -26   38    7  -12   11   42  -22   -5   20  -14  -15   -1   -2    1    6 }
{  28   10    4    7    0  -15    7  -10   -1    7   -2    2    1   -3    0    0 }
{  37  -37   -9  -47  -28    5    0   18    8    6    0   -8   -4   -3   -3    1 }
{  11   24   22  -11   -3   37  -13  -58   -5   12  -63   26    9  -15   11    8 }
{   0  -29  -27    6  -27  -10  -30    9   -3  -10   -7   77    9  -13   45   -8 }
{ -76  -26   -4   -7   12   51    5   24    7  -17  -16  -12   -5    4    2   13 }
{   5    7   23    5   69  -38   -8  -32  -15  -31   24   11    2   18   11  -15 }
},

Otherwise, if nTrS is equal to 48, lfnstTrSetIdx is equal to 2, and lfnstIdx is equal to 1 the following applies:

lowFreqTransMatrix[m][n] = lowFreqTransMatrixCol 0 to15[m][n] with m = 0 ... 15, n = 0 ... 15 lowFreqTransMatrixCol 0 to 15 =

{
{ -121   33    4    4    1    2    0    1   -1   -1    1    0    0    0    0    0 }
{    0   -2    0    0    0    0    0    0  121  -23   -7   -3   -2   -1   -1    0 }
{  -20   19   -5    2   -1    1    0    0   16    3   -2    0    0    0    0    0 }
{   32  108  -43   10   -9    3   -3    1    4   19   -7    1   -1    0    0    0 }
{   -3    0   -1    0    0    0    0    0  -29   11   -2    1    0    0    0    0 }
{   -4  -12   -3    1   -1    0    0    0   19  105  -31    7   -6    1   -2    0 }
{    7    1    2    0    0    0    0    0    4    3   -2    0    0    0    0    0 }
{   -8  -31   14   -4    3   -1    1    0    9   43    0    1   -1    0    0    0 }

```
{ -15 -43 -100  23 -12  6 -4  2 -6 -17 -48  10 -5  2 -1  1 }
{  -3   1    2   0   0  0  0  0 -6   3   1   0  0  0  0  0 }
{  -1  -6   -3   2  -1  0  0  0 -6 -35   9   0  2  0  0  0 }
{  -5 -14  -48   2  -5  1 -2  0 10  24  99 -17 10 -4  3 -1 }
{  -2   0    2   0   0  0  0  0 -2   0   1   0  0  0  0  0 }
{  -2 -10   -4   0   0  0  0  0  3  11  -1  -1  0  0  0  0 }
{  -2  -3  -25  -2  -3  0 -1  0 -1  -3  -1   4 -2  2  0  1 }
{   4  -4   28 103 -42 24 -9  7  1   2   4   0  3 -1  0  0 }
},
``` lowFreqTransMatrix[*m*][*n*] = lowFreqTransMatrixCol 16 to 31[*m* − 16][*n*] with *m* = 16 … 31, *n* = 0 … 15 lowFreqTransMatrixCol 16 to 31 =

```
{
{   24   -5  -1 -1   0  0  0  0    5  -1   0  0  0  0  0  0 }
{   17    1  -2  0   0  0  0  0  -27   4   2  0  0  0  0  0 }
{ -120   14   8  1   3  1  1  0  -18  -2   3  0  1  0  0  0 }
{   11  -30   9 -2   1 -1  0  0    0  -8   2  0  0  0  0  0 }
{   12    7  -1  0   0  0  0  0 -117  12   9  1  3  0  1  0 }
{    9   46  -6  0   0  0  0  0    8 -29   9 -3  1  0  0  0 }
{   22   -8   1 -1   0  0  0  0  -28  -9   4  0  1  0  0  0 }
{  -13 -105  17 -2   2  0  0  0   -8 -25  -3  0  0  0  0  0 }
```

```
{  1  -5  19  -6   3 -1  1  0   2    7  15 -3  1 -1  0  0 }
{  0   3  -2   0   0  0  0  0 -20    8  -2  0  0  0  0  0 }
{  1  -6  11  -2   2  0  1  0  -9 -100  17 -1  1  0  0  0 }
{  4  14  32   0   2  0  1  0  -4    0 -39  6 -4  1 -1  0 }
{ -1  -1   1  -1   0  0  0  0  -1   -4   2  0  0  0  0  0 }
{ -6 -40 -15   6  -2  1  0  0   5   57  -6  2  0  0  0  0 }
{ -7  -8 -97  17  -9  3 -3  1  -8  -26 -61 -1 -3 -1 -1 -1 }
{ -1   0  -9 -42  17 -9  3 -2  -1    1 -14  6 -4  2 -1  0 }
},
``` lowFreqTransMatrix[*m*][*n*] = lowFreqTransMatrixCol 32 to 47[*m* − 32][*n*] with *m* = 32 … 47, *n* = 0 … 15 lowFreqTransMatrixCol 32 to 47 =

```
{
{   3  -1   0  0   2 -1  0  0   2 -1  0  1   0  0  0 }
{ -12   2   1  0  -5  1  0  0  -1  0  0  0  -2  0  0 0 }
{  17  -3  -1  0   6 -1 -1  0   2  0  0  0   2  0  0 0 }
{  -7  -1   2  0  -3 -1  1  0  -2 -2  1  0   0  0  0 0 }
{ -32  -3   3  0  12 -2 -1  0   7  0  0  0   1  0  0 0 }
{  -3 -19   3  0  -4 -6  1  0   0  0  0  0  -1  0  0 0 }
{ 117 -10  -8  0  32  1 -4  0   3  1 -1  0  -3  1  0 0 }
```

```
{  -7  32  -5  1   -1  4  0  0    2  -1  0  0   1  0 -1  0 }
{   4  10   5 -1    0  3  1  0   -2   1  2  0  -1  1  1  0 }
{  30  13  -3  0 -116  6 10  0  -35  -5  4  0  -3 -1  0  0 }
{ -10 -63   1  2  -17  3 -4  0   -1   9 -1  0   3  4 -1  0 }
{   2  -3  -4  0    2 -2 -2  0    0   0 -1  0   0 -1 -1  0 }
{  -8  -2  -1  1   30  4 -4  1 -102   4  8 -1 -69 -2  6 -1 }
{   1 -95  18 -6  -10 -34 -2  0   -4  17 -2  0   0  2  1  0 }
{   2  10  24 -7    5  9 19 -1    0   1  4 -2   0  1  0  0 }
{  -1  -2  -4  4    0  3  1 -1    0   2  0 -2   2  0  0  0 }
},
```

Otherwise, if nTrS is equal to 48, lfnstTrSetIdx is equal to 2, and lfnstIdx is equal to 2 the following applies:

lowFreqTransMatrix[m][n] = lowFreqTransMatrixCol 0 to15[m][n] with m = 0 ... 15, n = 0 ... 15 lowFreqTransMatrixCol 0 to 15 =

{
{  87  -41   3   -4   1  -1   0  -1  -73   28    2    1    1    1    0    0 }
{ -75    4   7    0   2   0   1   0  -41   36   -7    3   -1    1    0    0 }
{  26  -44  22   -6   4  -2   1  -1   77   24  -22    2   -4    0   -1    0 }
{ -39  -68  37   -7   6  -2   2   0   -9   56  -21    1   -2    0   -1    0 }
{  10  -20   2    0   1   0   0   0   50   -1    8   -5    1   -1    0    0 }
{ -21  -45   8   -2   3  -1   1   0   -7  -30   26   -8    3   -1    1   -1 }
{  -4   -2 -55   28  -8   5  -3   2   -2   37   43  -19    1   -2    1   -1 }
{   2   19  47  -23   6  -4   2  -1  -23  -22  -44   17   -2    2   -1    0 }

{ -19  -62  -9    3   0   0   0   0  -12  -56   27   -7    3   -1    1    0 }
{   1    9  -5    0  -1   0   0   0    0   22   -1    2    0    1    0    0 }
{   5   17  -9    0  -2   1   0   0   13   54   -2    7   -1    1    0    0 }
{   7   27  56   -2  10  -3   3  -1   -2   -6    8  -28    3   -4    1   -1 }
{   0    0  19   -4   3  -2   2  -1   -3  -13   10   -4    1    0    0    0 }
{  -3    0 -27  -80  40 -16   6  -4    4    3   31   61  -22    7   -1    1 }
{   1    2  -8    6  -1   1   0   0    2    8   -2   -1    0    0    0    0 }
{  -4  -18 -57    8  -8   1  -3   0   -5  -20  -69    7   -6    2   -2    1 }
}, lowFreqTransMatrix[m][n] = lowFreqTransMatrixCol 16 to 31[m − 16][n] with m = 16 ... 31, n = 0 ... 15 lowFreqTransMatrixCol 16 to 31 =

{
{  30   -5  -6   1  -1   0   0   0   -8   -3    3    0    0    0   0   0 }
{  72  -29  -2   0  -1   0  -1   0  -37    6    7   -2    1    0   0   0 }
{   7  -38  10   0   1   0   0   0  -51   27    4   -3    2   -1   1   0 }
{ -45    4  -3   6  -1   2   0   1   49  -13    3   -3   -1    0   0   0 }
{  66   17 -24   4  -3   1  -1   0   13  -49   15    1    0    0   0   0 }
{  -9   69 -33   5  -2   0  -1   0  -44  -31   10    7   -2    2   0   1 }
{ -47  -34 -27   5   4  -1   1   0  -39   -2   27    4   -2    1   0   0 }

{ -33    3  22  -2  -4   1  -1   0  -58  -17    6   -6    7   -1   1   0 }
{   7   -8  16  -6   4  -2   1  -1  -15   54  -23    2   -1    0   0   0 }
{ -13   17   0  -2   0  -1   0   0  -46  -10  -10    4   -1    1   0   0 }
{   4   51  -3  -6  -1  -1   0   0  -20    6  -34    9   -2    2  -1   0 }
{  -1   -4 -68  35  -5   5  -2   1    0   35   43   -4   -6    1  -1   0 }
{  -6  -37 -18  -5   2  -2   1  -1    6   -6   -7   25   -6    4  -1   1 }
{  -4   -7 -26  -6 -10   6  -4   1    3    8   14  -18   15   -5   2  -1 }
{   1   24   3   5  -1   1   0   0   -3   12    6  -10    1   -1   0   0 }
{   1    4   0  33  -7   5  -2   1    0   -9   53  -22    3   -1   0   0 }
}, lowFreqTransMatrix[m][n] = lowFreqTransMatrixCol 32 to 47[m − 32][n] with m = 32 ... 47, n = 0 ... 15 lowFreqTransMatrixCol 32 to 47 =

{
{   3    2  -1   0  -2  -1   0   0    1    1    0    0   -1    0    0    0 }
{  12    3  -4   0  -3  -2   1   0    4    0    0    0   -1    0    0    0 }
{  31   -5  -8   3 -14   0   5  -1    6    1   -3    0   -4   -1    1    0 }
{ -19    2   0   0   5   1   1   0   -2    0   -1    0    1    0    0    0 }
{ -53   34   6  -5  30  -7 -11   3  -11   -2    5    1    4    2   -1   -1 }
{  49    7   2  -6 -23  -3  -2   2    9    4    0    0   -2   -1   -1    0 }
{ -11   32  -8  -7   7 -12  -6   6  -13    0    4   -3    3   -1   -2    1 }
{ -23   40  -2   5  43 -11  -8  -1  -18   -4    5    2    4    3    0   -1 }

```
{ -42 -25   4   6  34   8   2  -2 -15  -1   0  -1   3   2   0   1 }
{ -80 -27  20  -4 -66  23  -2  -2  20  -3  -2   3 -14   2   3  -1 }
{  16 -52  28   1  59  15  -8  -5 -28  -7   2   2  10   3   0  -1 }
{ -14 -38 -12 -10   9   5   7   6  -9   7  -4  -3   4  -4   0   3 }
{  16  10  55 -24  15  46 -52   1  35 -43  10  12 -23  13   5  -8 }
{  -2  -4  -1  13   0   2  -4  -3   3  -1   2   1  -2   0  -2  -1 }
{  -9  -1 -25  10  45 -11  18   2  86   1 -13  -4 -65  -6   7   2 }
{   4 -27  -2  -9   5  36 -13   5  -7 -17   1   2   4   6   4  -1 }
},
```

Otherwise, if nTrS is equal to 48, lfnstTrSetIdx is equal to 3, and lfnstIdx is equal to 1 the following applies:

lowFreqTransMatrix[m][n] = lowFreqTransMatrixCol 0 to15[m][n] with m = 0 ... 15, n = 0 ... 15 lowFreqTransMatrixCol 0 to 15 =

```
{
{ -115  37   9   2   2   1   1   0  10 -29   8   0   1   0   1   0 }
{   15  51 -18   0  -3   0  -1   0 -95   7  34  -3   5  -1   2   0 }
{   29 -22  16  -6   3  -2   1  -1  -4 -80  12  15   0   3   0   1 }
{  -36 -98  25   5   4   1   2   1 -59  11 -17   1   1   1   0   0 }
{   -6  18   3  -3  -1   0   0   0 -50  -5 -38  12   0   2   0   1 }
{    4  15  52 -13   5  -3   2  -1 -17 -45  16  24  -2   4  -1   2 }
{  -20  -7 -43   4   0   1  -1   1  -7  35   0  12  -4   1  -1   0 }
{    4  29   1  26  -5   4  -2   1 -17  -7 -73   6   6   2   1   1 }

{   12  13  10   2  -1   3  -1   1  17  -2 -46  12   7   0   2   0 }
{    5  20  90 -17   4  -3   2  -1   6  66   8  28  -7   3  -1   1 }
{   -3  -4 -34 -12   2  -1  -1   0   5  25  11  43 -10   4  -2   1 }
{   -1  -3   2  19  -2   4  -1   2   9   3 -35  22  11   1   2   0 }
{   10  -4  -6  12   5   1   1   0  11  -9 -12  -2  -7   0  -1   0 }
{    4   6  14  53  -4   4   0   2   0  -1 -20 -13   3   2  -1   1 }
{    2   9  13  37  19   6   2   2  -9  -3  -9 -28 -20  -4  -3  -1 }
{    3  -3  12  84 -12   8  -2   3   6  13  50  -1  45   1   7   0 }
},
``` lowFreqTransMatrix[m][n] = lowFreqTransMatrixCol 16 to 31[m − 16][n] with m = 16 ... 31, n = 0 ... 15 lowFreqTransMatrixCol 16 to 31 =

```
{
{  23  -8  -8   1  -1   0   0   0   3   3  -2  -1   0   0   0   0 }
{  23 -47   1   6   0   1   0   1   8   5 -12   0  -1   0   0   0 }
{  45   7 -59   7  -2   1  -1   0 -15  41  -3 -16   2  -3   0  -1 }
{   6 -13   7  -3   0   0   0   0  14  -4 -14   3  -1   0   0   0 }
{   3  67  -7 -40   3  -6   1  -3 -12 -13  65  -3 -10   0  -1   0 }
{ -87  -8 -14   7   8   1   2   0  23 -35  -6  -3   1   1   0   0 }
{ -51  -2 -57   5  15   0   4   0   7  39   5 -55   1  -7   1  -3 }
{  -5  21  -3   5  -1  -3   0  -1 -11   2 -52  -3  27  -2   5   0 }

{  16 -45  -9 -53   6   1   1   0  70  16   8  -4 -37   1  -7   0 }
{  29   5 -19  12   9  -1   1   0 -10  14  -1 -13   7   0   1   0 }
{  23  20 -40  12  21  -3   4  -1  25 -28 -10   5   8   6   0   2 }
{  -7 -65 -19 -22  11   4   2   1 -75 -18   3  -1 -10   2   0   1 }
{  33 -10  -4  18  18  -4   4  -1  28 -72   1 -49  15   2   2   1 }
{  -3   1  -5  35 -16  -6  -1  -2  46  29  13  21  37  -5   4  -1 }
{   1  18   9  28  24   6   2   2 -20  -5 -25 -33 -36   9  -2   2 }
{  -2  18 -22 -37 -13  14   0   3   1 -12  -3   2 -15  -8   1  -1 }
},
``` lowFreqTransMatrix[m][n] = lowFreqTransMatrixCol 32 to 47[m − 32][n] with m = 32 ... 47, n = 0 ... 15 lowFreqTransMatrixCol 32 to 47 =

```
{
{  4    0    0   -1    1    1    0    0    2    0    0    0    0    0    0    0 }
{  3   -3    1   -1    2    1   -2    0    1   -1    0    0    1    1   -1    0 }
{  1    0    7   -2   -3    6    1   -2    0    0    1    0   -1    2    0   -1 }
{  2    8   -3   -5    2    0    0    0    0    3    0   -1    1    0    0    0 }
{  9  -20   -5   22   -2    0    0   -1    2   -3   -2    3   -1    0    1    0 }
{  2    5  -17    0    3   -1   -1   -5    0    1   -4    0    1    0    0   -2 }
{  1  -10   41    2    4   -3   -2    3   -1   -2    7    1    1   -1   -1    0 }
{  0   27    8  -58    2   -5   25    3    0    3    0   -5    0   -2    7    0 }

{ -12   29    3   21    4    0    5   -1   -3    4    1    4    2    0    1    0 }
{   0   -6   13   -4    0   -4    1    5    0   -1   -1    1    0   -1    0    0 }
{  -4   21  -64   -8   -5   19   10  -48    3   -1   10   -3    0    4    3   -6 }
{   2  -35  -27    4    1    8  -17  -19    3    0    3   -6    0    2   -1   -2 }
{  56  -23   22   -1    4   -1  -15   26    6    4  -10    0    0    2   -3    2 }
{ -10  -53  -18    8    9   12  -41  -25   -2    2   13  -16    4    1   -5    1 }
{ -13   42    1   57  -22   -2  -25  -28    5    6   19  -12   -5   -3   -2    4 }
{  19   14   -4  -12   -4    5   17    8    2   -4   -4    4   -2    2    1    0 }
},
```

Otherwise, if nTrS is equal to 48, lfnstTrSetIdx is equal to 3, and lfnstIdx is equal to 2 the following applies:

lowFreqTransMatrix[m][n] = lowFreqTransMatrixCol 0 to15[m][n] with m = 0 ... 15, n = 0 ... 15 lowFreqTransMatrixCol 0 to 15 =

```
{
{ 109  -26   -8   -3   -2   -1   -1    0  -50   28    2    1    0    0    0    0 }
{ -39   31   -5    2   -1    1    0    0  -95    6   18    0    4    0    1    0 }
{  29   -3   -2   -2    0    0    0    0    0  -41    9    0    2    0    1    0 }
{  18   96  -23    2   -5    1   -2    0  -10    6   10   -2    1   -1    1    0 }
{ -29  -60   16   -2    3   -1    1    0  -52    9  -17    5   -2    1   -1    1 }
{ -23   -5  -15    5   -2    1   -1    1    2   79  -13   -4   -2   -1   -1    0 }
{  -7   -3   12   -3    3   -1    1    0  -31  -62    8    7    0    2    0    1 }

{   1  -26    5    0    1    0    1    0   24   -3   43   -6    4   -2    1   -1 }
{  11   14    6   -3    1   -1    1    0   10   -7   -9    3   -2    1   -1    0 }
{ -10  -11  -47    3   -4    1   -1    0    5   28   11   -2   -1    0    0    0 }
{  -8  -24  -99   11  -10    3   -4    1   -5  -36   19  -26    4   -5    1   -2 }
{  -5    1   -1    0    1    0    0    0  -10  -14   -6    8    0    1    0    0 }
{   1   12  -20   21   -4    5   -2    2   -5   -2  -75    9   -1    2   -1    1 }
{   2   -9  -18    8   -3    3   -1    1    3  -25  -62   -6    0   -2    0   -1 }
{   4    9   39   18    0    2    0    1   -6  -16  -22  -37    5   -5    1   -2 }
{  -7   -2   15   -6    1   -1    1   -1  -11   -3   22  -14    0   -2    1   -1 }
},
``` lowFreqTransMatrix[m][n] = lowFreqTransMatrixCol 16 to 31[m − 16][n] with m = 16 ... 31, n = 0 ... 15 lowFreqTransMatrixCol 16 to 31 =

```
{
{ -18   -8    6    0    1    0    1    0    6   -2   -3    0    0    0    0    0 }
{  32  -49    5    1    1    0    0    0   27   -1  -14    2   -2    1   -1    0 }
{  86    4  -33    2   -6    1   -2    0  -32   58    1   -7    0   -2    0   -1 }
{ -14   26    2   -4    1   -1    0    0  -43   -9   35   -2    4   -1    1    0 }
{  13   56   -2   -9    0   -2    0   -1  -34  -18   41    0    3    0    1    0 }
{  -9    1    5   -1    1    0    0    0   -4   49    2  -14    1   -3    0   -1 }
{ -75    9  -45    5   -1    1   -1    0   14   35    0  -23    2   -5    1   -2 }
{  -7  -64    9   14    0    3    0    1  -12   -4    5    3   -1    1    0    0 }
```

-continued

```
{  22  21   1  -21   2  -4   1  -2  92   1  53   0  -9   1  -2   0 }
{ -12  -2 -38   2   0   1   0   0  16  38  11 -16  -1  -3   0  -2 }
{   0  25  41   5  -3   1   0   0  10  -5  -7  12   2   1   0   0 }
{ -17  -2   7  -5   3  -1   0   0 -16  13   3  31  -1   6   0   2 }
{  -1  -2 -16  -4   0  -1   0   0  -7   7 -31   0   3   0   0   0 }
{  -6 -61  14 -51   2  -6   0  -2 -19   0  40  -7 -17   0  -3   0 }
{  -5  15  63   9 -16   0  -3   0  18  42 -18  27  15   1   3   1 }
{ -18  -7  30  -9  -4   0  -1   0 -35  23  23  10 -17   1  -3   0 }
},
``` lowFreqTransMatrix[m][n] = lowFreqTransMatrixCol 32 to 47[m − 32][n] with m = 32 ... 47, n = 0 ... 15 lowFreqTransMatrixCol 32 to 47 =

```
{
{  -3   2   1  -1   0   0   0   0  -2   0   0   0   0   0   0   0 }
{   3   5  -3  -2   4   1  -1  -1   2   0   0   0   2   0   0   0 }
{ -14  -8  20   0  -2  -3   0   4  -1  -1   0   0  -1   1   0   0 }
{  14 -40   1  10   2   1 -10   1   2  -4  -1  -1   0   0  -1   0 }
{  19 -36 -10  13   3   6 -14  -1   3   1  -1  -3   1   1  -1  -1 }
{ -31 -14  56  -1  13 -37  -4  20  -2   2 -10   0   2  -4   0  -1 }
{   1  -8  32  -1   7 -12  -4  10   0   2  -6  -1   2   0   0  -2 }
{   8 -59  -3  26   4   6 -58   6  -5  17  -7 -18   3   3  -1  -5 }
```

```
{ -21 -11   1  40  -5  -4  -4   5  -4   5  -6  -5   0   0   0  -3 }
{  12  -9 -22   7  -8  60   4 -36  -6 -15  54   7   3  -7  -8  14 }
{  -1   1   9  -3  -3 -14  -3  12   2   4 -13  -2  -1   3   2  -4 }
{ -93 -15 -46  -3  23 -19   0 -47   8   4   8   3   2   3   0   0 }
{   4  11 -12   4 -12  14 -50  -1  -8  32  -4 -54   2   0  30 -15 }
{  13  -4  11   9  17   0  24   5   1 -12   4  28   0   0 -15   8 }
{  12 -34   9 -24   4  28  -2   4 -11  -4  30   2   5 -13  -4   8 }
{ -19  53   6  48 -65  12 -12  11  -8 -16  10 -21  -2 -12   6   2 }
},
```

8.7.4.4 Transformation Process
Inputs to this process are:
    a variable nTbS specifying the horizontal sample size of transformed samples,
    a variable nonZeroS specifying the horizontal sample size of non-zero scaled transform coefficients,
    a list of scaled transform coefficients x[j] with j=0 ... nonZeroS−1,
    a transform kernel type variable trType.

Output of this process is the list of transformed samples y[i] with i=0 ... nTbS−1.
The transformation matrix derivation process as specified in clause 8.7.4.5 in invoked with the transform size nTbS and the transform kernel Type trType as inputs, and the transformation matrix transMatrix as output.
Depending on the value of trType, the following applies: the list of transformed samples y[i] with i=0 ... nTbS−1 is derived as follows:

If trType is equal to 0, the following transform matrix multiplication applies:

$$y[i]=\Sigma_{j=0}^{nonZeroSize-1} \text{transMatrix}[i][j*2^{6-Log2(nTbS)}]*x[j] \text{ with } i=0 \ldots nTbS-1 \quad (8\text{-}983)$$

Otherwise (trType is equal to 1 or trType is equal to 2), the following transform matrix multiplication applies:

$$y[i]=\Sigma_{j=0}^{nonZeroSize-1} \text{transMatrix}[i][j]*x[j] \text{ with } i=0 \ldots nTbS-1 \quad (8\text{-}984)$$

8.7.4.5 Transformation Matrix Derivation Process
Inputs to this process are:
    a variable nTbS specifying the horizontal sample size of scaled transform coefficients,
    the transformation kernel type trType.

Output of this process is the transformation matrix transMatrix.
The transformation matrix transMatrix is derived based on trType and nTbs as follows:
    If trType is equal to 0, the following applies:

transMatrix[m][n] = transMatrixCol 0 to15[m][n] with m = 0 ... 15, n = 0 ... 63 (8-985)

transMatrixCol 0 to 15 = (8-986)

-continued

```
{
{ 64  64  64  64  64  64  64  64  64  64  64  64  64  64  64  64 }
{ 91  90  90  90  88  87  86  84  83  81  79  77  73  71  69  65 }
{ 90  90  88  85  82  78  73  67  61  54  46  38  31  22  13   4 }
{ 90  88  84  79  71  62  52  41  28  15   2 -11 -24 -37 -48 -59 }
{ 90  87  80  70  57  43  25   9  -9 -25 -43 -57 -70 -80 -87 -90 }
{ 90  84  73  59  41  20  -2 -24 -44 -62 -77 -86 -90 -90 -83 -71 }
{ 90  82  67  46  22  -4 -31 -54 -73 -85 -90 -88 -78 -61 -38 -13 }

{ 90  79  59  33   2 -28 -56 -77 -88 -90 -81  -6 -37  -7  24  52 }
{ 89  75  50  18 -18 -50 -75 -89 -89 -75 -50 -18  18  50  75  89 }
{ 88  71  41   2 -37 -69 -87 -90 -73 -44  -7  33  65  86   9  77 }
{ 88  67  31 -13 -54 -82 -90 -78 -46  -4  38  73  90  85  61  22 }
{ 87  62  20 -28 -69 -90 -84 -56 -11  37  73  90  81  48   2 -44 }
{ 87  57   9 -43 -80 -90 -70 -25  25  70  90  80  43  -9 -57 -87 }
{ 86  52  -2 -56 -87 -84 -48   7  59  88  83  44 -11 -62 -90 -81 }
{ 85  46 -13 -67 -90 -73 -22  38  82  88  54  -4 -61 -90 -78 -31 }
{ 84  41 -24 -77 -90 -56   7  65  91  69  11 -52 -88 -79 -58  37 }

{ 83  36 -36 -83 -83 -36  36  83  83  36 -36 -83 -83 -36  36  83 }
{ 83  28 -44 -88 -73 -11  59  91  62  -7 -71 -90 -48  24  81  84 }
{ 82  22 -54 -90 -61  13  78  85  31 -46 -90 -67   4  73  88  38 }
{ 81  15 -62 -90 -44  37  88  69  -7 -77 -84 -24  56  91  52 -25 }
{ 80   9 -70 -87 -25  57  90  43 -43 -90 -57  25  87  70  -9 -80 }
{ 79   2 -77 -81  -7  73  83  11 -71 -84 -15  69  86  20 -65 -87 }
{ 78  -4 -82 -73  13  85  67 -22 -88 -61  31  90  54 -38 -90 -46 }
{ 77 -11 -86 -62  33  90  44 -52 -90 -24  69  83   2 -81 -71  20 }

{ 75 -18 -89 -50  50  89  18 -75 -75  18  89  50 -50 -89 -18  75 }
{ 73 -24 -90 -37  65  81 -11 -88 -48  56  86   2 -84 -59  44  90 }
{ 73 -31 -90 -22  78  67 -38 -90 -13  82  61 -46 -88  -4  85  54 }
{ 71 -37 -90  -7  86  48 -62 -79  24  91  20 -81 -59  52  84 -11 }
{ 70 -43 -87   9  90  25 -80 -57  57  80 -25 -90  -9  87  43 -70 }
{ 69 -48 -83  24  90   2 -90 -28  81  52 -65 -71  44  84 -20 -90 }
{ 67 -54 -78  38  85 -22 -90   4  90  13 -88 -31  82  46 -73 -61 }
{ 65 -59 -71  52  77 -44 -81  37  84 -28 -87  20  90 -11 -90   2 }

{ 64 -64 -64  64  64 -64 -64  64  64 -64 -64  64  64 -64 -64  64 }
{ 62 -69 -56  73  48 -79 -41  83  33 -86 -24  88  15 -90  -7  91 }
{ 61 -73 -46  82  31 -88 -13  90  -4 -90  22  85 -38 -78  54  67 }
{ 59 -77 -37  87  11 -91  15  86 -41 -73  62  56 -79 -33  88   7 }
{ 57 -80 -25  90  -9 -87  43  70 -70 -43  87   9 -90  25  80 -57 }
{ 56 -83 -15  90 -28 -77  65  44 -87  -2  88 -41 -69  73  33 -90 }
{ 54 -85  -4  88 -46 -61  82  13 -90  38  67 -78 -22  90 -31 -73 }
{ 52 -87   7  83 -62 -41  90 -20 -77  71  28 -91  33  69 -79 -15 }

{ 50 -89  18  75 -75 -18  89 -50 -50  89 -18 -75  75  18 -89  50 }
{ 48 -90  28  65 -84   7  79 -73 -15  87 -59 -37  91 -41 -56  88 }
{ 46 -90  38  54 -90  31  61 -88  22  67 -85  13  73 -82   4  78 }
{ 44 -91  48  41 -90  52  37 -90  56  33 -90  59  28 -88  62  24 }
{ 43 -90  57  25 -87  70   9 -80  80  -9 -70  87 -25 -57  *0 -43 }
{ 41 -90  65  11 -79  83 -20 -59  90 -48 -33  87 -71  -2  73 -86 }
{ 38 -88  73  -4 -67  90 -46 -31  85 -78  13  61 -90  54  22 -82 }
{ 37 -86  79 -20 -52  90 -69   2  65 -90  56  15 -77  87 -41 -33 }

{ 36 -83  83 -36 -36  83 -83  36  36 -83  83 -36 -36  83 -83  36 }
{ 33 -81  87 -48 -15  71 -90  62  -2 -59  90 -73  20  44 -86  83 }
{ 31 -78  90 -61   4  54 -88  82 -38 -22  73 -90  67 -13 -46  85 }
{ 28 -73  91 -71  24  33 -77  90 -69  20  37 -79  90 -65  15  41 }
{ 25 -70  90 -80  43   9 -57  87 -87  57  -9 -43  80 -90  70 -25 }
{ 24 -65  88 -86  59 -15 -33  71 -90  83 -52   7  41 -77  91 -79 }
{ 22 -61  85 -90  73 -38  -4  46 -78  90 -82  54 -13 -31  67 -88 }
{ 20 -56  81 -91  83 -59  24  15 -52  79 -90  84 -62  28  11 -48 }
```

-continued

```
{  18 −50  75 −89  89 −75  50 −18 −18  50 −75  89 −89  75 −50  18 }
{  15 −44  69 −84  91 −86  71 −48  20  11 −41  65 −83  90 −87  73 }
{  13 −38  61 −78  88 −90  85 −73  54 −31   4  22 −46  67 −82  90 }
{  11 −33  52 −69  81 −88  91 −87  79 −65  48 −28   7  15 −37  56 }
{   9 −25  43 −57  70 −80  87 −90  90 −87  80 −70  57 −43  25  −9 }
{   7 −20  33 −44  56 −65  73 −81  86 −90  91 −90  87 −83  77 −69 }
{   4 −13  22 −31  38 −46  54 −61  67 −73  78 −82  85 −88  90 −90 }
{   2  −7  11 −15  20 −24  28 −33  37 −41  44 −48  52 −56  59 −62 }
},
``` transMatrix[m][n] = transMatrixCol 16 to 31[m − 16][n] with m = 16 … 31, n = 0 … 63 (8-987)

transMatrixCol 16 to 31 = (8-988)

```
{
{  64   64   64   64   64   64   64   64   64   64   64   64   64   64   64   64 }
{  62   59   56   52   48   44   41   37   33   28   24   20   15   11    7    2 }
{  −4  −13  −22  −31  −38  −46  −54  −61  −67  −73  −78  −82  −85  −88  −90  −90 }
{ −69  −77  −83  −87  −90  −91  −90  −86  −81  −73  −65  −56  −44  −33  −20   −7 }
{ −90  −87  −80  −70  −57  −43  −25   −9    9   25   43   57   70   80   87   90 }
{ −56  −37  −15    7   28   48   65   79   87   91   88   81   69   52   33   11 }
{  13   38   61   78   88   90   85   73   54   31    4  −22  −46  −67  −82  −90 }
{  73   87   90   83   65   41   11  −20  −48  −71  −86  −91  −84  −69  −44  −15 }

{  89   75   50   18  −18  −50  −75  −89  −89  −75  −50   −8   18   50   75   89 }
{  48   11  −28  −62  −84  −90  −79  −52  −15   24   59   83   91   81   56   20 }
{ −22  −61  −85  −90  −73  −38    4   46   78   90   82   54   13  −31  −67  −88 }
{ −79  −91  −77  −41    7   52   83   90   71   33  −15  −59  −86  −88  −65  −24 }
{ −87  −57   −9   43   80   90   70   25  −25  −70  −90  −80  −43    9   57   87 }
{ −41   15   65   90   79   37   −2  −69  −90  −77  −33   24   71   91   73   28 }
{  31   78   90   61    4  −54  −88  −82  −38   22   73   90   67   13  −46  −85 }
{  83   86   44  −20  −73  −90  −59    2   62   90   71   15  −48  −87  −81  −33 }

{  83   36  −36  −83  −83  −36   36   83   83   36  −36  −83  −83  −36   36   83 }
{  33  −41  −87  −77  −15   56   90   65   −2  −69  −90  −52   20   79   86   37 }
{ −38  −88  −73   −4   67   90   46  −31  −85  −78  −13   61   90   54  −22  −82 }
{ −86  −73   −2   71   87   33  −48  −90  −59   20   83   79   11  −65  −90  −41 }
{ −80   −9   70   87   25  −57  −90  −43   43   90   57  −25  −87  −70    9   80 }
{ −24   62   88   28  −59  −90  −33   56   90   37  −52  −90  −41   48   91   44 }
{  46   90   38  −54  −90  −31   61   88   22  −67  −85  −13   73   82    4  −78 }
{  88   56  −41  −91  −37   59   87   15  −73  −79    7   84   65  −28  −90  −48 }
{  75  −18  −89  −50   50   89   18  −75  −75   18   89   50  −50  −89  −18   75 }

{  15  −79  −69   33   91   28  −71  −77   20   90   41  −62  −83    7   87   52 }
{ −54  −85    4   88   46  −61  −82   13   90   38  −67  −78   22   90   31  −73 }
{ −90  −33   73   69  −41  −88   −2   87   44  −65  −77   28   90   15  −83  −56 }
{ −70   43   87   −9  −90  −25   80   57  −57  −80   25   90    9  −87  −43   70 }
{  −7   88   33  −79  −56   62   73  −41  −86   15   91   11  −87  −37   77   59 }
{  61   73  −46  −82   31   88  −13  −90   −4   90   22  −85  −38   78   54  −67 }
{  91    7  −90  −15   88   24  −86  −33   83   41  −79  −48   73   56  −69  −62 }
{  64  −64  −64   64   64  −64  −64   64   64  −64  −64   64   64  −64  −64   64 }
{  −2  −90   11   90  −20  −87   28   84  −37  −81   44   77  −52  −71   59   65 }

{ −67  −54   78   38  −85  −22   90    4  −90   13   88  −31  −82   46   73  −61 }
{ −90   20   84  −44  −71   65   52  −81  −28   90    2  −90   24   83  −48  −69 }
{ −57   80   25  −90    9   87  −43  −70   70   43  −87   −9   90  −25  −80   57 }
{  11   84  −52  −59   81   20  −91   24   79  −62  −48   86    7  −90   37   71 }
{  73   31  −90   22   78  −67  −38   90  −13  −82   61   46  −88    4   85  −54 }
{  90  −44  −59   84    2  −86   56   48  −88   11   81  −65  −37   90  −24  −73 }
{  50  −89   18   75  −75  −18   89  −50  −50   89  −18  −75   75   18  −89   50 }
{ −20  −71   81    2  −83   69   24  −90   52   44  −90   33   62  −86   11   77 }
{ −78   −4   82  −73  −13   85  −67  −22   88  −61  −31   90  −54  −38   90  −46 }
```

```
{  −87   65  20  −86   69   15  −84   71   11  −83   73    7  −81   77    2  −79 }
{  −43   90  −57 −25   87  −70  −9   80  −80    9   70  −87   25   57  −90   43 }
{   28   52  −91  56   24  −84  77   −7  −69   88  −37  −44   90  −62  −15   81 }
{   82  −22  −54  90  −61  −13  78  −85   31   46  −90   67    4  −73   88  −38 }
{   84  −81   24  48  −90   71  −7  −62   91  −59  −11   73  −88   44   28  −83 }
{   36  −83   83 −36  −36   83 −83   36   36  −83   83  −36  −36   83  −83   36 }
{  −37  −28   79 −88   52   11 −69   91  −65    7   56  −90   77  −24  −41   84 }
{  −85   46   13 −67   90  −73  22   38  −82   88  −54   −4   61  −90   78  −31 }
{  −81   90  −62  11   44  −83  88  −59    7   48  −84   87  −56    2   52  −86 }
```

```
{  −25   70  −90   80  −43  −9   57  −87   87  −57    9   43  −80   90  −70   25 }
{   44    2  −48   81  −90   73 −37  −11   56  −84   90  −69    8   20  −62   87 }
{   88  −67   31   13  −54   82 −90   78  −46    4   38  −73   90  −85   61  −22 }
{   77  −90   86  −65   33    7 −44   73  −90   87  −69   37    2  −41   71  −88 }
{   18  −50   75  −89   89  −75  50  −18  −18   50  −75   89  −89   75  −50   18 }
{  −52   24    7  −37   62  −81  90  −88   77  −56   28    2  −33   59  −79   90 }
{  −90   82  −67   46  −22   −4  31  −54   73  −85   90  −88   78  −61   38  −13 }
```

```
{  −71   83  −90   90  −86   77  −6   44  −24    2   20  −41   59  −73   84  −90 }
{   −9   25  −43   57  −70   80 −87   90  −90   87  −80   70  −57   43  −25    9 }
{   59  −48   37  −24   11    2 −15   28  −41   52  −62   71  −79   84  −88   90 }
{   90  −90   88  −85   82  −78  73  −67   61  −54   46  −38   31  −22   13   −4 }
{   65  −69   71  −73   77  −79  81  −83   84  −86   87  −88   90  −90   90  −91 }
},
``` transMatrix[m][n] = (n &1? −1 : 1) * transMatrixCol 16 to 31[47 − m][n]    (8-989)

with m = 32 ... 47, n = 0 ... 63 transMatrix[m][n] = (n &1? −1 : 1) * transMatrixCol 0 to 15[63 − m][n]    (8-990)

with m = 48 ... 63, n = 0 ... 63

Otherwise, if trType is equal to 1 and nTbs is equal to 4, the following applies:

transMatrix[m][n] = (8-991)

```
{
{  29   55   74   84 }
{  74   74    0  −74 }
{  84  −29  −74   55 }
{  55  −84   74  −29 }
},
```

Otherwise, if trType is equal to 1 and nTbs is equal to 8, the following applies:

transMatrix[m][n] = (8-992)

```
{
{  17   32   46   60   71   78   85   86 }
{  46   78   86   71   32  −17  −60  −85 }
{  71   85   32  −46  −86  −60   17   78 }
{  85   46  −60  −78   17   86   32  −71 }
{  86  −17  −85   32   78  −46  −71   60 }
{  78  −71  −17   85  −60  −32   86  −46 }
{  60  −86   71  −17  −46   85  −78   32 }
{  32  −60   78  −86   85  −71   46  −17 }
},
```

Otherwise, if trType is equal to 1 and nTbs is equal to 16, the following applies:

$$\text{transMatrix}[m][n] = \quad (8\text{-}993)$$

```
{
{   8   17   25   33   40   48   55   62   68   73   77   81   85   87   88   88 }
{  25   48   68   81   88   88   81   68   48   25    0  -25  -48  -68  -81  -88 }
{  40   73   88   85   62   25  -17  -55  -81  -88  -77  -48   -8   33   68   87 }
{  55   87   81   40  -17  -68  -88  -73  -25   33   77   88   62    8  -48  -85 }
{  68   88   48  -25  -81  -81  -25   48   88   68    0  -68  -88  -48   25   81 }
{  77   77    0  -77  -77    0   77   77    0  -77  -77    0   77   77    0  -77 }
{  85   55  -48  -87   -8   81   62  -40  -88  -17   77   68  -33  -88  -25   73 }
{  88   25  -81  -48   68   68  -48  -81   25   88    0  -88  -25   81   48  -68 }
{  88   -8  -88   17   87  -25  -85   33   81  -40  -77   48   73  -55  -68   62 }
{  87  -40  -68   73   33  -88    8   85  -48  -62   77   25  -88   17   81  -55 }
{  81  -68  -25   88  -48  -48   88  -25  -68   81    0  -81   68   25  -88   48 }
{  73  -85   25   55  -88   48   33  -87   68    8  -77   81  -17  -62   88  -40 }
{  62  -88   68   -8  -55   88  -73   17   48  -87   77  -25  -40   85  -81   33 }
{  48  -81   88  -68   25   25  -68   88  -81   48    0  -48   81  -88   68  -25 }
{  33  -62   81  -88   85  -68   40   -8  -25   55  -77   88  -87   73  -48   17 }
{  17  -33   48  -62   73  -81   87  -88   88  -85   77  -68   55  -40   25   -8 }
},
```

Otherwise, if trType is equal to 1 and nTbs is equal to 32, the following applies:

$$\text{transMatrix}[m][n] = \text{transMatrixCol 0 to 15}[m][n] \text{ with } m = 0 \ldots 15, n = 0 \ldots 15 \quad (8\text{-}994)$$

$$\text{transMatrixCol 0 to 15} = \quad (8\text{-}995)$$

```
{
{   4    9   13   17   21   26   30   34   38   42   46   50   53   56   60   63 }
{  13   26   38   50   60   68   77   82   86   89   90   88   85   80   74   66 }
{  21   42    6   74   84   89   89   84   74   60   42   21    0  -21  -42  -60 }
{  30   56   77   87   89   80   63   38    9  -21  -50  -72  -85  -90  -84  -68 }
{  38   68   86   88   74   46    9  -30  -63  -84  -90  -78  -53  -17   21   56 }
{  46   78   90   77   42   -4  -50  -80  -90  -74  -38    9   53   82   89   72 }
{  53   85   85   53    0  -53  -85  -85  -53    0   53   85   85   53    0  -53 }
{  60   89   74   21  -42  -84  -84  -42   21   74   89   60    0  -60  -89  -74 }
{  66   90   56  -13  -74  -87  -46   26   80   84   34  -38  -85  -78  -21   50 }
{  72   86   34  -46  -89  -63   13   78   82   21  -56  -90  -53   26   84   77 }
{  77   80    9  -72  -84  -17   66   86   26  -60  -88  -34   53   90   42  -46 }
{  80   72  -17  -86  -60   34   90   46  -50  -89  -30   63   85   13  -74  -78 }
{  84   60  -42  -89  -21   74   74  -21  -89  -42   60   84    0  -84  -60   42 }
{  86   46  -63  -78   21   90   26  -77  -66   42   87    4  -85  -50   60   80 }
{  88   30  -78  -56   60   77  -34  -87    4   89   26  -80  -53   63   74  -38 }
{  90   13  -87  -26   84   38  -78  -50   72   90  -63  -68   53   77  -42  -82 }
},
```

$$\text{transMatrix}[m][n] = \text{transMatrixCol 16 to 31}[m-16][n] \text{ with } m = 16 \ldots 31, n = 0 \ldots 15 \quad (8\text{-}996)$$

$$\text{transMatrixCol 16 to 31} = \quad (8\text{-}997)$$

{
{ 66 68 72 74 77 78 80 82 84 85 86 87 88 89 90 90 }
{ 56 46 34 21 9 −4 −17 −30 −42 −53 −63 −72 −78 −84 −87 −90 }
{ −74 −84 −89 −89 −84 −74 −60 −42 −21 0 21 42 60 74 84 89 }
{ −46 −17 13 42 66 82 90 86 74 53 26 −4 −34 −60 −78 −88 }
{ 80 90 82 60 26 −13 −5 −77 −89 −85 −66 −34 4 42 72 87 }
{ 34 −13 −56 −84 −88 −68 −30 17 60 85 87 66 26 −21 −63 −86 }
{ −85 −85 −53 0 53 85 85 53 0 −53 −85 −86 −53 0 53 85 }
{ −21 42 84 84 42 −21 −74 −89 −60 0 60 89 74 21 −42 −84 }
{ 88 72 9 −60 −90 −63 4 68 89 53 −17 −77 −86 −42 30 82 }
{ 9 −66 −88 −42 38 87 68 −4 −74 −85 −30 50 90 60 −17 −80 }
{ −90 −50 38 89 56 −30 −87 −63 21 85 68 −13 −82 −74 4 78 }
{ 4 82 68 −21 −87 −56 38 90 42 −53 −88 −26 66 84 −9 −77 }
{ 89 21 −74 −74 21 89 42 −60 −84 0 84 60 −42 −89 −21 74 }
{ −17 −90 −30 74 68 −38 −88 −9 84 53 −56 −82 13 89 34 −72 }
{ −86 9 90 21 −82 −50 66 72 −42 −85 13 90 17 −84 −46 68 }
{ 30 86 −17 −89 4 90 9 −88 −21 85 34 −80 −46 74 56 −66 }
},

Otherwise, if trType is equal to 2 and nTbs is equal to 4, the following applies:

$$\text{transMatrix}[m][n] = \quad (8-998)$$

{
{ 84 74 55 29 }
{ 74 0 −74 −74 }
{ 55 −74 −29 84 }
{ 29 −74 84 −55 }
},

Otherwise, if trType is equal to 2 and nTbs is equal to 8, the following applies:

$$\text{transMatrix}[m][n] = \quad (8-999)$$

{
{ 86 85 78 71 60 46 32 17 }
{ 85 60 17 −32 −71 −86 −78 −46 }
{ 78 17 −60 −86 −46 32 85 71 }
{ 71 −32 −86 −17 78 60 −46 −85 }
{ 60 −71 −46 78 32 −85 −17 86 }
{ 46 −86 32 60 −85 17 71 −78 }
{ 32 −78 85 −46 −17 71 −86 60 }
{ 17 −46 71 −85 86 −78 60 −32 }
},

Otherwise, if trType is equal to 2 and nTbs is equal to 16, the following applies:

$$\text{transMatrix}[m][n] = \quad (8-1000)$$

{
{ 88 88 87 85 81 77 73 68 62 55 48 40 33 25 17 8 }
{ 88 81 68 48 25 0 −25 −48 −68 −81 −88 −88 −81 −68 −48 −25 }
{ 87 68 33 −8 −48 −77 −88 −81 −55 −17 25 62 85 88 73 40 }
{ 85 48 −8 −62 −88 −77 −33 25 73 88 68 17 −40 −81 −87 −55 }
{ 81 25 −48 −88 −68 0 68 88 48 −25 −81 −81 −25 48 88 68 }
{ 77 0 −77 −77 0 77 77 0 −77 −77 0 77 77 0 −77 −77 }
{ 73 −25 −88 −33 68 77 −147 −88 −40 62 81 −8 −87 −48 55 85 }
{ 68 −48 −81 25 88 0 −88 −25 81 48 −68 −68 48 81 −25 −88 }
{ 62 −68 −55 73 48 −77 −40 81 33 −85 −25 87 17 −88 −8 88 }
{ 55 −81 −17 88 −25 −77 62 48 −85 −8 88 −363 −73 68 40 −87 }
{ 48 −88 25 68 −81 0 81 −68 −25 88 −48 −48 88 −25 −68 81 }
{ 40 −88 62 17 −81 77 −8 −68 87 −33 −48 88 −55 −25 85 −73 }
{ 33 −81 85 −40 −25 77 −87 48 17 −73 88 −55 −8 68 −88 62 }
{ 25 −68 88 −81 48 0 −48 81 −88 68 −25 −25 68 −88 81 −48 }
{ 17 −48 73 −87 88 −77 55 −25 −8 40 −68 85 −88 81 −62 33 }
{ 8 −25 40 −55 68 −77 85 −88 88 −87 81 −73 62 −48 33 −17 }
},

Otherwise, if trType is equal to 2 and nTbs is equal to 32, the following applies:

transMatrix[m][n] = transMatrixCol 0 to 15[m][n] with m = 0 ... 15, n = 0 ... 15 (8-1001)

transMatrixCol 0 to 15 = (8-1002)

```
{
{  90   90   89   88   87   86   85   84   82   80   78   77   74   72   68   66 }
{  90   87   84   78   72   63   53   42   30   17    4   -9  -21  -34  -46  -56 }
{  89   84   74   60   42   21    0  -21  -42  -60  -74  -84  -89  -89  -84  -74 }
{  88   78   60   34    4  -26  -53  -74  -86  -90  -82  -66  -42  -13   17   46 }
{  87   72   42    4  -34  -66  -85  -89  -77  -50  -13   26   60   82   90   80 }
{  86   63   21  -26  -66  -87  -85  -60  -17   30   68   88   84   56   13  -34 }
{  85   53    0  -53  -85  -85  -53    0   53   85   85   53    0  -53  -85  -85 }
{  84   42  -21  -74  -89  -60    0   60   89   74   21  -42  -84  -84  -42   21 }
{  82   30  -42  -86  -77  -17   53   89   68    4  -63  -90  -60    9   72   88 }
{  80   17  -60  -90  -50   30   85   74    4  -68  -87  -38   42   88   66   -9 }
{  78    4  -74  -82  -13   68   85   21  -63  -87  -30   56   89   38  -50  -90 }
{  77   -9  -84  -66   26   88   53  -42  -90  -38   56   87   21  -68  -82   -4 }
{  74  -21  -89  -42   60   84    0  -84  -60   42   89   21  -74  -74   21   89 }
{  72  -34  -89  -13    8   56  -53  -84    9   88   38  -68  -74   30   90   17 }
{  68  -46  -84   17   90   13  -85  -42   72   66  -50  -82   21   90    9  -86 }
{  66  -56  -74   46   80  -34  -85   21   88   -9  -90   -4   89   17  -86  -30 }
},
``` transMatrix[m][n] = transMatrixCol 16 to 31[m − 16][n] with m = 16 ... 31, n = 0 ... 15 (8-1003)

transMatrixCol 16 to 31 = (8-1004)

```
{
{  63   60   56   53   50   46   42   38   34   30   26   21   17   13    9    4 }
{ -66  -74  -80  -85  -88  -90  -89  -86  -82  -77  -68  -60  -50  -38  -26  -13 }
{ -60  -42  -21    0   21   42   60   74   84   89   89   84   74   60   42   21 }
{  68   84   90   85   72   50   21   -9  -38  -63  -80  -89  -87  -77  -56  -30 }
{  56   21  -17  -53  -78  -90  -84  -63  -30    9   46   74   88   86   63   38 }
{ -72  -89  -82  -53   -9   38   74   90   80   50    4  -42  -77  -90  -78  -46 }
{ -53    0   53   85   85   53    0  -53  -85  -85  -53    0   53   85   85   53 }
{  74   89   60    0  -60  -89  -74  -21   42   84   84   42  -21  -74  -89  -60 }
{  50  -21  -78  -85  -38   34   84   80   26  -46  -87  -74  -13   56   90   66 }
{ -77  -84  -26   53   90   56  -21  -82  -78  -13   63   89   46  -34  -86  -72 }
{ -46   42   90   53  -34  -88  -60   26   86   66  -17  -84  -72    9   80   77 }
{  78   74  -13  -85  -63   30   89   50  -46  -90  -34   60   86   17  -72  -80 }
{  42  -60  -84    0   84   60  -42  -89  -21   74   74  -21  -89  -42   60   84 }
{ -80  -60   50   85   -4  -87  -42   66   77  -26  -90  -21   78   63  -46  -86 }
{ -38   74   63  -53  -80   26   89    4  -87  -34   77   60  -56  -78   30   88 }
{  82   42  -77  -53   68   63  -60  -72   50   78  -38  -84   26   87  -13  -90 }
},
```

3 Technical Problems Addressed by Some Disclosed Technical Solutions

1. Currently VVC design uses width and height of a transform block to determine the number of bit shifting during transform and inverse transform, which might reduce processing precision.
2. Currently VVC design uses width and height of a transform block to determine the number of bit shifting during quantization and dequantization, which might reduce processing precision.
3. Currently VVC quantization design may lead to quantized residual out of 16-bit dynamic range for some block sizes, which degrades coding efficiency because of clipping to 16-bit thereafter.
4. Currently a left shift is applied to transform skip to align the energy to transformed blocks, which may be unnecessary.

4 A Listing of Embodiment Examples and Techniques

The list below should be considered as examples to explain general concepts. These items should not be interpreted in a narrow way. Furthermore, these items can be combined in any manner.

In the following descriptions, a transform skip block may represent a block which transform (non-identity transform) is not applied or only identity transform is applied, such as a block with transform skipped mode; a block with BDPCM mode, a block with transform and quantization bypass mode, a block with palette mode.

1. For a transform skip block, the scaling factor used in the conversion of a decoded coefficient to residual (e.g., tsShift) may be independent of block size.
   a. In one example, the scaling factor is a constant
      i. In one example, the scaling factor may be set as 1.
   b. In one example, the scaling factor may depend on internal bit-depth i. In one example, the scaling factor may be set as (15-internal_bit_depth)
c. In one example, the transformation process for scaled transform coefficients is not invoked and the output of the scaling process for transform coefficients is the input to generate the intermediate residual samples, i.e., without bit shift.
2. For a transformed block, the number of bit-shifting for dequantization may depend on the actual transform size (e.g., the size without consideration of zeroing-out area).
   a. In one example, the number of bit-shifting for dequantization may depend on the height of the actual transform, i.e. nonZeroH described in 2.1.3.
3. For a transformed block, the number of bit-shifting for inverse transform may depend on the transform block size and actual transform size.
   a. In one example, the number of bit-shifting for inverse transform may depend on the transform block size.
   b. In one example, the number of bit-shifting for inverse transform may depend on the height of the transform block.
   c. In one example, the number of bit-shifting for inverse transform may depend on the height of the actual transform.
   d. In one example, the number of bit-shifting for inverse transform may depend on the actual transform size.
   e. In one example, the number of bit-shifting for inverse transform for blocks that transform block size is different from the actual transform size may be different from those blocks that transform block size is equal to the actual transform size.
   f. In one example, the number of bit-shifting for inverse transform for blocks that transform block height is different from the actual transform height may be different from those blocks that transform block height is equal to the actual transform height.
4. For a transformed block, the number of bit-shifting for dequantization may depend on a capped transform block size.
   a. In one example, when the transform block size is equal to or large than 32×32, the number of bit-shifting for dequantization may be according to 16×16 block size.
   b. In one example, whether and/or how to apply the capped transform block size may depend on quantization parameter.
   c. In one example, whether and/or how to apply the capped transform block size may depend on if the block width is even-number times of the block height.
   d. In one example, whether and/or how to apply the capped transform block size may depend on if the block height is even-number times of the block width.
5. If lossless coding is used, the transform and/or quantization process may be applied without bit-shifting.
   a. In one example, a sequence/picture/subpicture/slice/tile group/tile/brick/CTU row/CTU/CU/PU/TU/subblock level flag may be added into the bitstream to indicate whether the current video unit is coded by lossless coding.
      i. In one example, if lossless coding is used, the corresponding lossless flag of current video unit may be set equal to 1.
   b. In one example, if lossless coding is used, an invertible transform may be applied that the encoding frames are bit-exact with the original frames.
      i. In one example, the transform size for a lossless coded block may be fixed to M×N (such as M=N=4).
      ii. In one example, the transform core for a lossless coded block may be Walsh Hadamard Transform.
      iii. In one example, transform skip may be used for a lossless coded block.
   c. In one example, if lossless coding is used for the current video unit, the scaling factor used in the conversion of a decoded coefficient to residual (e.g., tsShift) may be set to 1 (e.g., without scaling).
   d. In one example, if lossless coding is used for the current video unit, the number of bit-shifting for inverse transform may be equal to 0 (e.g., without bit-shifting).
   e. In one example, if lossless coding is used for the current video unit, the quantization parameter may be set to N (such as N=4, e.g., without quantization).
   f. In one example, if lossless coding is used for the current video unit, the number of bit-shifting for dequantization may be equal to 0 (e.g., without bit-shifting).

5 Embodiments

The following changes, marked in boldface italics, and deletion are included in parenthesis {{ }} are based on JVET-O2001-vE.

5.1 Embodiment #1

This embodiment reflects the change to make the scaling factor for transform skip block independent of block size.
8.7.2 Scaling and Transformation Process
Inputs to this process are:
    a luma location (xTbY, yTbY) specifying the top-left sample of the current luma transform block relative to the top-left luma sample of the current picture,
    a variable cIdx specifying the colour component of the current block,
    a variable nTbW specifying the transform block width,
    a variable nTbH specifying the transform block height.
Output of this process is the (nTbW)×(nTbH) array of residual samples resSamples[x][y] with x=0 . . . nTbW−1, y=0 . . . nTbH−1.
The variables bitDepth, bdShift and tsShift are derived as follows:

$$\text{bitDepth}=(c\text{Idx}==0)?\text{BitDepth}_Y:\text{BitDepth}_C \quad (8\text{-}942)$$

$$bd\text{Shift}=\text{Max}(20-\text{bitDepth},0) \quad (8\text{-}943)$$

$$ts\text{Shift}=5+((\text{Log }2(nTbW)+\text{Log }2(nTbH))/2) \quad (8\text{-}944)$$

The variable codedCIdx is derived as follows:
    If cIdx is equal to 0 or TuCResMode[xTbY][yTbY] is equal to 0, codedCIdx is set equal to cIdx.
    Otherwise, if TuCResMode[xTbY][yTbY] is equal to 1 or 2, codedCIdx is set equal to 1.
    Otherwise, codedCIdx is set equal to 2.
The variable cSign is set equal to (1−2*slice_joint_cbcr_sign_flag).
The (nTbW)×(nTbH) array of residual samples resSamples is derived as follows:
    1. The scaling process for transform coefficients as specified in clause 8.7.3 is invoked with the transform block location (xTbY, yTbY), the transform block width nTbW and the transform block height nTbH, the colour component variable cIdx being set equal to codedCIdx and the bit depth of the current colour component bitDepth as inputs, and the output is an (nTbW)×(nTbH) array of scaled transform coefficients d.

2. The (nTbW)×(nTbH) array of residual samples r is derived as follows:
   If transform_skip_flag[xTbY][yTbY] is equal to 1 and cIdx is equal to 0, the residual sample array values r[x][y] with x=0 . . . nTbW−1, y=0 . . . nTbH−1 are derived as follows:

$$r[x][y]=d[x][y]\{\{<<tsShift\}\} \qquad (8\text{-}945)$$

Otherwise (transform_skip_flag[xTbY][yTbY] is equal to 0 or and cIdx is not equal to 0), the transformation process for scaled transform coefficients as specified in clause 8.7.4.1 is invoked with the transform block location (xTbY, yTbY), the transform block width nTbW and the transform block height nTbH, the colour component variable cIdx and the (nTbW)×(nTbH) array of scaled transform coefficients d as inputs, and the output is an (nTbW)×(nTbH) array of residual samples r.

8.7.3 Scaling Process for Transform Coefficients
. . .
The variables bdShift, rectNorm and bdOffset are derived as follows:
   If transform_skip_flag[xTbY][yTbY] is equal to 1, the following applies: bdShift=bitDepth−5+dep_quant_enabled_flag
   Otherwise, the following applies:

$$bd\text{Shift}=\text{bitDepth}+((\text{rectNon}Ts\text{Flag}?1:0)+(\text{Log}\,2(nTbW)+\text{Log}\,2(nTbH))/2)-5+\text{dep\_quant\_enabled\_flag} \qquad (8\text{-}956)$$

$$-bd\text{Offset}=(1<<bd\text{Shift})>>1 \qquad (8\text{-}957)$$

5.2 Embodiment #2

This embodiment reflects the change to make the scaling process based on actual transform size but not transform block size.

8.7.3 Scaling Process for Transform Coefficients
Inputs to this process are:
   a luma location (xTbY, yTbY) specifying the top-left sample of the current luma transform block relative to the top-left luma sample of the current picture,
   a variable nTbW specifying the transform block width,
   a variable nTbH specifying the transform block height,
   a variable cIdx specifying the colour component of the current block,
   a variable bitDepth specifying the bit depth of the current colour component.
Output of this process is the (nTbW)×(nTbH) array d of scaled transform coefficients with elements d[x][y].
The variable trTypeHor specifying the horizontal transform kernel and the variable trTypeVer specifying the vertical transform kernel are derived as follows:
   If cIdx is greater than 0, trTypeHor and trTypeVer are set equal to 0.
   Otherwise, if implicitMtsEnabled is equal to 1, the following applies:
      If IntraSubPartitionsSplitType is not equal to ISP_NO_SPLIT or sps_explicit_mts_intra_enabled_flag is equal to 0 and CuPredMode[0][xThY][yThY] is equal to MODE_INTRA, trTypeHor and trTypeVer are derived as follows:

$$tr\text{TypeHor}=(nTbW>=4\&\&nTbW<=16)?1:0 \qquad (8\text{-}975)$$

$$tr\text{TypeVer}=(nTbH>=4\&\&nTbH<=16)?1:0 \qquad (8\text{-}976)$$

Otherwise (cu_sbt_flag is equal to 1), trTypeHor and trTypeVer are specified in Table 8-15 depending on cu_sbt_horizontal_flag and cu_sbt_pos_flag.
Otherwise, trTypeHor and trTypeVer are specified in Table 8-14 depending on tu_mts_idx[xTbY][yTbY].
The variables nonZeroW and nonZeroH are derived as follows:
   If lfnst_idx[xTbY][yTbY] is not equal to 0 and nTbW is greater than or equal to 4 and nTbH is greater than or equal to 4, the following applies:

$$\text{nonZero}W=(nTbW==4\|nTbH==4)?4:8 \qquad (8\text{-}977)$$

$$\text{nonZero}H=(nTbW==4\|nTbH==4)?4:8 \qquad (8\text{-}978)$$

Otherwise, the following applies:

$$\text{nonZero}W=\text{Min}(nTbW,(tr\text{TypeHor}>0)?16:32) \qquad (8\text{-}979)$$

$$\text{nonZero}H=\text{Min}(nTbH,(tr\text{TypeVer}>0)?16:32) \qquad (8\text{-}980)$$

The quantization parameter qP is derived as follows:
   If cIdx is equal to 0 and transform_skip_flag[xTbY][yTbY] is equal to 0, the following applies:

$$qP=Qp'_Y \qquad (8\text{-}950)$$

Otherwise, if cIdx is equal to 0 (and transform_skip_flag[xTbY][yTbY] is equal to 1), the following applies:

$$qP=\text{Max}(Qp\text{Prime}Ts\text{Min},Qp'_Y) \qquad (8\text{-}951)$$

Otherwise, if TuCResMode[xTbY][yTbY] is equal to 2, the following applies:

$$qP=Qp'_{CbCr} \qquad (8\text{-}952)$$

Otherwise, if cIdx is equal to 1, the following applies:

$$qP=Qp'_{Cb} \qquad (8\text{-}953)$$

Otherwise (cIdx is equal to 2), the following applies:

$$qP=Qp'_{Cr} \qquad (8\text{-}954)$$

The variable rectNonTsFlag is derived as follows:

$$\text{rectNon}Ts\text{Flag}=(((\text{Log}\,2(nTbW)+\text{Log}\,2(nTbH))\&1)\\==1\&\&\text{transform\_skip\_flag}[xTbY][yTbY]==0) \qquad (8\text{-}955)$$

The variables bdShift, rectNorm and bdOffset are derived as follows:

$$bd\text{Shift}=\text{bitDepth}+((\text{rectNon}Ts\text{Flag}?1:0)+(\text{Log}\,2(nTbW)+\text{Log}\,2(\{\{nTbH\}\}\text{nonZeroH}))/2)-5+\text{dep\_quant\_enabled\_flag} \qquad (8\text{-}956)$$

$$bd\text{Offset}=(1<<bd\text{Shift})>>1 \qquad (8\text{-}957)$$

The list levelScale[ ][ ] is specified as levelScale[j][k]={{40, 45, 51, 57, 64, 72}, {57, 64, 72, 80, 90, 102}} with j=0 . . . 1, k=0 . . . 5.
The (nTbW)×(nTbH) array dz is set equal to the (nTbW)×(nTbH) array TransCoeffLevel[xTbY][yTbY][cIdx].
For the derivation of the scaled transform coefficients d[x][y] with x=0 . . . nTbW−1, y=0 . . . nTbH−1, the following applies:
   The intermediate scaling factor m[x][y] is derived as follows:
      If one or more of the following conditions are true, m[x][y] is set equal to 16:
         sps_scaling_list_enabled_flag is equal to 0.
         transform_skip_flag[xTbY][yTbY] is equal to 1.
      Otherwise, the following applies:

$$m[x][y]=\text{ScalingFactor}[\text{Log}\,2(nTbW)][\text{Log}\,2(nTbH)]\\ [\text{matrixId}][x][y],\text{ with matrixId as specified in Table 7-5} \qquad (8\text{-}958)$$

The scaling factor ls[x][y] is derived as follows:
  If dep_quant_enabled_flag is equal to 1, the following applies:

ls[x][y]=(m[x][y]*levelScale[rectNonTsFlag][(qP+1)%6])<<((qP+1)/6)  (8-959)

Otherwise (dep_quant_enabled_flag is equal to 0), the following applies:

ls[x][y]=(m[x][y]*levelScale[rectNonTsFlag][qP%6])<<(qP/6)  (8-960)

When BdpcmFlag[xTbY][yYbY] is equal to 1, dz[x][y] is modified as follows:
  If BdpcmDir[xTbY][yYbY] is equal to 0 and x is greater than 0, the following applies:

dz[x][y]=Clip3(CoeffMin,CoeffMax,dz[x−1][y]+dz[x][y])  (8-961)

Otherwise, if BdpcmDir[xTbY][yYbY] is equal to 1 and y is greater than 0, the following applies:

dz[x][y]=Clip3(CoeffMin,CoeffMax,dz[x][y−1]+dz[x][y])  (8-962)

The value dnc[x][y] is derived as follows:

dnc[x][y]=(dz[x][y]*ls[x][y]+bdOffset)>>bdShift  (8-963)

The scaled transform coefficient d[x][y] is derived as follows:

d[x][y]=Clip3(CoeffMin,CoeffMax,dnc[x][y])  (8-964)

5.3 Embodiment #3

This embodiment reflects the change to make the inverse transform shifting dependent on the actual transform size and transform block size.

8.7.4 Transformation Process for Scaled Transform Coefficients 8.7.4.1 General

Inputs to this process are:
  a luma location (xTbY, yTbY) specifying the top-left sample of the current luma transform block relative to the top-left luma sample of the current picture,
  a variable nTbW specifying the width of the current transform block,
  a variable nTbH specifying the height of the current transform block,
  a variable cIdx specifying the colour component of the current block,
  an (nTbW)×(nTbH) array d[x][y] of scaled transform coefficients with x=0 . . . nTbW−1, y=0 . . . nTbH−1.

Output of this process is the (nTbW)×(nTbH) array r[x][y] of residual samples with x=0 . . . nTbW−1, y=0 . . . nTbH−1.

When lfnst_idx[xTbY][yTbY] is not equal to 0 and both nTbW and nTbH are greater than or equal to 4, the following applies:
  The variables predModeIntra, nLfnstOutSize, log 2Lfnst-Size, nLfnstSize, and nonZeroSize are derived as follows:

predModeIntra=(cIdx==0)?IntraPredModeY[xTbY][yTbY]:IntraPredModeC[xTbY][yTbY]  (8-965)

nLfnstOutSize=(nTbW>=8&&nTbH>=8)?48:16  (8-966)

log 2LfnstSize=(nTbW>=8&&nTbH>=8)?3:2  (8-967)

nLfnstSize=1<<log 2LfnstSize  (8-968)

nonZeroSize=((nTbW==4&&nTbH==4)||(nTbW==8&&nTbH==8))?8:16  (8-969)

When intra_mip_flag[xTbComp][yTbComp] is equal to 1 and cIdx is equal to 0, predModeIntra is set equal to INTRA_PLANAR.
  When predModeIntra is equal to either INTRA_LT_CCLM, INTRA_L_CCLM, or INTRA_T_CCLM, predModeIntra is set equal to IntraPredModeY[xTbY+nTbW/2][yTbY+nTbH/2].
  The wide angle intra prediction mode mapping process as specified in clause 8.4.5.2.6 is invoked with predModeIntra, nTbW, nTbH and cIdx as inputs, and the modified predModeIntra as output.
  The values of the list u[x] with x=0 . . . nonZeroSize−1 are derived as follows:

xC=DiagScanOrder[2][2][x][0]  (8-970)

yC=DiagScanOrder[2][2][x][1]  (8-971)

u[x]=d[xC][yC]  (8-972)

The one-dimensional low frequency non-separable transformation process as specified in clause 8.7.4.2 is invoked with the input length of the scaled transform coefficients nonZeroSize, the transform output length nTrS set equal to nLfnstOutSize, the list of scaled non-zero transform coefficients u[x] with x=0 . . . nonZeroSize−1, the intra prediction mode for LFNST set selection predModeIntra, and the LFNST index for transform selection in the selected LFNST set lfnst_idx[xTbY][yTbY] as inputs, and the list v[x] with x=0 . . . nLfnstOutSize−1 as output.
  The array d[x][y] with x=0 . . . nLfnstSize−1, y=0 . . . nLfnstSize−1 is derived as follows:
    If predModeIntra is less than or equal to 34, the following applies:

d[x][y]=(y<4)?v[x+(y<<log 2LfnstSize)]:((x<4)?v[32+x+((y−4)<<2)]:d[x][y])  (8-973)

Otherwise, the following applies:

d[x][y]=(x<4)?v[y+(x<<log 2LfnstSize)]:((y<4)?v[32+y+((x−4)<<2)]:d[x][y])  (8-974)

The variable implicitMtsEnabled is derived as follows:
  If sps_mts_enabled_flag is equal to 1 and one of the following conditions is true, implicitMtsEnabled is set equal to 1:
    IntraSubPartitionsSplitType is not equal to ISP_NO_SPLIT
    cu_sbt_flag is equal to 1 and Max(nTbW, nTbH) is less than or equal to 32
    sps_explicit_mts_intra_enabled_flag is equal to 0 and CuPredMode[0][xTbY][yTbY] is equal to MODE_INTRA and lfnst_idx[x0][y0] is equal to 0 and intra_mip_flag[x0][y0] is equal to 0
  Otherwise, implicitMtsEnabled is set equal to 0.
The variable trTypeHor specifying the horizontal transform kernel and the variable trTypeVer specifying the vertical transform kernel are derived as follows:
  If cIdx is greater than 0, trTypeHor and trTypeVer are set equal to 0.
  Otherwise, if implicitMtsEnabled is equal to 1, the following applies:
    If IntraSubPartitionsSplitType is not equal to ISP_NO_SPLIT or sps_explicit_mts_intra_enabled_flag is equal to 0 and CuPredMode[0]

[xTbY][yTbY] is equal to MODE_INTRA, trTypeHor and trTypeVer are derived as follows:

$$trTypeHor=(nTbW>=4\&\&nTbW<=16)?1:0 \quad (8\text{-}975)$$

$$trTypeVer=(nTbH>=4\&\&nTbH<=16)?1:0 \quad (8\text{-}976)$$

Otherwise (cu_sbt_flag is equal to 1), trTypeHor and trTypeVer are specified in Table 8-15 depending on cu_sbt_horizontal_flag and cu_sbt_pos_flag.

Otherwise, trTypeHor and trTypeVer are specified in Table 8-14 depending on tu_mts_idx[xTbY][yTbY].

The variables nonZeroW and nonZeroH are derived as follows:

If lfnst_idx[xTbY][yTbY] is not equal to 0 and nTbW is greater than or equal to 4 and nTbH is greater than or equal to 4, the following applies:

$$nonZeroW=(nTbW==4||nTbH==4)?4:8 \quad (8\text{-}977)$$

$$nonZeroH=(nTbW==4||nTbH==4)?4:8 \quad (8\text{-}978)$$

Otherwise, the following applies:

$$nonZeroW=\text{Min}(nTbW,(trTypeHor>0)?16:32) \quad (8\text{-}979)$$

$$nonZeroH=\text{Min}(nTbH,(trTypeVer>0)?16:32) \quad (8\text{-}980)$$

The (nTbW)×(nTbH) array r of residual samples is derived as follows:

5. When nTbH is greater than 1, each (vertical) column of scaled transform coefficients d[x][y] with x=0 . . . nonZeroW−1, y=0 . . . nonZeroH−1 is transformed to e[x][y] with x=0 . . . nonZeroW−1, y=0 . . . nTbH−1 by invoking the one-dimensional transformation process as specified in clause 8.7.4.4 for each column x=0 . . . nonZeroW−1 with the height of the transform block nTbH, the non-zero height of the scaled transform coefficients nonZeroH, the list d[x][y] with y=0 . . . nonZeroH−1 and the transform type variable trType set equal to trTypeVer as inputs, and the output is the list e[x][y] with y=0 . . . nTbH−1.

6. When nTbH and nTbW are both greater than 1, the intermediate sample values g[x][y] with x=0 . . . nonZeroW−1, y=0 . . . nTbH−1 are derived as follows:

$$g[x][y]=\text{Clip3}(\text{CoeffMin},\text{CoeffMax},(e[x][y]+64)>>7-\text{Log 2}(nThH/\text{nonZeroH})) \quad (8\text{-}981)$$

7. When nTbW is greater than 1, each (horizontal) row of the resulting array g[x][y] with x=0 . . . nonZeroW−1, y=0 . . . nTbH−1 is transformed to r[x][y] with x=0 . . . nTbW−1, y=0 . . . nTbH−1 by invoking the one-dimensional transformation process as specified in clause 8.7.4.4 for each row y=0 . . . nTbH−1 with the width of the transform block nTbW, the non-zero width of the resulting array g[x][y] nonZeroW, the list g[x][y] with x=0 . . . nonZeroW−1 and the transform type variable trType set equal to trTypeHor as inputs, and the output is the list r[x][y] with x=0 . . . nTbW−1.

8. When nTbW is equal to 1, r[x][y] is set equal to e[x][y] for x=0 . . . nTbW−1, y=0 . . . nTbH−1.

8.7.2 Scaling and Transformation Process

Inputs to this process are:
  a luma location (xTbY, yTbY) specifying the top-left sample of the current luma transform block relative to the top-left luma sample of the current picture,
  a variable cIdx specifying the colour component of the current block,
  a variable nTbW specifying the transform block width,
  a variable nTbH specifying the transform block height.

Output of this process is the (nTbW)×(nTbH) array of residual samples resSamples[x][y] with x=0 . . . nTbW−1, y=0 . . . nTbH−1.

The variables bitDepth, bdShift and tsShift are derived as follows:

$$bitDepth=(cIdx==0)?BitDepth_Y:BitDepth_C \quad (8\text{-}942)$$

$$bdShift=\text{Max}(20-bitDepth+\text{Log 2}(nTbH/\text{nonZeroH}),0) \quad (8\text{-}943)$$

5.4 Embodiment #4

This embodiment reflects the change to make the quantized residual within a 16-bit range.

8.7.3 Scaling Process for Transform Coefficients

Inputs to this process are:
  a luma location (xTbY, yTbY) specifying the top-left sample of the current luma transform block relative to the top-left luma sample of the current picture,
  a variable nTbW specifying the transform block width,
  a variable nTbH specifying the transform block height,
  a variable cIdx specifying the colour component of the current block,
  a variable bitDepth specifying the bit depth of the current colour component.

Output of this process is the (nTbW)×(nTbH) array d of scaled transform coefficients with elements d[x][y].

The quantization parameter qP is derived as follows:

If cIdx is equal to 0 and transform_skip_flag[xTbY][yTbY] is equal to 0, the following applies:

$$qP=Qp'_Y \quad (8\text{-}950)$$

Otherwise, if cIdx is equal to 0 (and transform_skip_flag[xTbY][yTbY] is equal to 1), the following applies:

$$qP=\text{Max}(QpPrimeTsMin,Qp'_Y) \quad (8\text{-}951)$$

Otherwise, if TuCResMode[xTbY][yTbY] is equal to 2, the following applies:

$$qP=Qp'_{CbCr} \quad (8\text{-}952)$$

Otherwise, if cIdx is equal to 1, the following applies:

$$qP=Qp'_{Cb} \quad (8\text{-}953)$$

Otherwise (cIdx is equal to 2), the following applies:

$$qP=Qp'_{Cr} \quad (8\text{-}954)$$

The variable rectNonTsFlag is derived as follows:

$$rectNonTsFlag=(((\text{Log 2}(nTbW)+\text{Log 2}(nTbH))\&1)==1\&\&transform\_skip\_flag[xTbY][yTbY]==0) \quad (8\text{-}955)$$

The variables bdShift, rectNorm and bdOffset are derived as follows:

$$tsize=(\text{Log 2}(nTbW)+\text{Log 2}(nTbH))/2$$

if rectNonTsFlag is equal to 0 and qP is smaller than 4 and tsize is equal to or large than 5

$$tsize=tsize-1$$

$$bdShift=bitDepth+((rectNonTsFlag?1:0)+\{\{(\text{Log 2}(nTbW)+\text{Log 2}(nTbH))/2\}\}tsize)-5+dep\_quant\_enabled\_flag$$

$$bdOffset=(1<<bdShift)>>1 \quad (8\text{-}957)$$

Figure 5:
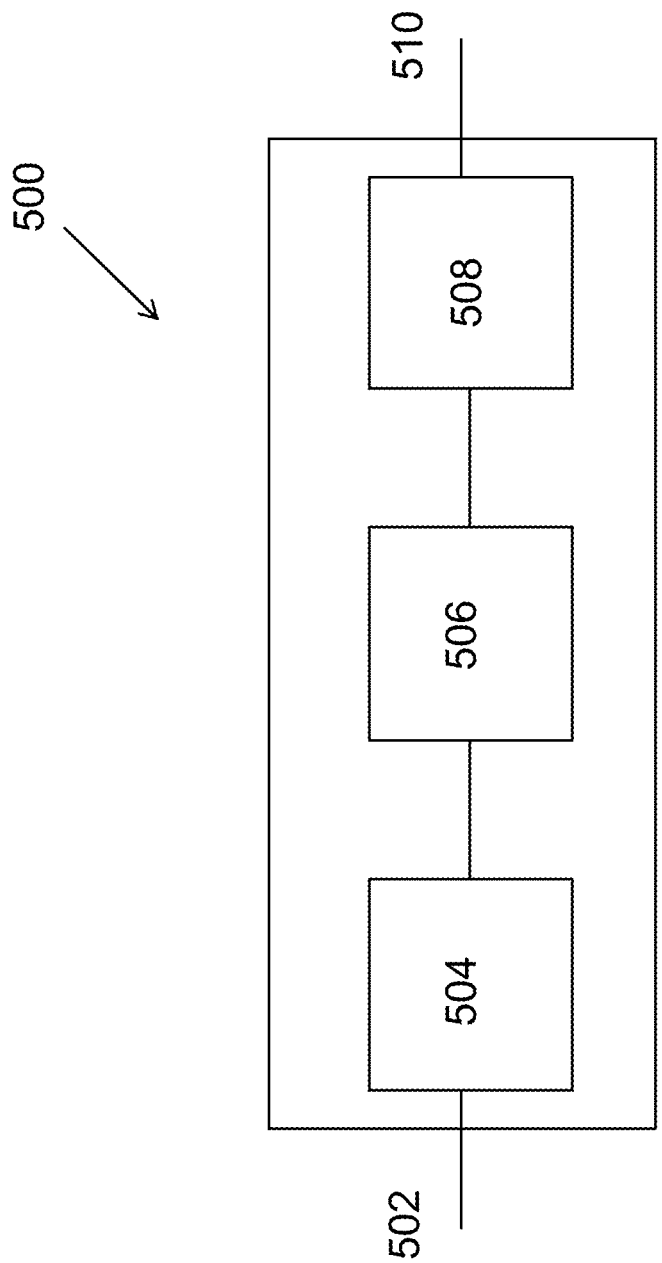
FIG. 5 is a block diagram of an example video processing system in which disclosed techniques may be implemented.

FIG. 5 is a block diagram showing an example video processing system 500 in which various techniques disclosed herein may be implemented. Various implementations may include some or all of the components of the system 500. The system 500 may include input 502 for receiving video content. The video content may be received in a raw or uncompressed format, e.g., 8 or 10 bit multi-component pixel values, or may be in a compressed or encoded format. The input 502 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 500 may include a coding component 504 that may implement the various coding or encoding methods described in the present document. The coding component 504 may reduce the average bitrate of video from the input 502 to the output of the coding component 504 to produce a coded representation of the video. The coding techniques are therefore sometimes called video compression or video transcoding techniques. The output of the coding component 504 may be either stored, or transmitted via a communication connected, as represented by the component 506. The stored or communicated bitstream (or coded) representation of the video received at the input 502 may be used by the component 508 for generating pixel values or displayable video that is sent to a display interface 510. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 6:
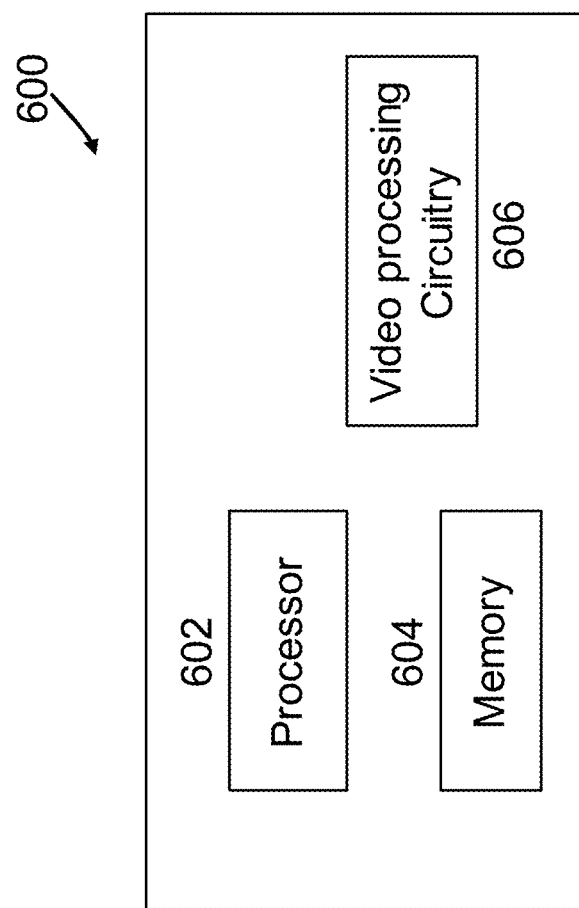
FIG. 6 is a block diagram for an example hardware platform for video processing.

FIG. 6 is a block diagram of a video processing apparatus 600. The apparatus 600 may be used to implement one or more of the methods described herein. The apparatus 600 may be embodied in a smartphone, tablet, computer, Internet of Things (IoT) receiver, and so on. The apparatus 600 may include one or more processors 602, one or more memories 604 and video processing hardware 606. The processor(s) 602 may be configured to implement one or more methods described in the present document. The memory (memories) 604 may be used for storing data and code used for implementing the methods and techniques described herein. The video processing hardware 606 may be used to implement, in hardware circuitry, some techniques described in the present document. In some implementations, the hardware 606 may be partly or entirely within the processor 602, e.g., a graphics co-processor.

Figure 7:
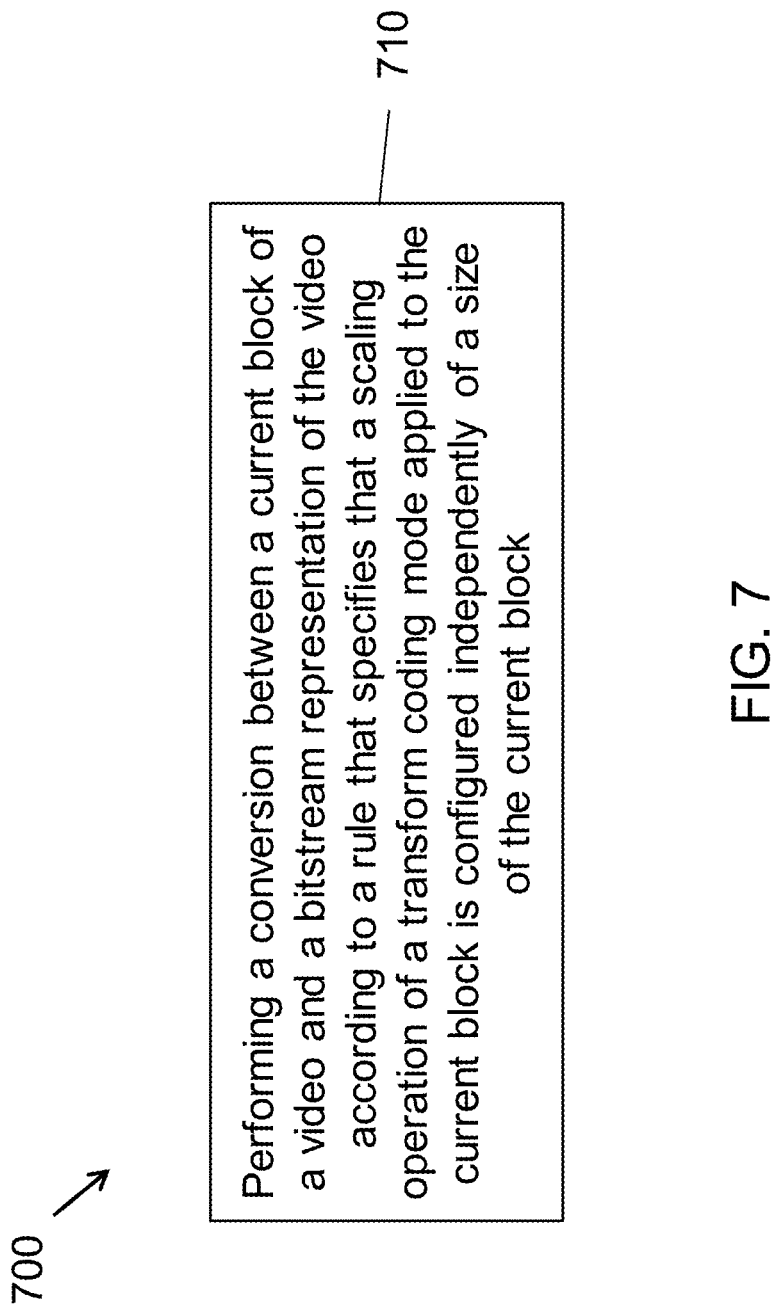
FIGS. 7-13 are flowcharts for example methods of video processing.

FIG. 7 is a flowchart of an example method 700 of video processing. The method 700 includes, at operation 710, performing a conversion between a current block of a video and a bitstream representation of the video according to a rule that specifies that a scaling operation of a transform coding mode applied to the current block is configured independently of a size of the current block.

Figure 8:
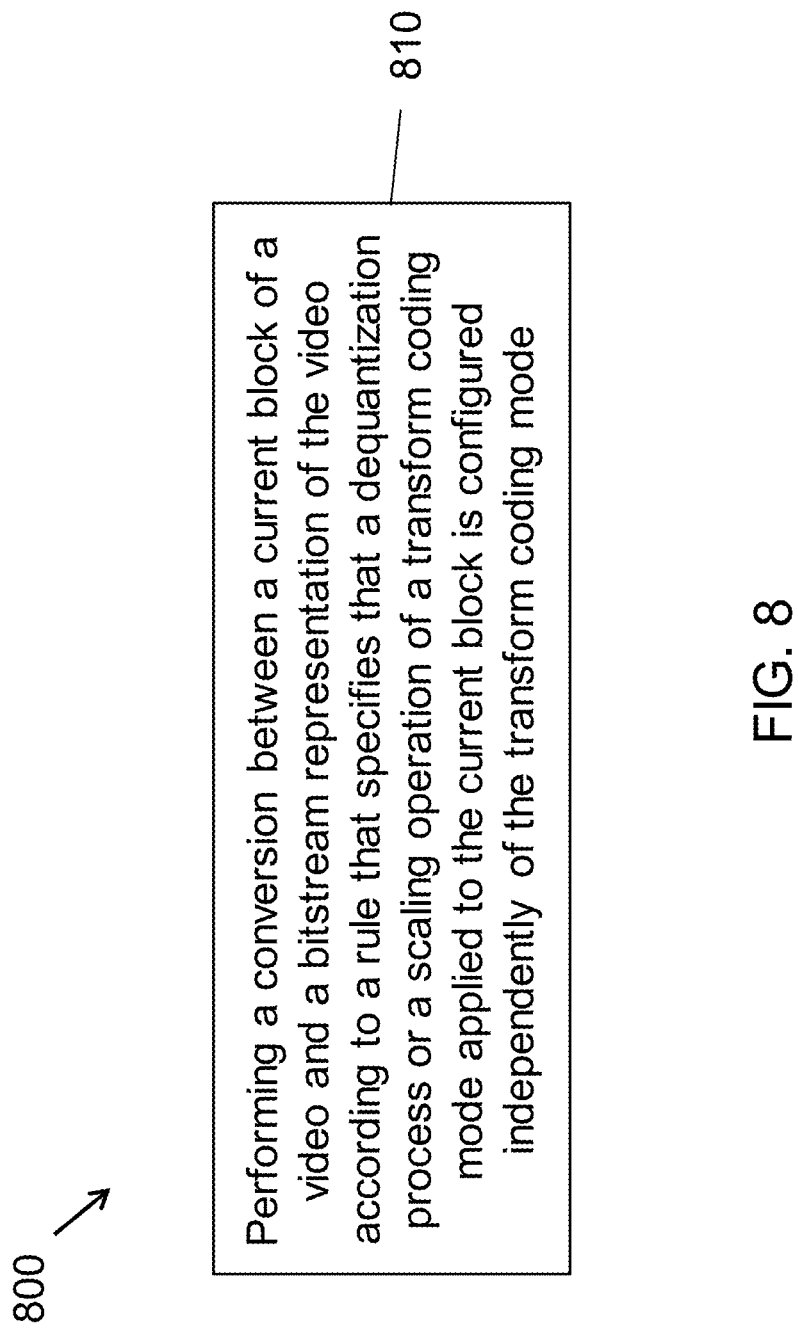

FIG. 8 is a flowchart of an example method 800 of video processing. The method 800 includes, at operation 810, performing a conversion between a current block of a video and a bitstream representation of the video according to a rule that specifies that a dequantization process or a scaling operation of a transform coding mode applied to the current block is configured independently of the transform coding mode.

Figure 9:
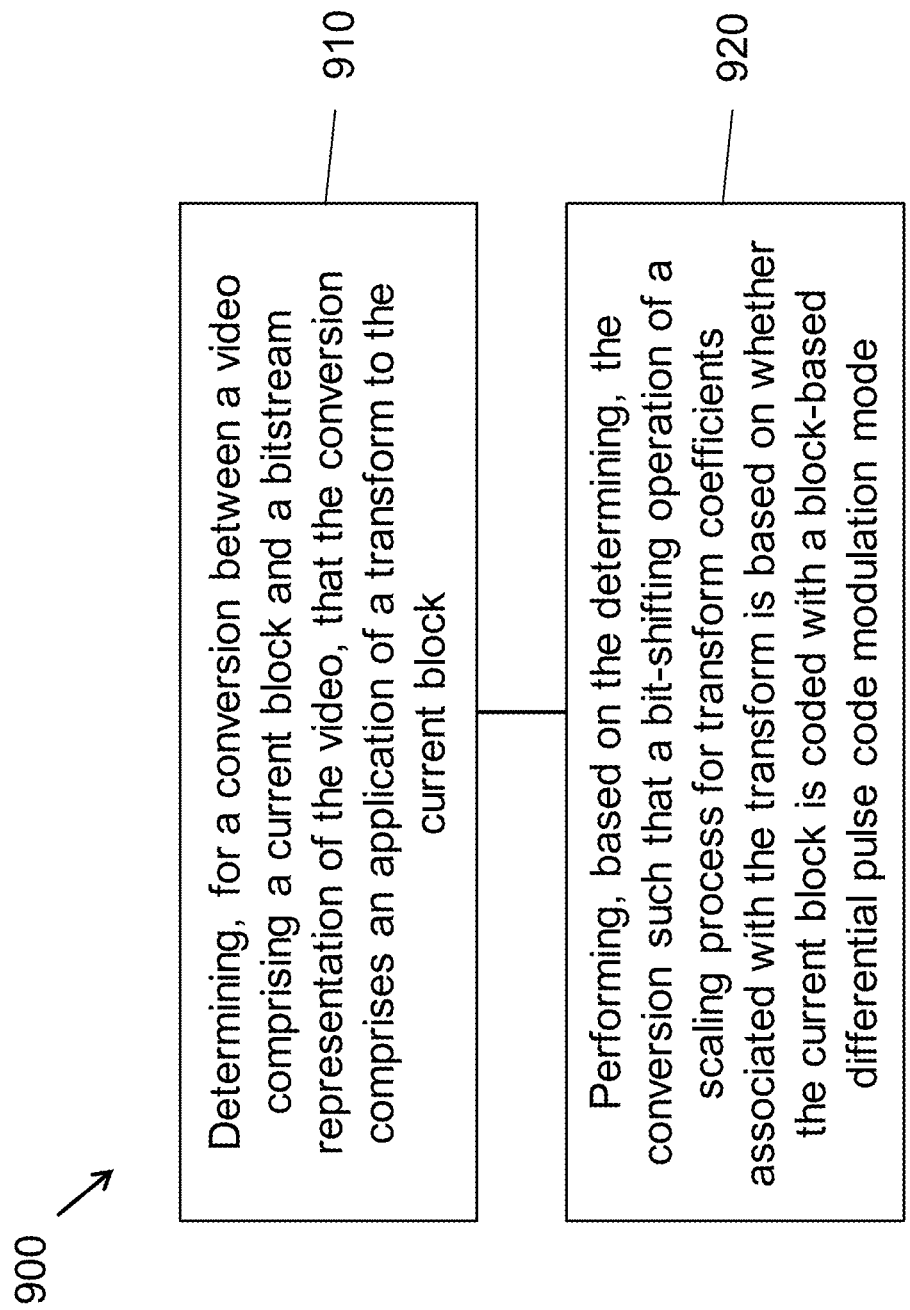

FIG. 9 is a flowchart of an example method 900 of video processing. The method 900 includes, at operation 910, determining, for a conversion between a video comprising a current block and a bitstream representation of the video, that the conversion comprises an application of a transform to the current block.

The method 900 includes, at operation 920, performing, based on the determining, the conversion such that a bit-shifting operation of a scaling process for transform coefficients associated with the transform is based on whether the current block is coded with a block-based differential pulse code modulation mode.

Figure 10:
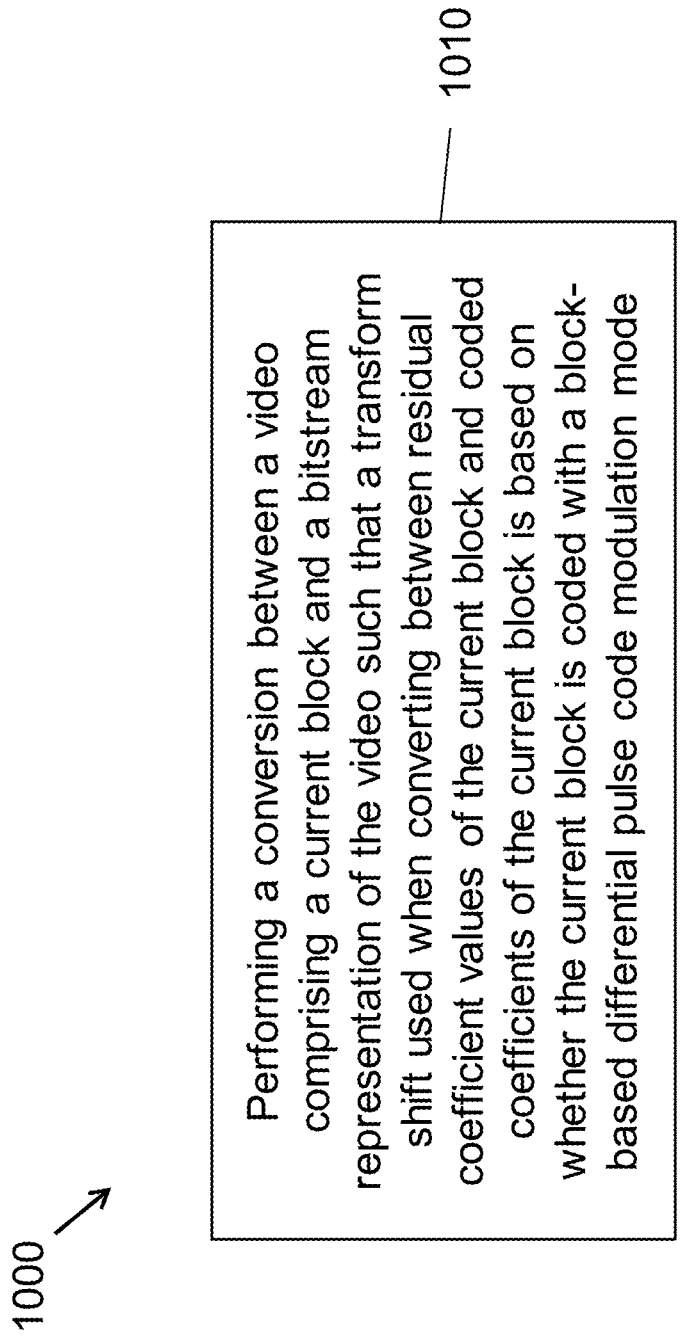

FIG. 10 is a flowchart of an example method 1000 of video processing. The method 1000 includes, at operation 1010, performing a conversion between a video comprising a current block and a bitstream representation of the video such that a transform shift used when converting between residual coefficient values of the current block and coded coefficients of the current block is based on whether the current block is coded with a block-based differential pulse code modulation mode.

Figure 11:
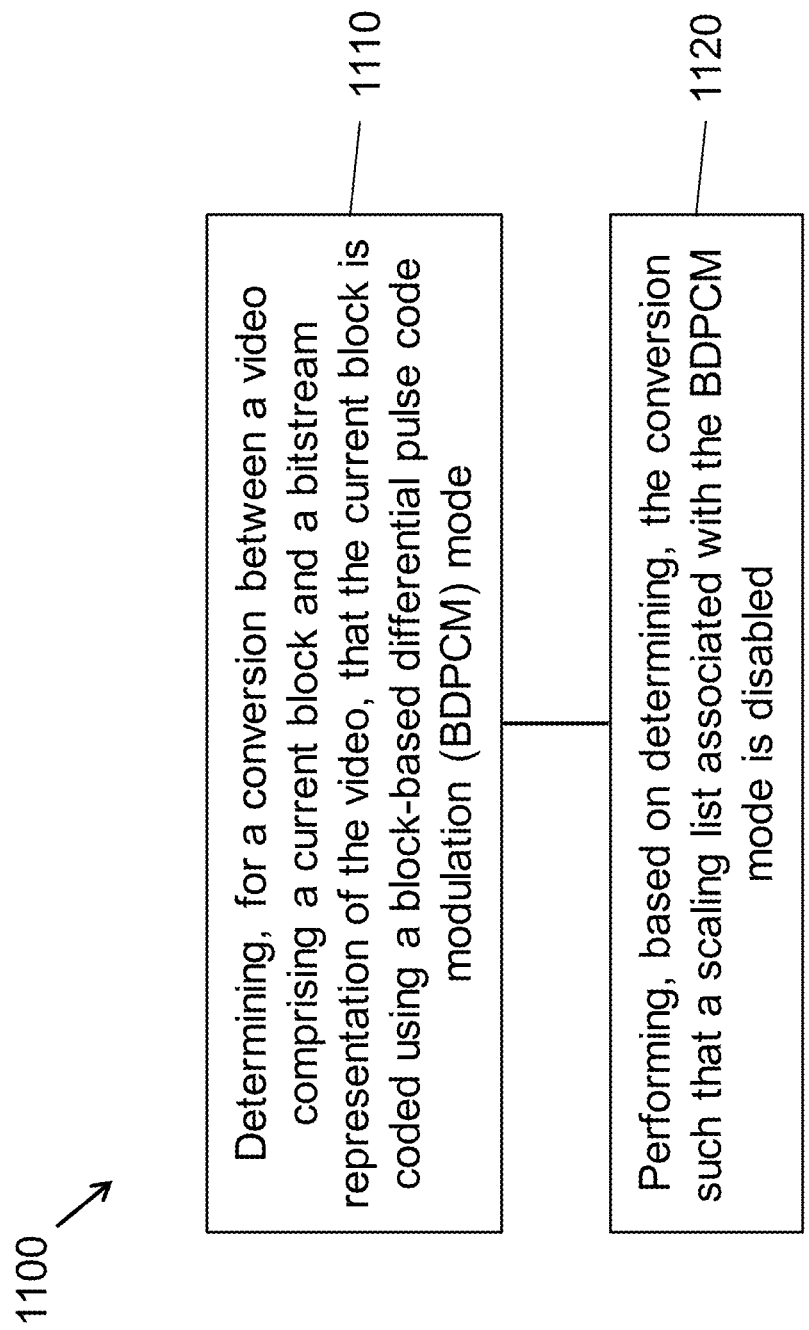

FIG. 11 is a flowchart of an example method 1100 of video processing. The method 1100 includes, at operation 1110, determining, for a conversion between a video comprising a current block and a bitstream representation of the video, that the current block is coded using a block-based differential pulse code modulation (BDPCM) mode.

The method 1100 includes, at operation 1120, performing, based on determining, the conversion such that a scaling list associated with the BDPCM mode is disabled.

Figure 12:
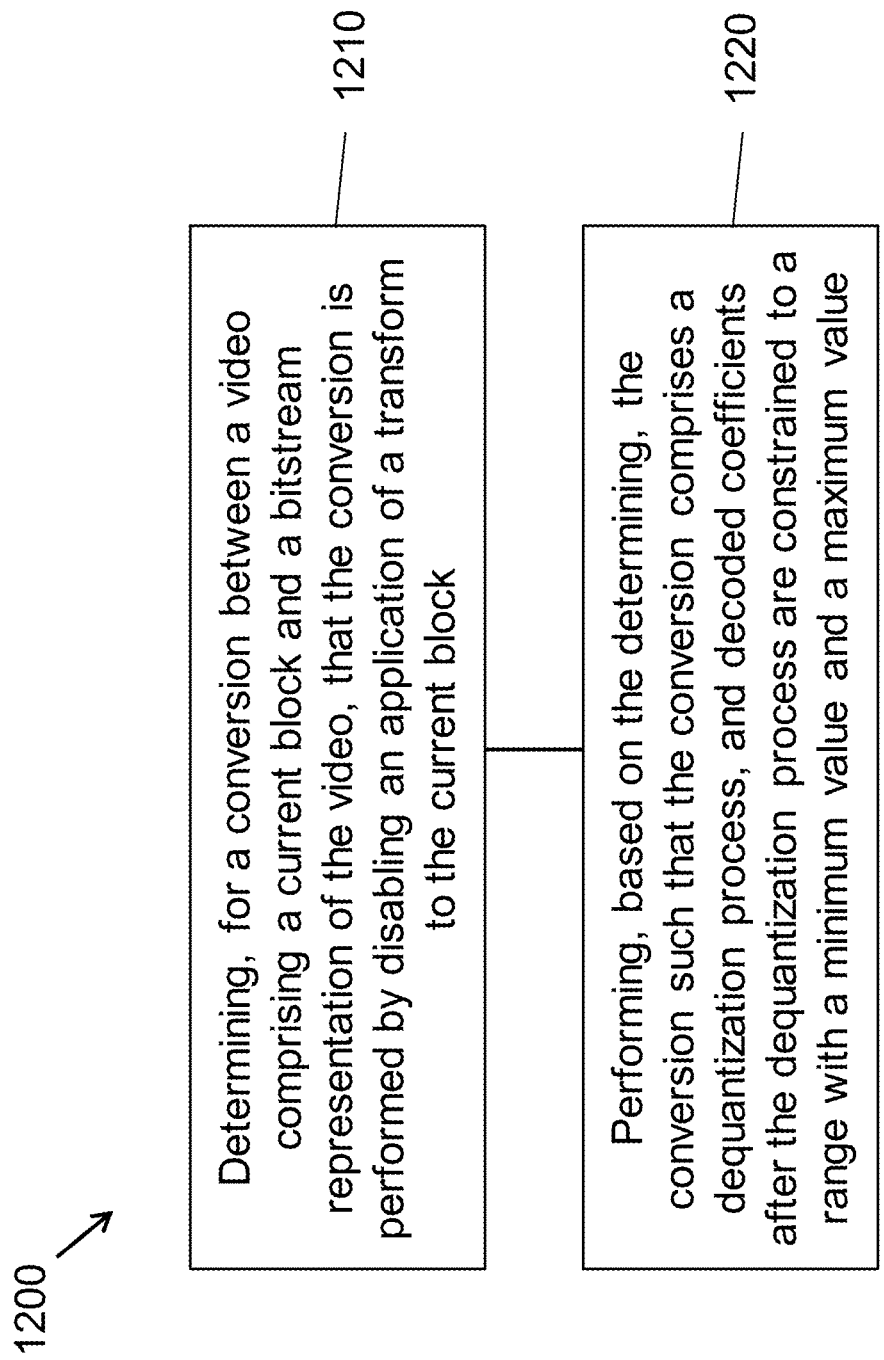

FIG. 12 is a flowchart of an example method 1200 of video processing. The method 1200 includes, at operation 1210, determining, for a conversion between a video comprising a current block and a bitstream representation of the video, that the conversion is performed by disabling an application of a transform to the current block.

The method 1200 includes, at operation 1220, performing, based on the determining, the conversion such that the conversion comprises a dequantization process, and decoded coefficients after the dequantization process are constrained to a range with a minimum value and a maximum value.

Figure 13:
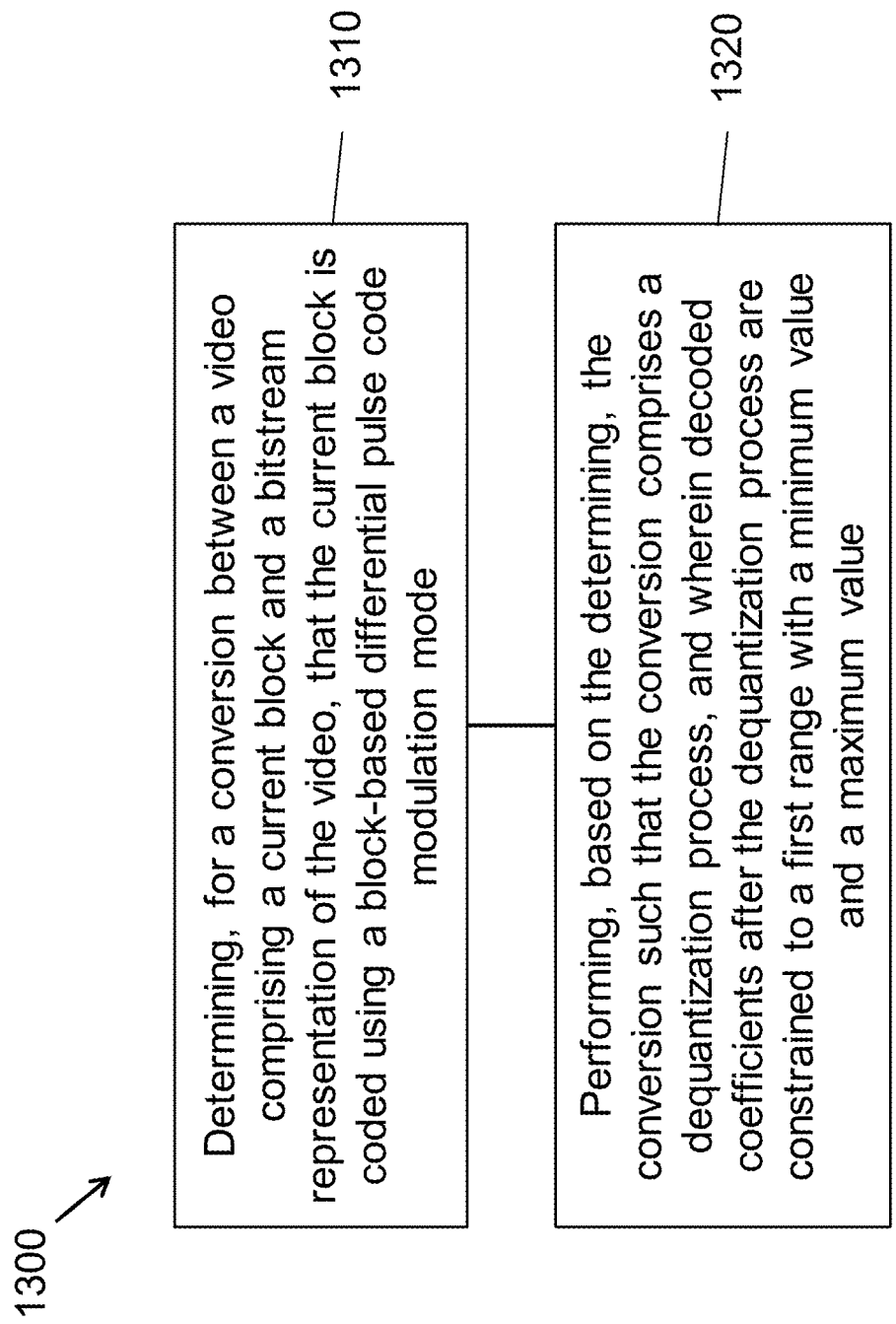

FIG. 13 is a flowchart of an example method 1300 of video processing. The method 1300 includes, at operation 1310, determining, for a conversion between a video comprising a current block and a bitstream representation of the video, that the current block is coded using a block-based differential pulse code modulation mode.

The method 1300 includes, at operation 1320, performing, based on the determining, the conversion such that the conversion comprises a dequantization process, and wherein decoded coefficients after the dequantization process are constrained to a first range with a minimum value and a maximum value.

The following technical solutions may be implemented as preferred solutions in some embodiments.

1. A method of video processing, comprising performing a conversion between a current block of a video and a bitstream representation of the video according to a rule, wherein the rule specifies that a scaling operation of a transform coding mode applied to the current block is configured independently of a size of the current block.

2. The method of solution 1, wherein the transform coding mode comprises a transform skip mode, and wherein the scaling operation comprises a scaling process for the transform coefficients associated with the transform coding mode.

3. The method of solution 2, wherein the scaling process comprises a bit-shifting operation, and wherein the bit-shifting operation is independent of the size of the current block.

4. The method of solution 1, wherein the transform coding mode comprises a block-based differential pulse code modulation (BDPCM) mode, and wherein the scaling operation comprises a scale factor used for converting between residual coefficient values of the current block and coded coefficients of the current block.

5. The method of solution 4, wherein the scale factor is a pre-defined constant.

6. The method of solution 5, wherein the scale factor is one.

7. The method of solution 4, wherein the scale factor is based on an internal bit-depth (ibd).

8. The method of solution 7, wherein the scale factor is (15-ibd).

9. The method of solution 4, wherein a transformation process for scaled transform coefficients is disabled, and wherein an output of a scaling process for the transform coefficients is used as an input to generate intermediate residual samples.

10. The method of solution 1, wherein the transform coding mode comprises a block-based differential pulse code modulation (BDPCM) mode, and wherein the scaling operation comprises a scaling process for the transform coefficients associated with the BDPCM mode.

11. The method of solution 10, wherein the scaling process comprises a bit-shifting operation, and wherein the bit-shifting operation is independent of the size of the current block.

12. A method of video processing, comprising performing a conversion between a current block of a video and a bitstream representation of the video according to a rule, wherein the rule specifies that a dequantization process or a scaling operation of a transform coding mode applied to the current block is configured independently of the transform coding mode.

13. The method of solution 12, wherein the transform coding mode comprises a transform skip mode, and wherein a dequantization factor of the dequantization process is independent of the transform coding mode.

14. The method of solution 12, wherein the transform coding mode comprises a block-based differential pulse code modulation (BDPCM) mode, and wherein a dequantization factor of the dequantization is independent of the transform coding mode.

15. The method of solution 13 or 14, wherein the dequantization factor is denoted levelScale.

16. The method of solution 12, wherein the transform coding mode comprises a transform skip mode, wherein a height of the current block is unequal to a width of the current block, wherein the scaling operation comprises a scaling operation for transform coefficients, and wherein a bit-shifting operation used the scaling process is independent of a transform coding mode.

17. The method of solution 12, wherein the transform coding mode comprises a block-based differential pulse code modulation (BDPCM) mode, wherein a height of the current block is unequal to a width of the current block, wherein the scaling operation comprises a scaling operation for transform coefficients, and wherein a bit-shifting operation used the scaling process is independent of a transform coding mode.

18. A method of video processing, comprising determining, for a conversion between a video comprising a current block and a bitstream representation of the video, that the conversion comprises an application of a transform to the current block; and performing, based on the determining, the conversion, wherein a bit-shifting operation of a scaling process for transform coefficients associated with the transform is based on whether the current block is coded with a block-based differential pulse code modulation (BDPCM) mode.

19. The method of solution 18, wherein when the current block is coded with the BDPCM mode, the bit-shifting operation for the current block is identical to the bit-shifting operation for a video block coded with a transform skip mode.

20. A method of video processing, comprising performing a conversion between a video comprising a current block and a bitstream representation of the video, wherein a transform shift used when converting between residual coefficient values of the current block and coded coefficients of the current block is based on whether the current block is coded with a block-based differential pulse code modulation (BDPCM) mode.

21. The method of solution 20, wherein when the current block is coded with the BDPCM mode, the transform shift for the current block is identical to the transform shift for a video block coded with a transform skip mode.

22. A method of video processing, comprising determining, for a conversion between a video comprising a current block and a bitstream representation of the video, that the current block is coded using a block-based differential pulse code modulation (BDPCM) mode; and performing, based on determining, the conversion, wherein a scaling list associated with the BDPCM mode is disabled.

23. The method of solution 22, wherein each entry in the scaling list is a pre-defined constant.

24. The method of solution 23, wherein the pre-defined constant is 16.

25. A method of video processing, comprising determining, for a conversion between a video comprising a current block and a bitstream representation of the video, that the conversion is performed by disabling an application of a transform to the current block; and performing, based on the determining, the conversion, wherein the conversion comprises a dequantization process, and wherein decoded coefficients after the dequantization process are constrained to a range with a minimum value (TsMin) and a maximum value (TsMax).

26. A method of video processing, comprising determining, for a conversion between a video comprising a current block and a bitstream representation of the video, that the current block is coded using a block-based differential pulse code modulation (BDPCM) mode; and performing, based on the determining, the conversion, wherein the conversion comprises a dequantization process, and wherein decoded coefficients after the dequantization process are constrained to a first range with a minimum value BdpcmMin) and a maximum value (BdpcmMax).

27. The method of solution 25 or 26, wherein transformed coefficient are constrained to a second range with a minimum value (CoeffMin) and a maximum value (CoeffMax).

28. The method of solution 25 or 26, wherein the minimum value is $-(1<<bitDepth)$, and wherein bitDepth is a bit depth for a color component of the video to which a transform skip mode has been applied.

29. The method of solution 25 or 26, wherein the maximum value is $[(1<<\text{bitDepth})-1]$, and wherein bitDepth is a bit depth for a color component of the video to which a transform skip mode has been applied.

30. The method of solution 25 or 26, wherein the minimum value is $-(1<<\min(\text{bitDepth},15))$, and wherein bitDepth is a bit depth for a color component of the video to which a transform skip mode has been applied.

31. The method of solution 25 or 26, wherein the maximum value is $[(1<<\min(\text{bitDepth},15))-1]$, and wherein bitDepth is a bit depth for a color component of the video to which a transform skip mode has been applied.

32. The method of any of solutions 1 to 31, wherein performing the conversion comprises generating the bitstream representation from the current block.

33. The method of any of solutions 1 to 31, wherein performing the conversion comprises generating the current block from the bitstream representation.

34. An apparatus in a video system comprising a processor and a non-transitory memory with instructions thereon, wherein the instructions upon execution by the processor, cause the processor to implement the method in any one of solutions 1 to 33.

35. A computer program product stored on a non-transitory computer readable media, the computer program product including program code for carrying out the method in any one of solutions 1 to 33.

36. A computer readable medium that stores the bitstream representation generated according to the method in any one of solutions 1 to 33.

37. A computer readable medium that stores a coded representation or a bitstream representation generated according to the solution in any one of claims 1 to 33.

In the above solutions, the performing the conversion includes using the results of previous decision step (e.g., using or not using certain coding or decoding steps) during the encoding or decoding operation to arrive at the conversion results. In the above-described solutions, video processing may include video coding or encoding or compressing or transcoding (changing from one format or bitrate to another format or bitrate), decoding or decompressing. Furthermore, these solutions may be applied to other visual data such as images.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
performing a conversion between a current block of a video and a bitstream of the video, wherein the conversion comprises:
performing, according to a rule, a scaling process for transform coefficients of the current block for deriving scaled transform coefficients of the current block, wherein the rule specifies that when a transformation process for the scaled transform coefficients is skipped for the current block, a bit depth shifting variable used in the scaling process is independent of a size of the current block,
wherein a bit depth offset and the bit depth shifting variable are used, before a clip operation, to derive the scaled transform coefficients, and the bit depth offset is derived based on the bit depth shifting variable.

2. The method of claim 1, wherein the bit depth shifting variable bdShift is predefined.

3. The method of claim 1, wherein the rule further specifies that when the current block is coded with a block-based differential pulse code modulation (BDPCM) mode, the bit depth shifting variable and the bit depth offset are used in the scaling process.

4. The method of claim 1, wherein the bit depth shifting variable and the bit depth offset for a block coded with a block-based differential pulse code modulation (BDPCM) mode is identical to the bit depth shifting variable and the bit depth offset for a block where the transformation process for the scaled transform coefficients is to be skipped.

5. The method of claim 1, wherein the rule further specifies that when the current block is coded with a block-based differential pulse code modulation (BDPCM) mode, an explicit scaling matrix is disabled for the scaling process for transform coefficients of the current block.

6. The method of claim 5, wherein a flat scaling matrix is used in the scaling process for transform coefficients of the current block.

7. The method of claim 6, wherein values of the flat scaling matrix are equal to 16.

8. The method of claim 1, wherein the scaling process includes a scaling operation or an inverse scaling operation, and the transformation process includes a transformation operation or an inverse transformation operation.

9. The method of claim 1, wherein the conversion includes encoding the current block into the bitstream.

10. The method of claim 1, wherein the conversion includes decoding the current block from the bitstream.

11. An apparatus for processing video data comprising a processor and a non-transitory memory with instructions thereon, wherein the instructions upon execution by the processor, cause the processor to:
perform a conversion between a current block of a video and a bitstream of the video, wherein the conversion comprises:
performing, according to a rule, a scaling process for transform coefficients of the current block for deriving scaled transform coefficients of the current block, wherein the rule specifies that when a transformation process for the scaled transform coefficients is skipped for the current block, a bit depth shifting variable used in the scaling process is independent of a size of the current block,
wherein a bit depth offset and the bit depth shifting variable are used, before a clip operation, to derive the scaled transform coefficients, and the bit depth offset is derived based on the bit depth shifting variable.

12. The apparatus of claim 11, wherein the bit depth shifting variable bdShift is predefined.

13. The apparatus of claim 11, wherein the rule further specifies that when the current block is coded with a block-based differential pulse code modulation (BDPCM) mode, the bit depth shifting variable and the bit depth offset are used in the scaling process.

14. The apparatus of claim 11, wherein the bit depth shifting variable and the bit depth offset for a block coded with a block-based differential pulse code modulation (BDPCM) mode is identical to the bit depth shifting variable and the bit depth offset for a block where the transformation process for the scaled transform coefficients is to be skipped.

15. The apparatus of claim 11, wherein the rule further specifies that when the current block is coded with a block-based differential pulse code modulation (BDPCM) mode, an explicit scaling matrix is disabled for the scaling process for transform coefficients of the current block.

16. The apparatus of claim 11, wherein the scaling process includes a scaling operation or an inverse scaling operation, and the transformation process includes a transformation operation or an inverse transformation operation.

17. A non-transitory computer-readable storage medium storing instructions that cause a processor to:
perform a conversion between a current block of a video and a bitstream of the video, wherein the conversion comprises:
performing, according to a rule, a scaling process for transform coefficients of the current block for deriving scaled transform coefficients of the current block, wherein the rule specifies that when a transformation process for the scaled transform coefficients is skipped for the current block, a bit depth shifting variable used in the scaling process is independent of a size of the current block,
wherein a bit depth offset and the bit depth shifting variable are used, before a clip operation, to derive the scaled transform coefficients, and the bit depth offset is derived based on the bit depth shifting variable.

18. The non-transitory computer-readable storage medium of claim 17, wherein the rule further specifies that when the current block is coded with a block-based differential pulse code modulation (BDPCM) mode, the bit depth shifting variable and the bit depth offset are used in the scaling process.

* * * * *